United States Patent
Chang et al.

(10) Patent No.: US 6,697,368 B2
(45) Date of Patent: Feb. 24, 2004

(54) HIGH-PERFORMANCE NETWORK SWITCH

(75) Inventors: Andrew Chang, Mountain View, CA (US); Ronak Patel, Santa Clara, CA (US); Ming G Wong, San Jose, CA (US)

(73) Assignee: Foundry Networks, Inc., San Jose, CA (US)

( * ) Notice: Subject to any disclaimer, the term of this patent is extended or adjusted under 35 U.S.C. 154(b) by 0 days.

(21) Appl. No.: 09/855,031

(22) Filed: May 15, 2001

(65) Prior Publication Data

US 2002/0089972 A1 Jul. 11, 2002

Related U.S. Application Data

(60) Provisional application No. 60/249,871, filed on Nov. 17, 2000.

(51) Int. Cl.[7] .............................................. H04L 12/56
(52) U.S. Cl. ................. 370/395.1; 370/389; 370/395.7; 370/471; 370/476
(58) Field of Search .................................. 370/229, 230, 370/244, 352, 359, 395.1, 395.7, 395.71, 395.72, 398, 412, 413, 414, 419, 476, 474, 471, 466, 389

(56) References Cited

U.S. PATENT DOCUMENTS

| | | | | |
|---|---|---|---|---|
| 5,430,442 A | * | 7/1995 | Kaiser et al. | |
| 5,815,146 A | | 9/1998 | Youden et al. | 345/720 |
| 5,835,496 A | * | 11/1998 | Yeung et al. | 370/514 |
| 5,870,538 A | * | 2/1999 | Manning et al. | |
| 5,907,660 A | * | 5/1999 | Inoue et al. | 386/109 |
| 5,915,094 A | | 6/1999 | Kouloheris et al. | 370/486 |
| 5,936,939 A | | 8/1999 | Des Jardins et al. | 370/229 |
| 6,038,288 A | * | 3/2000 | Thomas et al. | |
| 6,151,301 A | * | 11/2000 | Holden | |
| 6,222,845 B1 | | 4/2001 | Shue et al. | 370/400 |
| 6,333,929 B1 | | 12/2001 | Drottar et al. | 370/362 |

OTHER PUBLICATIONS

Charles E. Spurgeon, "Ethernet, The definitive guide", Entire book, Published by: O'Reilly & Associates, Inc., Sebastopol, Ca,Feb. 2000.
U.S. patent application Ser. No. 09/855,038, Chang et al., filed May 15, 2001.
U.S. patent application Ser. No. 09/855,024, Chang et al., filed May 15, 2001.
U.S. patent application Ser. No. 09/855,025, Chang et al., filed May 15, 2001.
U.S. patent application Ser. No. 09/855,015, Chang et al., May 15, 2001.

(List continued on next page.)

*Primary Examiner*—Dang Ton
*Assistant Examiner*—Shick Hom
(74) *Attorney, Agent, or Firm*—Sterne, Kessler, Goldstein & Fox PLLC

(57) ABSTRACT

The present invention provides a high-performance network switch. A digital switch has a plurality of blades coupled to a switching fabric via serial pipes. Serial link technology is used in the switching fabric. Each blade outputs serial data streams with in-band control information in multiple stripes to the switching fabric. The switching fabric includes a plurality of cross points corresponding to the multiple stripes. In one embodiment five stripes and five cross points are used. Each blade has a backplane interface adapter (BIA). One or more integrated bus translators (IBTs) and/or source packet processors are coupled to a BIA. An encoding scheme for packets of data carried in wide striped cells is provided.

28 Claims, 36 Drawing Sheets

| | STRIPE 1 | | | | STRIPE 2 | | | | STRIPE 3 | | | | STRIPE 4 | | | | STRIPE 5 | | | |
|---|---|---|---|---|---|---|---|---|---|---|---|---|---|---|---|---|---|---|---|---|
| CYCLE | L0 | L1 | L2 | L3 | L0 | L1 | L2 | L3 | L0 | L1 | L2 | L3 | L0 | L1 | L2 | L3 | L0 | L1 | L2 | L3 |
| 1 | K0 | STATE | D0 | D1 | K0 | STATE | D2 | D3 | K0 | STATE | D4 | D5 | K0 | STATE | D6 | D7 | K0 | STATE | RES | RES |
| 2 | D8 | | | | | | | | | | | | | | | | | | | D27 |
| 3 | D28 | | | | | | | | | | | | | | | | | | | D47 |
| 4 | D48 | | | | | | | | | | | | | | | | | | | D67 |
| 5 | D68 | | | | | | | | | | | | | | | | | | | D87 |
| 6 | D88 | | | | | | | | | | | | | | | | | | | D107 |
| 7 | D108 | | | | | | | | | | | | | | | | | | | D127 |
| 8 | D128 | | | | | | | | | | | | | | | | | | | D147 |

OTHER PUBLICATIONS

U.S. patent application Ser. No. 09/988,066, Patel et al., filed Nov. 16, 2001.

"Foundry Networks, Inc.—BigIron 4000, Layer 2 & Layer 3 Interoperability Evaluation," *The Tolly Group,* No. 199133, Oct., 1999, 4 pages.

"Foundry Networks, Inc.—BigIron 8000 Gigabit Ehternet Switching Router, Layer 2 & Layer 3 Performance Evaluation," *The Tolly Group,* No. 199111, May, 1999, 4 pages.

"Lab Testing Summary Report—Product Category: Layer–3 Switches, Vendor Tested: Foundry Networks, Product Tested: BigIron 4000," *Mier Communications, Inc.,* Report No. 231198, Oct., 1998, 6 pages.

"Lab Testing Summary Report—Product Category: Gigabit Backbone Switches, Vendor Tested: Foundry Networks, Product Tested: BigIron 4000," *Mier Communications, Inc.,* Report No. 210998, Sep. 1998, 6 pages.

"Switch Fabric Chipset—CX27300 iScale™," *Mindspeed—A Conexant Business,* Apr. 30, 2001, 2 pages.

"17×17 3.2 Gbps Crosspoint Switch with Imput Equalization —M21110," *Mindspeed—A Conexant Business,* Feb. 1, 2001, 2 pages.

"Switch Fabrics Touted At Interconnects Conference," by Craig Matsumoto, *EE Times;* Aug. 21, 2000, 2 pages.

"BigIron Architecture Technical Brief," *Foundry Networks,* May, 1999—Version 2.01, 15 pages.

"Mindspeed™ Switch Fabric Offers the Most Comprehensive Solution for Multi–Protocol Networking Equipment," editorial contacts, Roman Kichorowsky & Roslyn Whitehurst; Apr. 30, 2001, 3 pages.

"BigIron Architecture Technical Brief," *Foundry Networks,* Jul. 2001—Version 2.02, 16 pages.

"BigIron Architecture Technical Brief," *Foundry Networks,* May 1999—Version 2.0, 15 pages.

"BigIron Architecture Technical Brief," *Foundry Networks,* Dec. 1998—Version 1.03, 14 pages.

"BigIron Architecture Technical Brief," *Foundry Networks,* Oct. 1998 —Version 1.02, 15 pages.

"BigIron Architecture Technical Brief," *Foundry Networks,* Oct. 1998—Version 1.0, 15 pages.

* cited by examiner

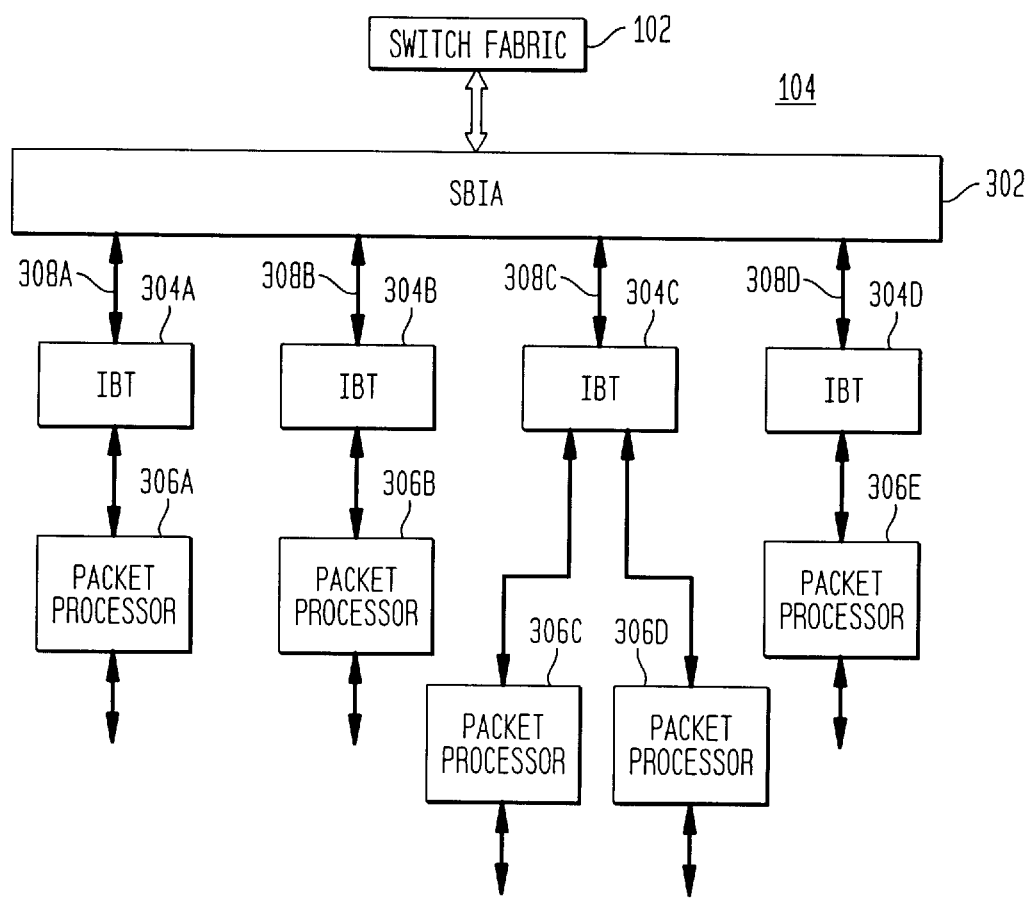
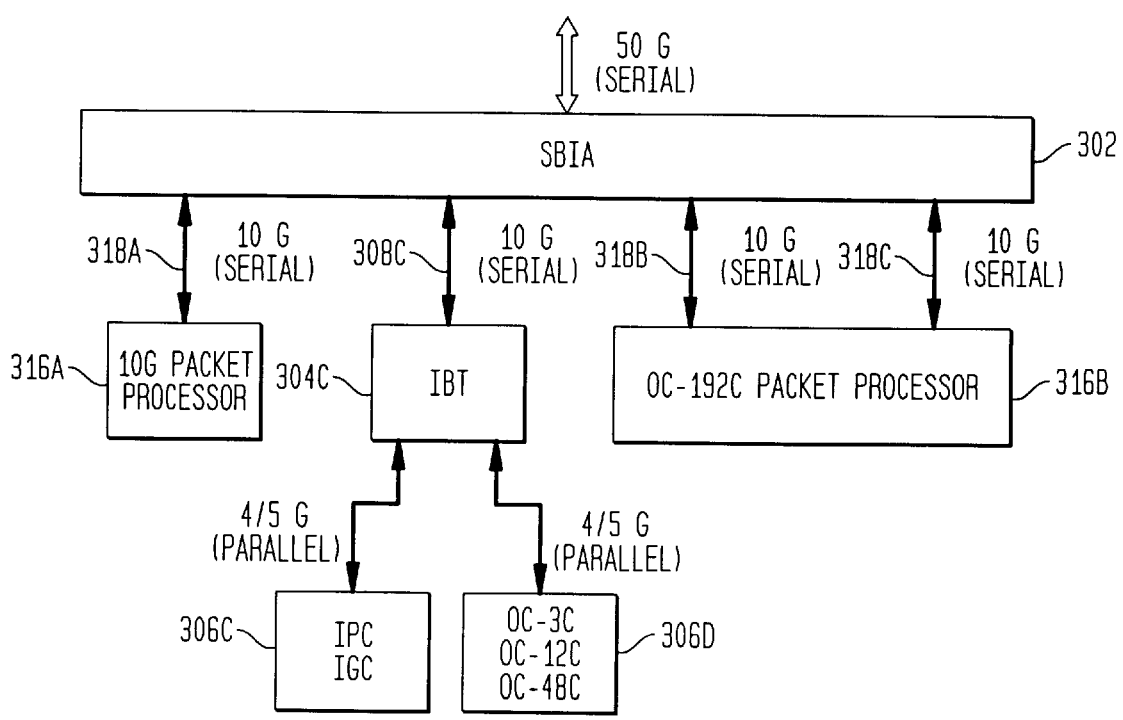

| LANE 0 | LANE 1 | LANE 2 | LANE 3 |
|---|---|---|---|
| CONTROL INFORMATION | STATE INFORMATION | RESERVED | RESERVED |
| D0 | D1 | D2 | D3 |
| D4 | D5 | D6 | D7 |
| D8 | D9 | D10 | D11 |
| D12 | D13 | D14 | D15 |
| ⋮ | ⋮ | ⋮ | ⋮ |
| D28 | D29 | D30 | D31 |

1310

| STATE INFORMATION | |
|---|---|
| NAME | DESCRIPTION |
| SLOT NUMBER | DESTINATION SLOT NUMBER WHERE CELL DATA BEING SENT |
| PAYLOAD STATE | RESERVED, SOP, DATA, ABORT |
| SOURCE OR DESTINATION PACKET PROCESSOR IDENTIFIER | ENCODED NUMBER IDENTIFYING A SOURCE OR DESTINATION PACKET PROCESSOR |
| RESERVED | RESERVED |

FIG. 15A

| CYCLE | STRIPE 1 |     |     |     | STRIPE 2 |       |    |    | STRIPE 3 |       |    |    | STRIPE 4 |       |    |    | STRIPE 5 |       |     |     |
|---|---|---|---|---|---|---|---|---|---|---|---|---|---|---|---|---|---|---|---|---|
|   | L0 | L1 | L2 | L3 | L0 | L1 | L2 | L3 | L0 | L1 | L2 | L3 | L0 | L1 | L2 | L3 | L0 | L1 | L2 | L3 |
| 1 | K0 | STATE | D0 | D1 | K0 | STATE | D2 | D3 | K0 | STATE | D4 | D5 | K0 | STATE | D6 | D7 | K0 | STATE | RES | RES |
| 2 | D8 |  |  |  |  |  |  |  |  |  |  |  |  |  |  |  |  |  |  | D27 |
| 3 | D28 |  |  |  |  |  |  |  |  |  |  |  |  |  |  |  |  |  |  | D47 |
| 4 | D48 |  |  |  |  |  |  |  |  |  |  |  |  |  |  |  |  |  |  | D67 |
| 5 | D68 |  |  |  |  |  |  |  |  |  |  |  |  |  |  |  |  |  |  | D87 |
| 6 | D88 |  |  |  |  |  |  |  |  |  |  |  |  |  |  |  |  |  |  | D107 |
| 7 | D108 |  |  |  |  |  |  |  |  |  |  |  |  |  |  |  |  |  |  | D127 |
| 8 | D128 |  |  |  |  |  |  |  |  |  |  |  |  |  |  |  |  |  |  | D147 |

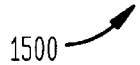

| STATE INFORMATION ||
|---|---|
| NAME | DESCRIPTION |
| SLOT NUMBER | DESTINATION SLOT NUMBER FOR BIA TO CROSSPOINT SWITCH DIRECTION<br>SOURCE SLOT NUMBER FOR CROSSPOINT SWITCH TO BIA DIRECTION |
| PAYLOAD STATE | ENCODED PAYLOAD STATE INFORMATION (RESERVED, SOA, DATA, ABORT) |
| RESERVED | RESERVED |

FIG. 15C

END OF PACKET ENCODING INFORMATION

1. EOP DURING CYCLE 1 (ie. DURING TRANSMISSION OF STATE INFORMATION)

| 1 | K0 | state | D0 | D1 | K0 | state | D2 | D3 | K0 | state | D4 | D5 | K0 | state | D6 | D7 | K0 | state | RES | RES |
|---|----|-------|----|----|----|-------|----|----|----|-------|----|----|----|-------|----|----|----|-------|-----|-----|
|   |    |       |    |    |    |       |    |    |    |       | K1 | K1 |    |       | K1 | K1 |    |       | K1  | K1  |

NOTE THAT THE K0, STATE, AND RESERVED BYTES ARE ALL PRESERVED, AS IN ANY OTHER CYCLE 1 TRANMISSION. THE K1 CHARACTER IS TREATED AS DATA

2. EOP DURING CYCLE n (n!=0)

| 1 | K0 | state | D0 | D1 | K0 | state | D2 | D3 | K0 | state | D4 | D5 | K0 | state | D6 | D7 | K0 | state | RES | RES |
|---|----|-------|----|----|----|-------|----|----|----|-------|----|----|----|-------|----|----|----|-------|-----|-----|
| 2 |    |       | D8 |    |    |       | D32| D33|    |       |    |    |    |       |    |    |    |       |     |     |
| 3 |    |       | D28|    |    |       |    |    |    |       |    |    |    |       |    |    |    |       |     | D27 |

3. EOP AT BLOCK BOUNDARY DURING CYCLE n (n!=0)

| 1 | K0 | state | D0 | D1 | K0 | state | D2 | D3 | K0 | state | D4 | D5 | K0 | state | D6 | D7 | K0 | state | RES | RES |
|---|----|-------|----|----|----|-------|----|----|----|-------|----|----|----|-------|----|----|----|-------|-----|-----|
| 2 |    |       | D8 |    |    |       |    |    |    |       |    |    |    |       |    |    |    |       |     | D27 |
| 3 | K1 | K1    | K1 | K1 | K1 | K1    | K1 | K1 | K1 | K1    | K1 | K1 | K1 | K1    | K1 | K1 | K1 | K1    | K1  | K1  |

NOTE THAT WHEN n>0, THE BLOCK BOUNDARY FOR DATA IS IN LANE 3 STRIPE 5. HOWEVER, FOR n=0, THE BLOCK BOUNDARY FOR DATA IS IN LANE 3 OF STRIPE 4.

4. EOP at cell boundary

| 6 | D88  |
|---|------|
| 7 | D108 |
| 8 | D128 |

| 1 | K0 | state | K1 | K1 | K0 | state | K1 | K1 | K0 | state | K1 | K1 | K0 | state | K1 | K1 | K0 | state | RES | RES |
|---|----|-------|----|----|----|-------|----|----|----|-------|----|----|----|-------|----|----|----|-------|-----|-----|
|   |    |       |    |    |    |       |    |    |    |       |    |    |    |       |    |    |    |       |     | D107|
|   |    |       |    |    |    |       |    |    |    |       |    |    |    |       |    |    |    |       |     | D127|
|   |    |       |    |    |    |       |    |    |    |       |    |    |    |       |    |    |    |       |     | D147|

FIG. 15D

| CYCLE | STRIPE 1 | | | | STRIPE 2 | | | | STRIPE 3 | | | | STRIPE 4 | | | | STRIPE 5 | | | |
|---|---|---|---|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 | L0 | L1 | L2 | L3 |
| 1 | K0 | P1 | D0 | D1 | | | | | | | | | | | | | | | | |
| 2 | D8 | | | D11 | | | | | | | | | | | | | | | | |
| 3 | D28 | | | D31 | K0 | P1 | D2 | D3 | | | | | | | | | | | | |
| 4 | D48 | | | D51 | D12 | | | D15 | | | | | K0 | P1 | D6 | D7 | | | | |
| 5 | D68 | | | D71 | D32 | | | D35 | | | | | D20 | | | D23 | | | | |
| 6 | D88 | | | D91 | D52 | | | D55 | K0 | P1 | D4 | D5 | D40 | | | D43 | | | | |
| 7 | D108 | | | D111 | D72 | | | D75 | D16 | | | D19 | D60 | | | D63 | K0 | P1 | RES | RES |
| 8 | D128 | | | D131 | D92 | | | D95 | D36 | | | D39 | D80 | | | D83 | D24 | | | D27 |

FIG. 16

| CYCLE | STRIPE 1 | | | | STRIPE 2 | | | | STRIPE 3 | | | | STRIPE 4 | | | | STRIPE 5 | | | |
|---|---|---|---|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 | L0 | L1 | L2 | L3 |
| 1 | K0 | SS1 | D0 | D1 | K0 | SS6 | D151 | D152 | K0 | SS2 | D4 | D5 | K0 | SS3 | D6 | D7 | K0 | SS7 | RES | RES |
| 2 | D8 | | | D11 | D161 | D162 | D163 | K1 | D16 | | | D19 | D20 | | | D23 | D320 | | | D323 |
| 3 | D28 | | | D31 | K0 | SS2 | D2 | D3 | D36 | | | D39 | D40 | | | D43 | D340 | | | D343 |
| 4 | D48 | | | D51 | D12 | | | D15 | D56 | | | D59 | K0 | SS4 | D6 | D7 | D360 | | | D363 |
| 5 | D68 | | | D71 | D32 | | | D35 | D76 | K1 | K1 | K1 | D20 | | | D23 | D380 | | | D383 |
| 6 | D88 | | | D91 | D52 | | | D55 | K0 | SS3 | D4 | D5 | D40 | | | D43 | K1 | K1 | K1 | K1 |
| 7 | D108 | | | D111 | D72 | | | D75 | D16 | | | D19 | D60 | | | D63 | K0 | SS5 | RES | RES |
| 8 | D128 | | | D131 | K0 | SS5 | D2 | D3 | D36 | | | D39 | D80 | K1 | K1 | K1 | D24 | | | D27 |
| 9 | K0 | SS4 | D0 | D1 | D12 | | | D15 | K0 | SS6 | D153 | D154 | K0 | SS2 | D6 | D7 | D44 | | | D47 |
| 10 | D8 | | | D11 | D32 | | | D35 | K1 | K1 | K1 | K1 | D20 | | | D23 | D64 | | | D67 |
| 11 | D28 | | | D31 | D52 | | | D55 | K0 | SS7 | D300 | D301 | D40 | | | D43 | K0 | SS1 | RES | RES |
| 12 | D48 | | | D51 | K0 | SS1 | D2 | D3 | D312 | | | D315 | D60 | | | D63 | D24 | | | D27 |
| 13 | D68 | | | D71 | D12 | | | D15 | D332 | | | D335 | K1 | K1 | K1 | K1 | D44 | | | D47 |
| 14 | K0 | SS7 | D296 | D297 | D32 | | | D35 | D352 | | | D355 | K0 | SS6 | D155 | D156 | D64 | | | D67 |
| 15 | D304 | | | D307 | D52 | | | D55 | D372 | | | D375 | K1 | K1 | K1 | K1 | D84 | | | D87 |
| 16 | D324 | | | D327 | D72 | | | D75 | K1 | K1 | K1 | K1 | K0 | SS1 | D6 | D7 | D104 | | | D107 |
| 17 | D344 | | | D347 | D92 | | | D95 | K0 | SS5 | D4 | D5 | D20 | | | D23 | D124 | | | D127 |
| 18 | D364 | | | D367 | D112 | | | D115 | D16 | | | D19 | D40 | | | D43 | D144 | | | D147 |
| 19 | K1 | K1 | K1 | K1 | D132 | | | D135 | D36 | | | D39 | D60 | | | D63 | D0 | SS3 | RES | RES |
| 20 | K0 | SS6 | D149 | D150 | K0 | SS7 | D298 | D299 | D56 | | | D59 | D80 | | | D83 | D24 | | | D27 |
| 21 | D157 | | | D160 | D308 | | | D311 | K0 | SS1 | D4 | D5 | D100 | | | D103 | D44 | D45 | K1 | K1 |
| 22 | K0 | SS1 | K1 | K1 | D328 | | | D331 | D16 | | | D19 | D120 | | | D123 | K0 | SS2 | RES | RES |
| 23 | K0 | SS3 | D0 | D1 | D348 | | | D351 | D36 | | | D39 | D140 | | | D143 | D24 | | | D27 |
| 24 | D8 | | | D11 | D368 | | | D371 | D56 | | | D59 | K0 | SS7 | D302 | D303 | D44 | | | D47 |

GREEN   YELLOW   ORANGE   BLUE   RED   RUST   PINK

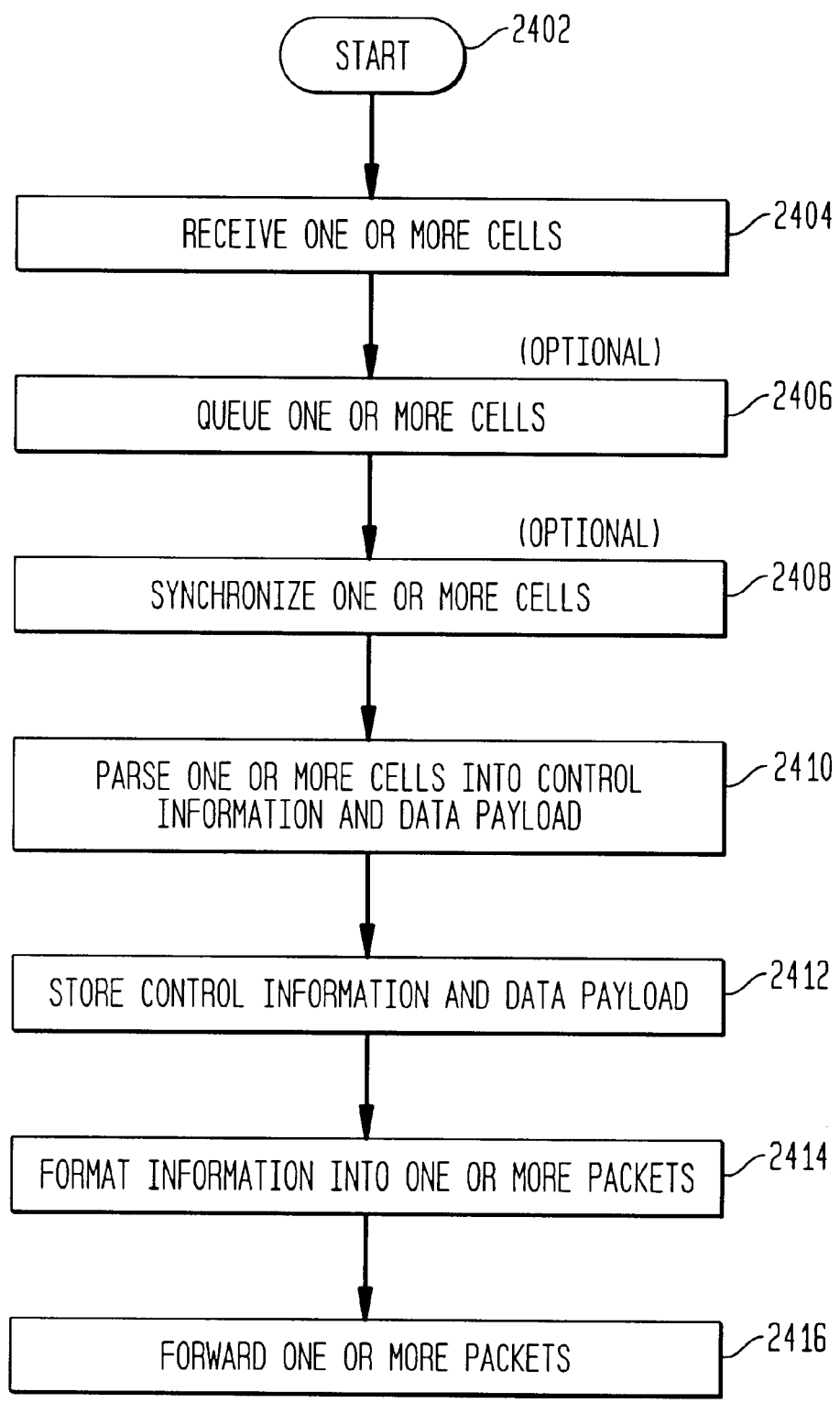

HIGH-PERFORMANCE NETWORK SWITCH

CROSS-REFERENCE TO RELATED APPLICATION

This application claims the benefit of U.S. Provisional Application No. 60/249,871, filed Nov. 17, 2000, the full text of which is incorporated herein by reference as if reproduced in full below.

BACKGROUND OF THE INVENTION

1. Field of the Invention

The invention relates generally to network switches.

2. Background Art

A network switch is a device that provides a switching function (i.e., determines a physical path) in a data communications network. Switching involves transferring information, such as digital data packets or frames, among entities of the network. Typically, a switch is a computer having a plurality of circuit cards coupled to a backplane. In the switching art, the circuit cards are typically called "blades." The blades are interconnected by a "switch fabric." Each blade includes a number of physical ports that couple the switch to the other network entities over various types of media, such as Ethernet, FDDI (Fiber Distributed Data Interface), or token ring connections. A network entity includes any device that transmits and/or receives data packets over such media.

The switching function provided by the switch typically includes receiving data at a source port from a network entity and transferring the data to a destination port. The source and destination ports may be located on the same or different blades. In the case of "local" switching, the source and destination ports are on the same blade. Otherwise, the source and destination ports are on different blades and switching requires that the data be transferred through the switch fabric from the source blade to the destination blade. In some case, the data may be provided to a plurality of destination ports of the switch. This is known as a multicast data transfer.

Switches operate by examining the header information that accompanies data in the data frame. The header information includes the international standards organization (ISO) 7-layer OSI (open-systems interconnection model). In the OSI model, switches generally route data frames based on the lower level protocols such as Layer 2 or Layer 3. In contrast, routers generally route based on the higher level protocols and by determining the physical path of a data frame based on table look-ups or other configured forwarding or management routines to determine the physical path (i.e., route).

Ethernet is a widely used lower-layer network protocol that uses broadcast technology. The Ethernet frame has six fields. These fields include a preamble, a destination address, source address, type, data and a frame check sequence. In the case of an ethernet frame, the digital switch will determine the physical path of the frame based on the source and destination addresses. Standard Ethernet operates at a ten Mbit/s data rate. Another implementation of Ethernet known as "Fast Ethernet" (FE) has a data rate of 100 Megabits/s. Yet another implementation of FE operates at 10 Gigabits/sec.

A digital switch will typically have physical ports that are configured to communicate using different protocols at different data rates. For example, a blade within a switch may have certain ports that are 10 Mbit/s, or 100 Mbit/s ports. It may have other ports that conform to optical standards such as SONET and are capable of such data rates as 10 gigabits per second.

A performance of a digital switch is often assessed based on metrics such as the number of physical ports that are present, and the total bandwidth or number of bits per second that can be switched without blocking or slowing the data traffic. A limiting factor in the bit carrying capacity of many switches is the switch fabric. For example, one conventional switch fabric was limited to 8 gigabits per second per blade. In an eight blade example, this equates to 64 gigabits per second of traffic. It is possible to increase the data rate of a particular blade to greater than 8 gigabits per second. However, the switch fabric would be unable to handle the increased traffic.

It is desired to take advantage of new optical technologies and increase port densities and data rates on blades. However, what is needed is a switch and a switch fabric capable of handling higher bit rates and providing a maximum aggregate bit carrying capacity well in excess of conventional switches.

BRIEF SUMMARY OF THE INVENTION

The present invention provides a high-performance network switch. Serial link technology is used in a switching fabric. Serial data streams, rather than parallel data streams, are switched in a switching fabric. Blades output serial data streams in serial pipes. A serial pipe can be a number of serial links coupling a blade to the switching fabric. The serial data streams represent an aggregation of input serial data streams provided through physical ports to a respective blade. Each blade outputs serial data streams with in-band control information in multiple stripes to the switching fabric.

In one embodiment, the serial data streams carry packets of data in wide striped cells across multiple stripes. Wide striped cells are encoded. In-band control information is carried in one or more blocks of a wide cell. For example, the initial block of a wide cell includes control information and state information. Further, the control information and state information is carried in each stripe. In particular, the control information and state information is carried in each subblock of the initial block of a wide cell. In this way, the control information and state information is available in-band in the serial data streams (also called stripes). Control information is provided in-band to indicate traffic flow conditions, such as, a start of cell, an end of packet, abort, or other error conditions.

A wide cell has one or more blocks. Each block extends across five stripes. Each block has a size of twenty bytes made up of five subblocks each having a size of four bytes. In one example, a wide cell has a maximum size of eight blocks (160 bytes) which can carry a 148 bytes of payload data and 12 bytes of in-band control information. Packets of data for full-duplex traffic can be carried in the wide cells at a 50 Gb/sec rate in each direction through one slot of the digital switch. According to one feature, the choice of maximum wide cell block size of 160 bytes as determined by the inventors allows a 4×10 Gigabit/sec Ethernet (also called 4×10 GE) line rate to be maintained through the backplane interface adapter. This line rate is maintained for Ethernet packets having a range of sizes accepted in the Ethernet standard including, but not limited to, packet sizes between 84 and 254 bytes.

In one embodiment, a digital switch has a plurality of blades coupled to a switching fabric via serial pipes. The switching fabric can be provided on a backplane and/or one or more blades. Each blade outputs serial data streams with in-band control information in multiple stripes to the switching fabric. The switching fabric includes a plurality of cross points corresponding to the multiple stripes. Each cross point has a plurality of port slices coupled to the plurality of blades. In one embodiment five stripes and five five cross points are used. Each blade has five serial links coupled to each of the five cross points respectively. In one example implementation, the serial pipe coupling a blade to switching fabric is a 50 Gb/s serial pipe made up of five 10 Gb/s serial links. Each of the 10 Gb/s serial links is coupled to a respective cross point and carries a serial data stream. The serial data stream includes a data slice of a wide cell that corresponds to one stripe.

In one embodiment of the present invention, each blade has a backplane interface adapter (BIA). The BIA has three traffic processing flow paths. The first traffic processing flow path extends in traffic flow direction from local packet processors toward a switching fabric. The second traffic processing flow path extends in traffic flow direction from the switching fabric toward local packet processors. A third traffic processing flow path carried local traffic from the first traffic processing flow path. This local traffic is sorted and routed locally at the BIA without having to go through the switching fabric.

The BIA includes one or more receivers, wide cell generators, and transmitters along the first path. The receivers receive narrow input cells carrying packets of data. These narrow input cells are output from packet processor(s) and/or from integrated bus translators (IBTs) coupled to packet processors. The BIA includes one or more wide cell generators. The wide cell generators generate wide striped cells carrying the packets of data received by the BIA in the narrow input cells. The transmitters transmit the generated wide striped cells in multiple stripes to the switching fabric.

According to the present invention, the wide cells extend across multiple stripes and include in-band control information in each stripe. In one embodiment, each wide cell generator parses each narrow input cell, checks for control information indicating a start of packet, encodes one or more new wide striped cells until data from all narrow input cells of the packet is distributed into the one or more new wide striped cells, and writes the one or more new wide striped cells into a plurality of send queues.

In one example, the BIA has four deserializer receivers, 56 wide cell generators, and five serializer transmitters. The four deserializer receivers receive narrow input cells output from up to eight originating sources (that is, up to two IBTs or packet processors per deserializer receiver). The 56 wide cell generators receive groups of the received narrow input cells sorted based on destination slot indentifier and originating source. The five serializer transmitters transmit the data slices of the wide cell that corresponds to the stripes.

According to a further feature, a BIA can also include a traffic sorter which sorts received narrow input cells based on a destination slot identifier. In one example, the traffic sorter comprises both a global/traffic sorter and a backplane sorter. The global/traffic sorter sorts received narrow input cells having a destination slot identifier that identifies a local destination slot from received narrow input cells having destination slot identifier that identifies global destination slots across the switching fabric. The backplane sorter further sorts received narrow input cells having destination slot identifiers that identify global destination slots into groups based on the destination slot identifier.

In one embodiment, the BIA also includes a plurality of stripe send queues and a switching fabric transmit arbitrator. The switching fabric transmit arbitrator arbitrates the order in which data stored in the stripe send queues is sent by the transmitters to the switching fabric. In one example, the arbitration proceeds in a round-robin fashion. Each stripe send queue stores a respective group of wide striped cells corresponding a respective originating source packet processor and a destination slot identifier. Each wide striped cell hag one or more blocks across multiple stripes. During a processing cycle, the switching fabric transmit arbitrator selects a stripe send queue and pushes the next available cell (or even one or more blocks of a cell at time) to the transmitters. Each stripe of a wide cell is pushed to the respective transmitter for that stripe.

The BIA includes one or more receivers, wide/narrow cell translators, and transmitters along the second path. The receivers receive wide striped cells in multiple stripes from the switching fabric. The wide striped cells carry packets of data. The translators translate the received wide striped cells to narrow input cells carrying the packets of data. The transmitters then transmit the narrow input cells to corresponding destination packet processors or IBTs. In one example, the five deserializer receivers receive five sub-blocks of wide striped cells in multiple stripes. The wide striped cells carrying packets of data across the multiple stripes and including destination slot identifier information.

In one embodiment, the BIA further includes stripe interfaces and stripe receive synchronization queues. Each stripe interface sorts received subblocks in each stripe based on originating slot identifier information and stores the sorted received subblocks in the stripe receive synchronization queues.

The BIA further includes along the second traffic flow processing path an arbitrator, a striped-based wide cell assembler, and the narrow/wide cell translator. The arbitrator arbitrates an order in which data stored in the stripe receive synchronization queues is sent to the striped-based wide cell assembler. The striped-based wide cell assembler assembles wide striped cells based on the received subblocks of data. A narrow/wide cell translator then translates the arbitrated received wide striped cells to narrow input cells carrying the packets of data.

A second level of arbitration is also provided according to an embodiment of the present invention, The BIA further includes destination queues and a local destination transmit arbitrator in the second path. The destination queues store narrow cells sent by a local traffic sorter (from the first path) and the narrow cells translated by the translator (from the second path. The local destination transmit arbitrator arbitrates an order in which narrow input cells stored in the destination queues is sent to serializer transmitters. Finally, the serializer transmitters then that transmits the narrow input cells to corresponding IBTs and/or source packet processors (and ultimately out of a blade through physical ports).

According to a further feature of the present invention, system and method for encoding wide striped cells is provided. The wide cells extend across multiple stripes and include in-band control information in each stripe. State information, reserved information, and payload data may also be included in each stripe. In one embodiment, a wide cell generator encodes one or more new wide striped cells.

The wide cell generator encodes an initial block of a start wide striped cell with initial cell encoding information. The initial cell encoding information includes control information (such as, a special K0 character) and state information provided in each subblock of an initial block of a wide cell. The wide cell generator further distributes initial bytes of packet data into available space in the initial block. Remaining bytes of packet data are distributed across one or more blocks in of the first wide striped cell (and subsequent wide cells) until an end of packet condition is reached or a maximum cell size is reached, Finally, the wide cell generator further encodes an end wide striped cell with end of packet information that varies depending upon the degree to which data has filled a wide striped cell. In one encoding scheme, the end of packet information varies depending upon a set of end of packet conditions including whether the end of packet occurs at the end of an initial block, within a subsequent block after the initial block, at a block boundary, or at a cell boundary.

According to a further embodiment of the present invention, a method for interfacing serial pipes carrying packets of data in narrow input cells and a serial pipe carrying packets of data in wide striped cells includes receiving narrow input cells, generating wide striped cells, and transmitting blocks of the wide striped cells across multiple stripes. The method can also include sorting the received narrow input cells based on a destination slot identifier, storing the generated wide striped cells in corresponding stripe send queues based on a destination slot identifier and an originating source packet processor, and arbitrating the order in which the stored wide striped cells are selected for transmission.

In one example, the generating step includes parsing each narrow input cell, checking for control information that indicates a start of packet, encoding one or more new wide striped cells until data from all narrow input cells carrying the packet is distributed into the one or more new wide striped cells, and writing the one or more new wide striped cells into a plurality of send queues. The encoding step includes encoding an initial block of a start wide striped cell with initial cell encoding information, such as, control information and state information. Encoding can further include distributing initial bytes of packet data into available space in an initial block of a first wide striped cell, adding reserve information to available bytes at the end of the initial block of the first wide striped cell, distributing remaining bytes of packet data across one or more blocks in the first wide striped cell until an end of packet condition is reached or a maximum cell size is reached, and encoding an end wide striped cell with end of packet information. The end of packet information varies depending upon a set of end of packet conditions including whether the end of packet occurs at the end of an initial block, in any block after the initial block, at a block boundary, or at a cell boundary.

The method also includes receiving wide striped cells carrying packets of data in multiple stripes from a switching fabric, translating the received wide striped cells to narrow input cells carrying the packets of data, and transmitting the narrow input cells to corresponding source packet processors. The method further includes sorting the received subblocks in each stripe based on originating slot identifier information, storing the sorted received subblocks in stripe receive synchronization queues, and arbitrating an order in which data stored in the stripe receive synchronization queues is assembled. Additional steps are assembling wide striped cells in the order of the arbitrating step based on the received subblocks of data, translating the arbitrated received wide striped cells to narrow input cells carrying the packets of data, and storing narrow cells in a plurality of destination queues, In one embodiment, further arbitration is performed including arbitrating an order in which data stored in the destination queues is to be transmitted and transmitting the narrow input cells in the order of the further arbitrating step to corresponding source packet processors and/or IBTs.

Further embodiments, features, and advantages of the present inventions, as well as the structure and operation of the various embodiments of the present invention, are described in detail below with reference to the accompanying drawings.

BRIEF DESCRIPTION OF THE DRAWINGS/ FIGURES

The accompanying drawings, which are Incorporated herein and form a part of the specification, illustrate the present invention and, together with the description, further serve to explain the principles of the invention and to enable a person skilled in the pertinent art to make and use the invention.

In the drawings:

FIG. 3A is a diagram of blade used in the high-performance network switch of FIG. 1 according to an embodiment of the present invention.

FIG. 3B shows a configuration of blade according another embodiment of the present invention.

FIG. 13 is a diagram illustrating a narrow cell and state information used in the narrow cell according to an embodiment of the present invention.

FIG. 15A is a diagram illustrating encoding in a wide striped cell according to an embodiment of the present invention.

FIG. 15B is a diagram illustrating state information used in a wide striped cell according to an embodiment of the present invention.

FIG. 15C is a diagram illustrating end of packet encoding information used in a wide striped cell according to an embodiment of the present invention.

FIG. 15D is a diagram illustrating an example of a cell boundary alignment condition during the transmission of wide striped cells in multiple stripes according to an embodiment of the present invention.

FIG. 16 is a diagram illustrating an example of a packet alignment condition during the transmission of wide striped cells in multiple stripes according to an embodiment of the present invention.

Figure 23A:
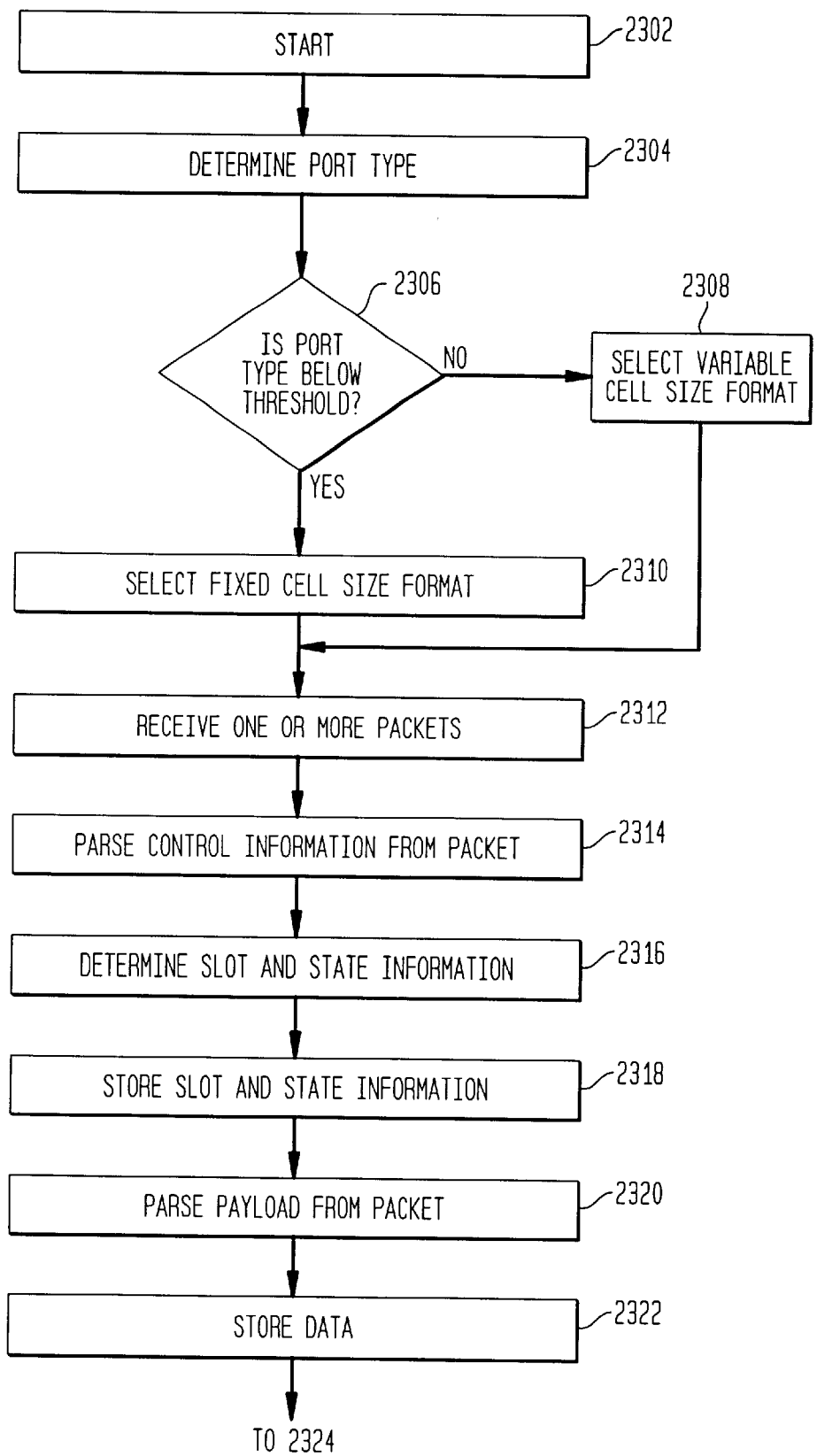
Figure 23B:
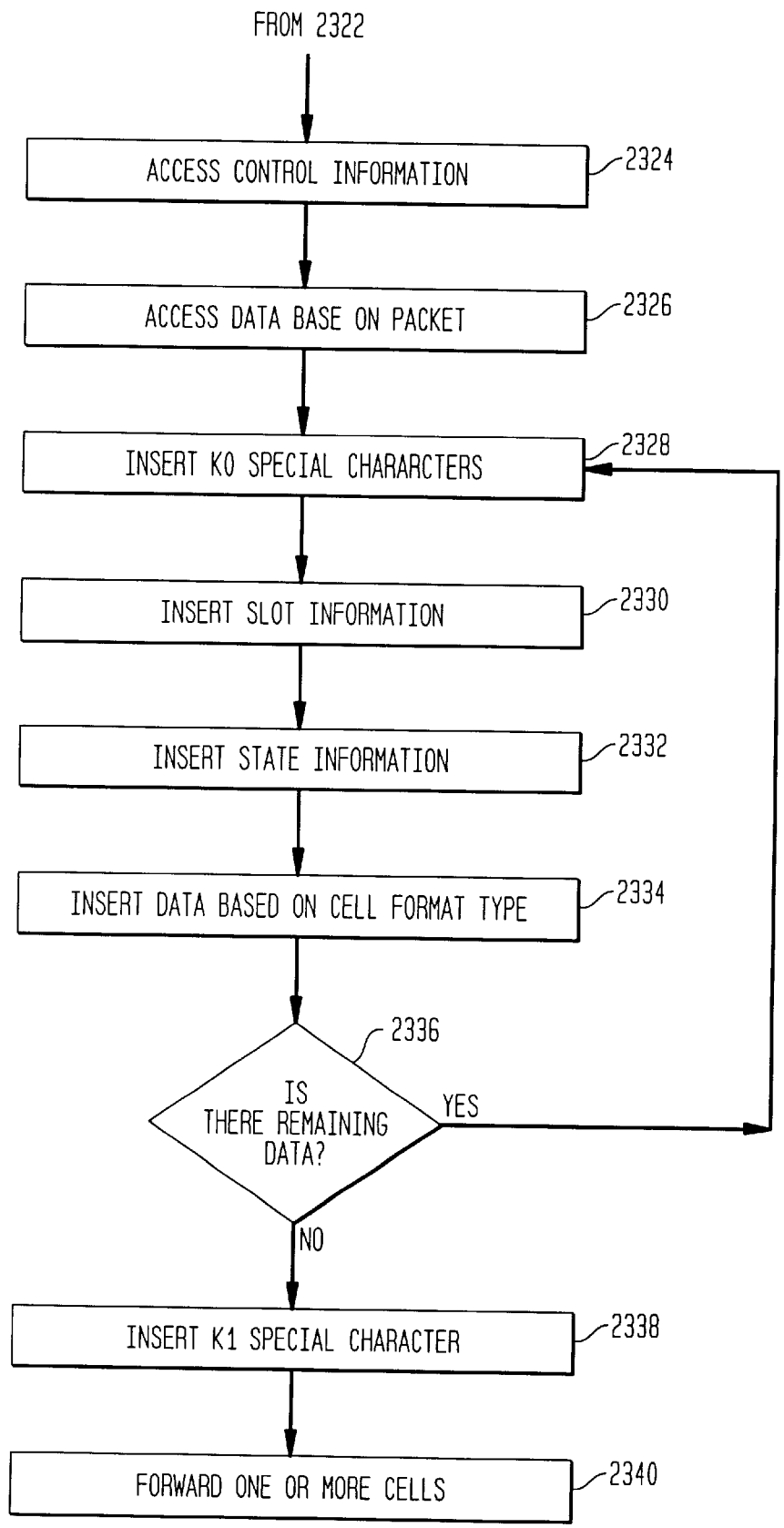

FIGS. 23A–B illustrates a detailed flow diagram of the encoding process of the bus translator according to one embodiment of the present invention.

FIG. 24 illustrates a flow diagram of the decoding process of the bus translator according to one embodiment of the present invention.

Figure 25A:
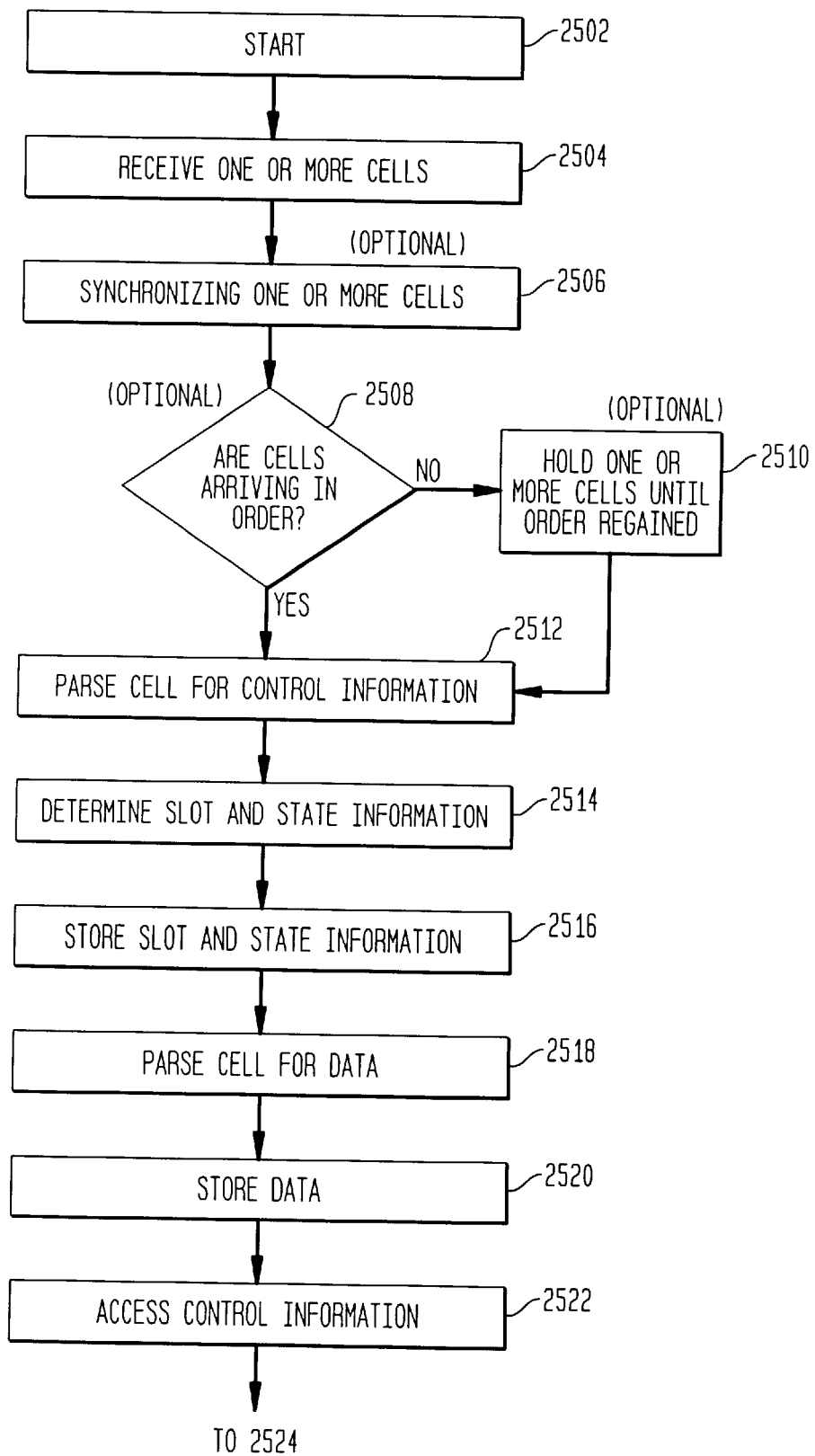
Figure 25B:
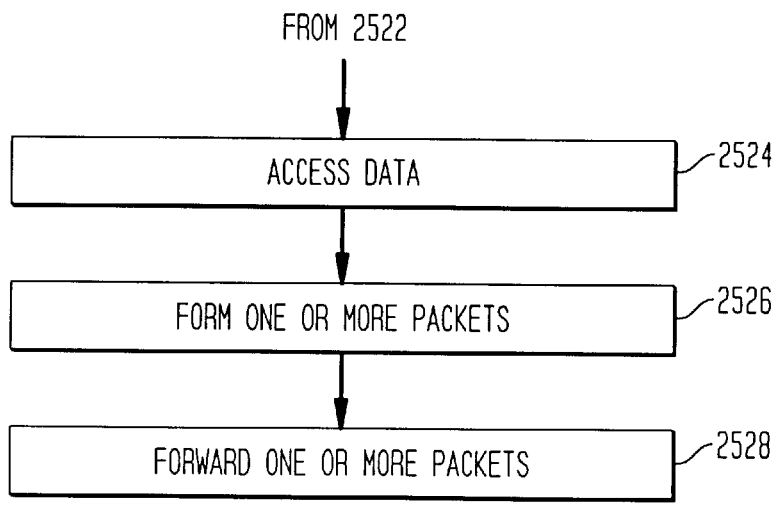

FIGS. 25A–B illustrates a detailed flow diagram of the decoding process of the bus translator according to one embodiment of the present invention.

Figure 26:
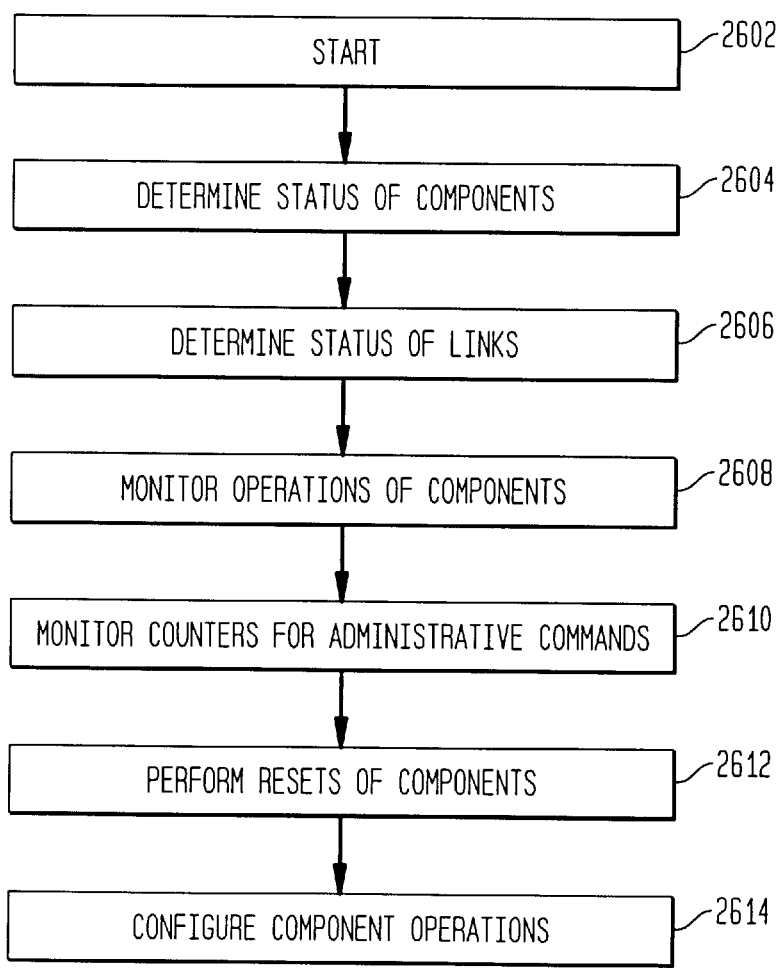

FIG. 26 illustrates a flow diagram of the administrating process of the bus translator according to one embodiment of the present invention.

FIGS. 27A–27E show a routine for processing data in port slice based on wide cell encoding and a flow control condition according to one embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents
I. Overview and Discussion
II. Terminology
III. Digital Switch Architecture
   A. Cross Point Architecture
   B. Port Slice Operation with Wide Cell Encoding and Flow Control
   C. Backplane Interface Adapter
   D. Overall Operation of Backplane Interface Adapter
   E. First Traffic Processing Path
   F. Narrow Cell Format
   G. Traffic Sorting
   H. Wide Striped Cell Generation
   I. Encoding Wide Striped Cells
   J. Initial Block Encoding
   K. End of Packet Encoding
   L. Switching Fabric Transmit Arbitration
   M. Cross Point Processing of Stripes
   N. Second Traffic Processing Path
   O. Cell Boundary Alignment
   P. Packet Alignment
   Q. Wide Striped Cell Size at Line Rate
   R. IBT and Packet Processing
   S. Narrow Cell and Packet Encoding Processes
   T. Administrative Process and Error Control
   U. Reset and Recovery Procedures
IV. Control Logic
V. Conclusion
I. Overview and Discussion The present invention is a high-performance digital switch. Blades are coupled through serial pipes to a switching fabric. Serial link technology is used in the switching fabric. Serial data streams, rather than parallel data streams, are switched through a loosely striped switching fabric. Blades output serial data streams in the serial pipes. A serial pipe can be a number of serial links coupling a blade to the switching fabric. The serial data streams represent an aggregation of input serial data streams provided through physical ports to a respective blade. Each blade outputs serial data streams with in-band control information in multiple stripes to the switching fabric. In one embodiment, the serial data streams carry packets of data in wide striped cells across multiple loosely-coupled stripes. Wide striped cells are encoded. In-band control information is carried in one or more blocks of a wide striped cell.

In one implementation, each blade of the switch is capable of sending and receiving 50 gigabit per second full-duplex traffic across the backplane. This is done to assure line rate, wire speed and non-blocking across all packet sizes.

The high-performance switch according to the present invention can be used in any switching environment, including but not limited to, the Internet, an enterprise system, Internet service provider, and any protocol layer switching (such as, Layer 2, Layer 3, or Layers 4–7 switching).

The present invention is described in terms of this example environment. Description in these terms is provided for convenience only. It is not intended that the invention be limited to application in these example environments. In fact, after reading the following description, it will become apparent to a person skilled in the relevant art how to implement the invention in alternative environments known now or developed in the future.

II. Terminology

To more clearly delineate the present invention, an effort is made throughout the specification to adhere to the following term definitions as consistently as possible.

The terms "switch fabric" or "switching fabric" refer to a switchable interconnection between blades, The switch fabric can be located on a backplane, a blade, more than one blade, a separate unit from the blades, or on any combination thereof.

The term "packet processor" refers to any type of packet processor, including but not limited to, an Ethernet packet processor. A packet processor parses and determines where to send packets.

The term "serial pipe" refers to one or more serial links. In one embodiment, not intended to limit the invention, a serial pipe is a 10 Gb/s serial pipe and includes four 2.5 Gb/s serial links.

The term "serial link" refers to a data link or bus carrying digital data serially between points. A serial link at a relatively high bit rate can also be made of a combination of lower bit rate serial links.

The term "stripe" refers to one data slice of a wide cell. The term "loosely-coupled" stripes refers to the data flow in stripes which is autonomous with respect to other stripes. Data flow is not limited to being fully synchronized in each of the stripes, rather, data flow proceeds independently in each of the stripes and can be skewed relative to other stripes.

III. Digital Switch Architecture

Figure 1:
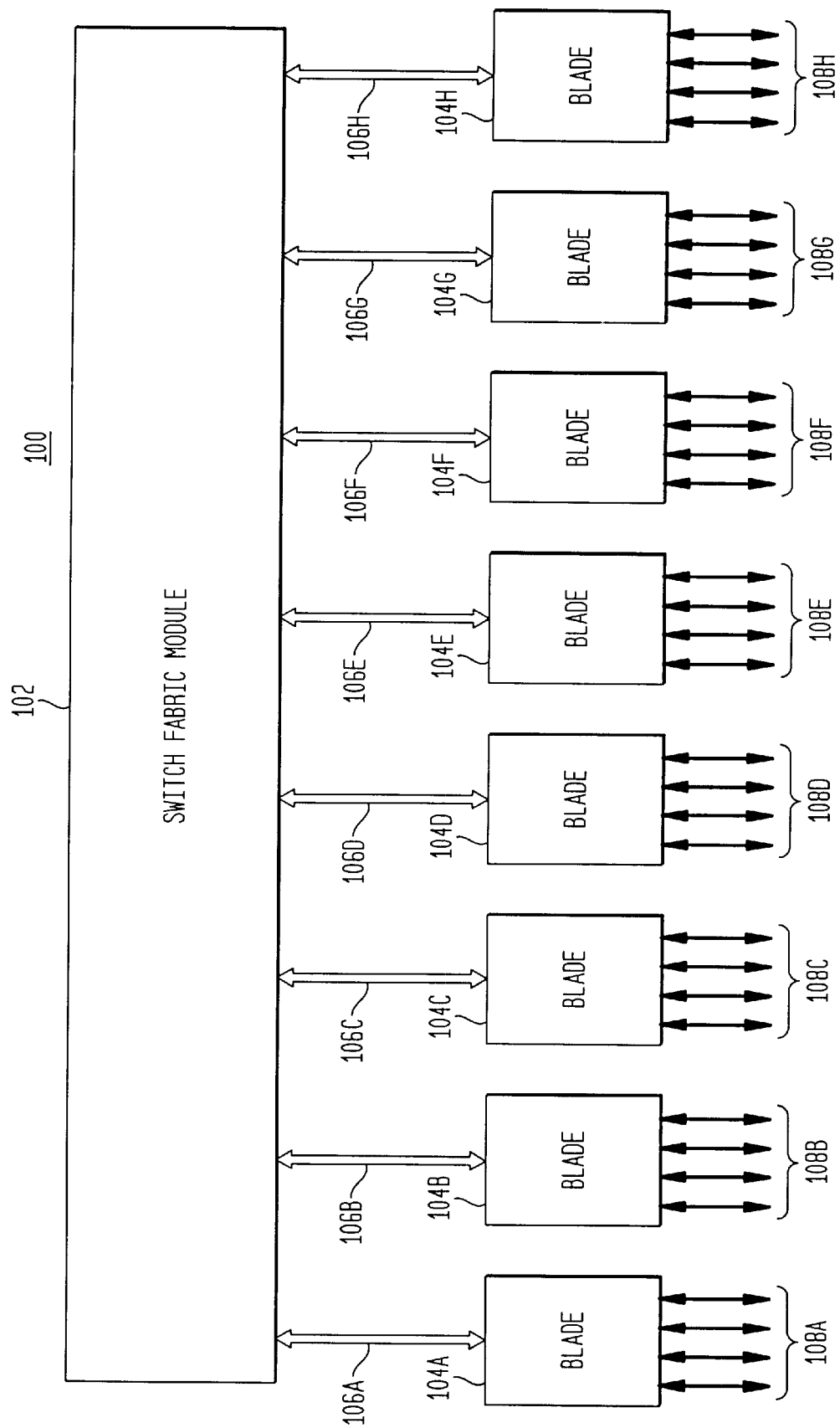
FIG. 1 is a diagram of a high-performance network switch according to an embodiment of the present invention.

An overview of the architecture of the switch 100 of the invention is illustrated in FIG. 1. Switch 100 includes a switch fabric 102 (also called a switching fabric or switching fabric module) and a plurality of blades 104. In one embodiment of the invention, switch 100 includes 8 blades 104a–104h. Each blade 104 communicates with switch fabric 102 via serial pipe 106. Each blade 104 further includes a plurality of physical ports 108 for receiving various types of digital data from one or more network connections.

In a preferred embodiment of the invention, switch 100 having 8 blades is capable of switching of 400 gigabits per second (Gb/s) full-duplex traffic. As used herein, all data rates are full-duplex unless indicated otherwise. Each blade 104 communicates data at a rate of 50 Gb/s over serial pipe 106.

Figure 2:
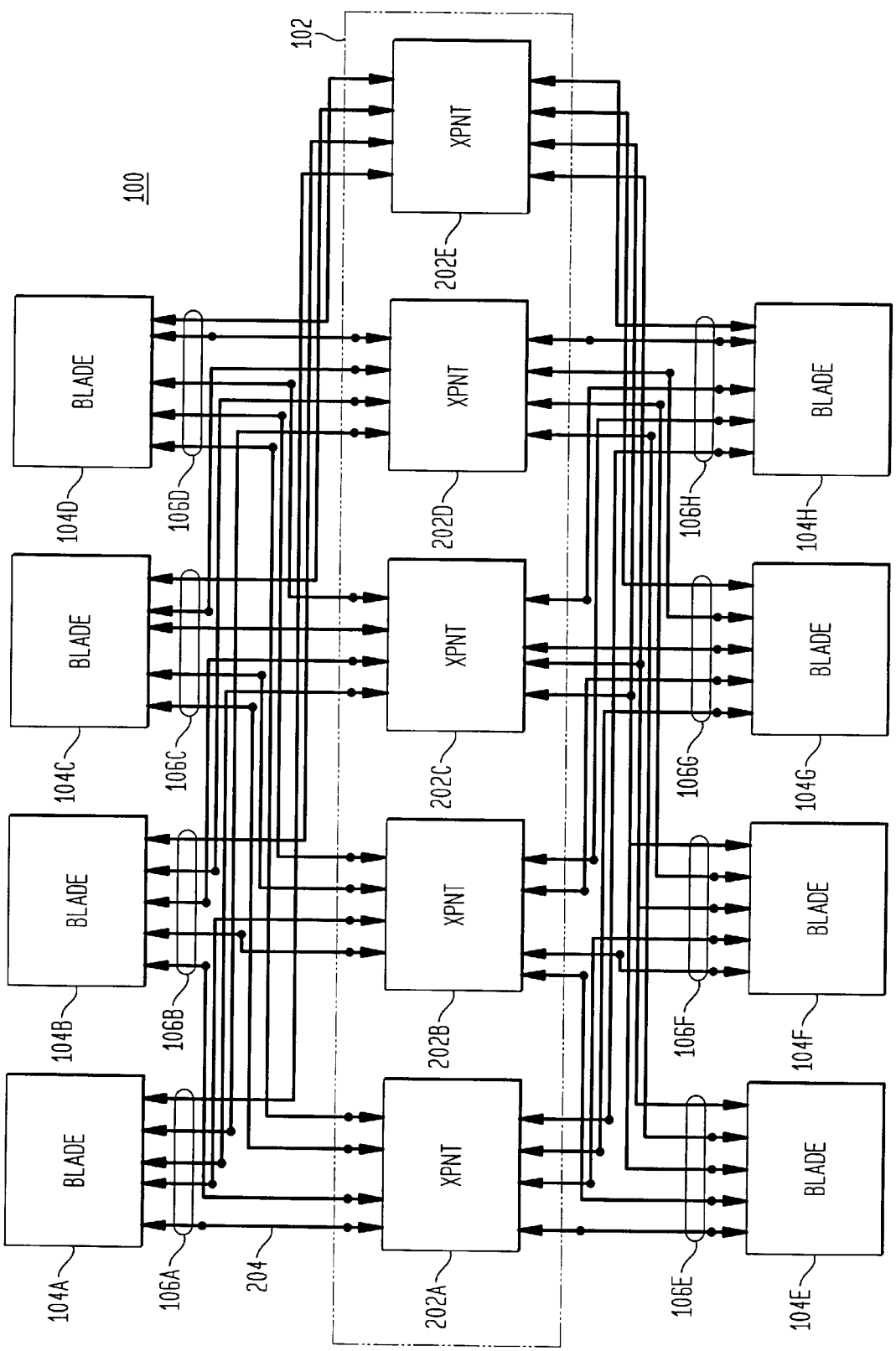
FIG. 2 is a diagram of a high-performance network switch showing a switching fabric having cross point switches coupled to blades according to an embodiment of the present invention.

Switch 100 is shown in further detail in FIG. 2. As illustrated, switch fabric 102 comprises five cross points 202. Data sent and received between each blade and switch fabric 102 is striped across the five cross point chips 202A–202E. Each cross point 202A–202E then receives one stripe or ⅕ of the data passing through switch fabric 102. As depicted in FIG. 2, each serial pipe 106 of a blade 104 is made up of five serial links 204. The five serial links 204 of each blade 104 are coupled to the five corresponding cross points 202. In one example, each of the serial links 204 is a 10 G serial link, such as, a 10 G serial link made up of 4–2.5 Gb/s serial links. In this way, serial link technology is used to send data across the backplane 102.

Each cross point 202A–202E is an 8-port cross point. In one example, each cross point 2202A–E receives eight 10 streams of data. Each stream of data corresponds to a particular stripe. The stripe has data in a wide-cell format which includes, among other things, a destination port number (also called a destination slot number) and special in-band control information. The in-band control information includes special K characters, such as, a K0 character and K1 character. The K0 character delimits a start of new cell within a stripe. The K1 character delimits an end of a packet within the stripe. Such encoding within each stripe, allows each cross point 202A–202E to operate autonomously or independently of other cross points. In this way, the cross points 202A–202E and their associated stripes are loosely-coupled.

In each cross point 202, there are a set of data structures, such as data FIFOs (First in First out data structures). The data structures store data based on the source port and the destination port. In one embodiment, for an 8-port cross point, 56 data FIFOs are used. Each data FIFO stores data associated with a respective source port and destination port. Packets coming to each source port are written to the data FIFOs which correspond to a source port and a destination port associated with the packets. The source port is associated with the port (and port slice) on which the packets are received. The destination port is associated with a destination port or slot number which is found in-band in data sent in a stripe to a port.

In embodiments of the present invention, the switch size is defined as one cell and the cell size is defined to be either 8, 28, 48, 68, 88, 108, 128, or 148 bytes. Each port (or port slice) receives and sends serial data at a rate of 10 Gb/s from respective serial links. Each cross point 202A–202E has a 160 Gb/s switching capacity (160 Gb/s=10 Gb/s*8 ports*2 directions full-duplex). Such cell sizes, serial link data rate, and switching capacity are illustrative and not necessarily intended to limit the present invention. Cross-point architecture and operation is described further below.

In attempting to increase the throughput of switches, conventional wisdom has been to increase the width of data buses to increase the "parallel processing" capabilities of the switch and to increase clock rates. Both approaches, however, have met with diminishing returns. For example, very wide data buses are constrained by the physical limitations of circuit boards, Similarly, very high clock rates are limited by characteristics of printed circuit boards. Going against conventional wisdom, the inventors have discovered that significant increases in switching bandwidth could be obtained using serial link technology in the backplane.

In the preferred embodiment, each serial pipe 106 is capable of carrying full-duplex traffic at 50 Gb/s, and each serial link 204 is capable of carrying full-duplex traffic at 10 Gb/s. The result of this architecture is that each of the five cross points 202 combines five 10 gigabit per second serial links to achieve a total data rate of 50 gigabits per second for each serial pipe 106. Thus, the total switching capacity across backplane 102 for eight blades is 50 gigabits per second times eight times two (for duplex) or 800 gigabits per second. Such switching capacities have not been possible with conventional technology using synched parallel data buses in a switching fabric.

An advantage of such a switch having a 50 Gb/s serial pipe to backplane 102 from a blade 104 is that each blade 104 can support across a range of packet sizes four 10 Gb/s Ethernet packet processors at line rate, four Optical Channel OC-192C at line rate, or support one OC-768C at line rate. The invention is not limited to these examples. Other configurations and types of packet processors and can be used with the switch of the present invention as would be apparent to a person skilled in the art given this description.

Referring now to FIG. 3A, the architecture of a blade 104 is shown in further detail. Blade 104 comprises a backplane interface adapter (BIA) 302 (also referred to as a "super backplane interface adapter" or SBIA), a plurality of Integrated Bus Translators (IBT) 304 and a plurality of packet processors 306. BIA 302 is responsible for striping the data across the five cross points 202 of backplane 102. In a preferred embodiment, BIA 302 is implemented as an application-specific circuit (ASIC). BIA 302 receives data from packet processors 306 through IBTs 304 (or directly from compatible packet processors), BIA 302 may pass the data to backplane 102 or may perform local switching between the local ports on blade 104. In a preferred embodiment, BIA 302 is coupled to four serial links 308. Each serial link 308 is coupled to an IBT 304.

Each packet processor 306 includes one or more physical ports. Each packet processor 306 receives inbound packets from the one or more physical ports, determines a destination of the inbound packet based on control information, provides local switching for local packets destined for a physical port to which the packet processor is connected, formats packets destined for a remote port to produce parallel data and switches the parallel data to an IBT 304. Each IBT 304 receives the parallel data from each packet processor 306. IBT 304 then converts the parallel data to at least one serial bit streams. IBT 304 provides the serial bit stream to BIA 302 via a pipe 308, described herein as one or more serial links. In a preferred embodiment, each pipe 308 is a 10 Gb/s XAUI interface.

In the example illustrated in FIG. 3A, packet processors 306C and 306D comprise 24—ten or 100 megabit per second Ethernet ports, and two 1000 megabit per second or 1 Gb/s Ethernet ports. Before the data is converted, the input data packets are converted to 32-bit parallel data clock data 133 MHz to achieve a four Gb/s data rate. The data is placed in cells (also called "narrow cells") and each cell includes a header which merges control signals in-band with the data stream. Packets are interleaved to different destination slots every 32 by cell boundary.

Also in the example of FIG. 3A, IBT 304C is connected to packet processors 306C and 306D. In this example, IBT 304A is connected to a packet processor 306A. This may be, for example, a ten gigabit per second OC-192 packet processor. In these examples, each IBT 304 will receive as its input a 64-bit wide data stream clocked at 156.25 MHz. Each IBT 304 will then output a 10 gigabit per second serial data stream to BIA 302. According to one narrow cell format, each cell includes a 4 byte header followed by 32 bytes of data. The 4 byte header takes one cycle on the four XAUI lanes. Each data byte is serialized onto one XAUI lane.

BIA 302 receives the output of IBTs 304A–304D. Thus, BIA 302 receives 4 times 10 Gb/s of data. Or alternatively, 8 times 5 gigabit per second of data. BIA 302 runs at a clock speed of 156.25 MHz. With the addition of management overhead and striping, BIA 302 outputs 5 times 10 gigabit per second data streams to the five cross points 202 in backplane 102.

BIA 302 receives the serial bit streams from IBTs 304, determines a destination of each inbound packet based on packet header information, provides local switching between local IBTs 304, formats data destined for a remote port, aggregates the serial bit streams from IBTs 304 and produces an aggregate bit stream. The aggregated bit stream is then striped across the five cross points 202A–202E.

FIG. 3B shows a configuration of blade 104 according another embodiment of the present invention. In this configuration, BIA 302 receives output on serial links from a 10 Gb/s packet processor 316A, IBT 304C, and an Optical Channel OC-192C packet processor 316B. IBT 304 is further coupled to packet processors 106C, 166D as described above. 10 Gb/s packet processor 316A outputs a serial data stream of narrow input cells carrying packets of data to BIA 302 over serial link 318A. IBT 304C outputs a serial data stream of narrow input cells carrying packets of data to BIA 302 over serial link 308C.

Optical Channel OC-192C packet processor 316B outputs two serial data streams of narrow input cells carrying packets of data to BIA 302 over two serial links 318B, 318C.

A. Cross Point Architecture

Figure 4:
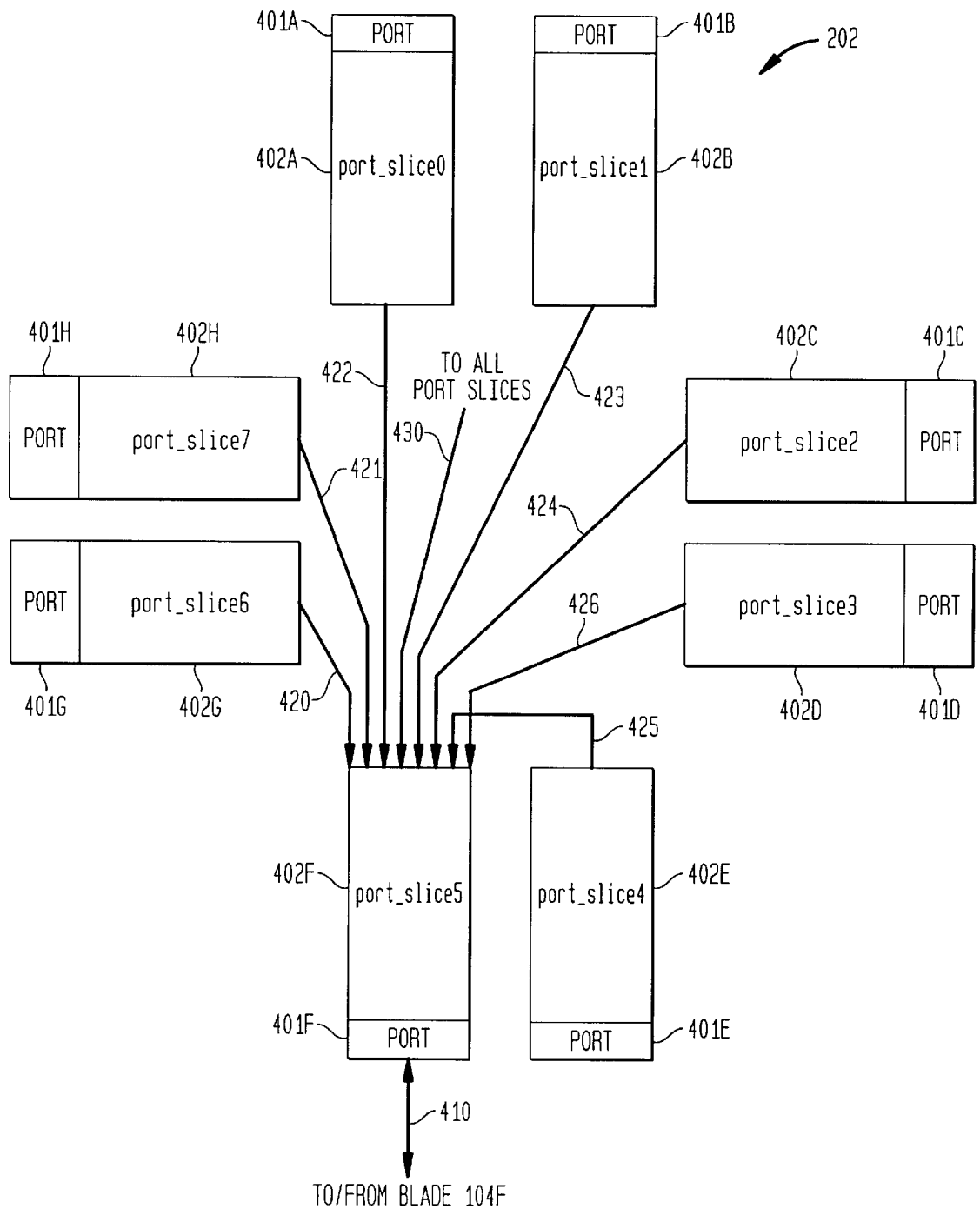
FIG. 4 is a diagram of the architecture of a cross point switch with port slices according to an embodiment of the present invention.

FIG. 4 illustrates the architecture of a cross point 202. Cross point 202 includes eight ports 401A–401H coupled to eight port slices 402A–402H. As illustrated, each port slice 402 is connected by a wire 404 (or other connective media) to each of the other seven port slices 402. Each port slice 402 is also coupled to through a port 401 a respective blade 104. To illustrate this, FIG. 4 shows connections for port 401F and port slice 402F (also referred to as port slice 5). For example, port 401F is coupled via serial link 410 to blade 104F. Serial link 410 can be a 10 G full-duplex serial link.

Port slice 402F is coupled to each of the seven other port slices 402A–402E and 402G–402H through links 420–426. Links 420–426 route data received in the other port slices 402A–402P and 402G–402H which has a destination port number (also called a destination slot number) associated with a port of port slice 402F (i.e. destination port number 5). Finally, port slice 402F includes a link 430 that couples the port associated with port slice 402F to the other seven port slices. Link 430 allows data received at the port of port slice 402F to be sent to the other seven port slices. In one embodiment, each of the links 420–426 and 430 between the port slices are buses to carry data in parallel within the cross point 202. Similar connections (not shown in the interest of clarity) are also provided for each of the other port slices 402A–402E, 402G and 402H.

Figure 5:
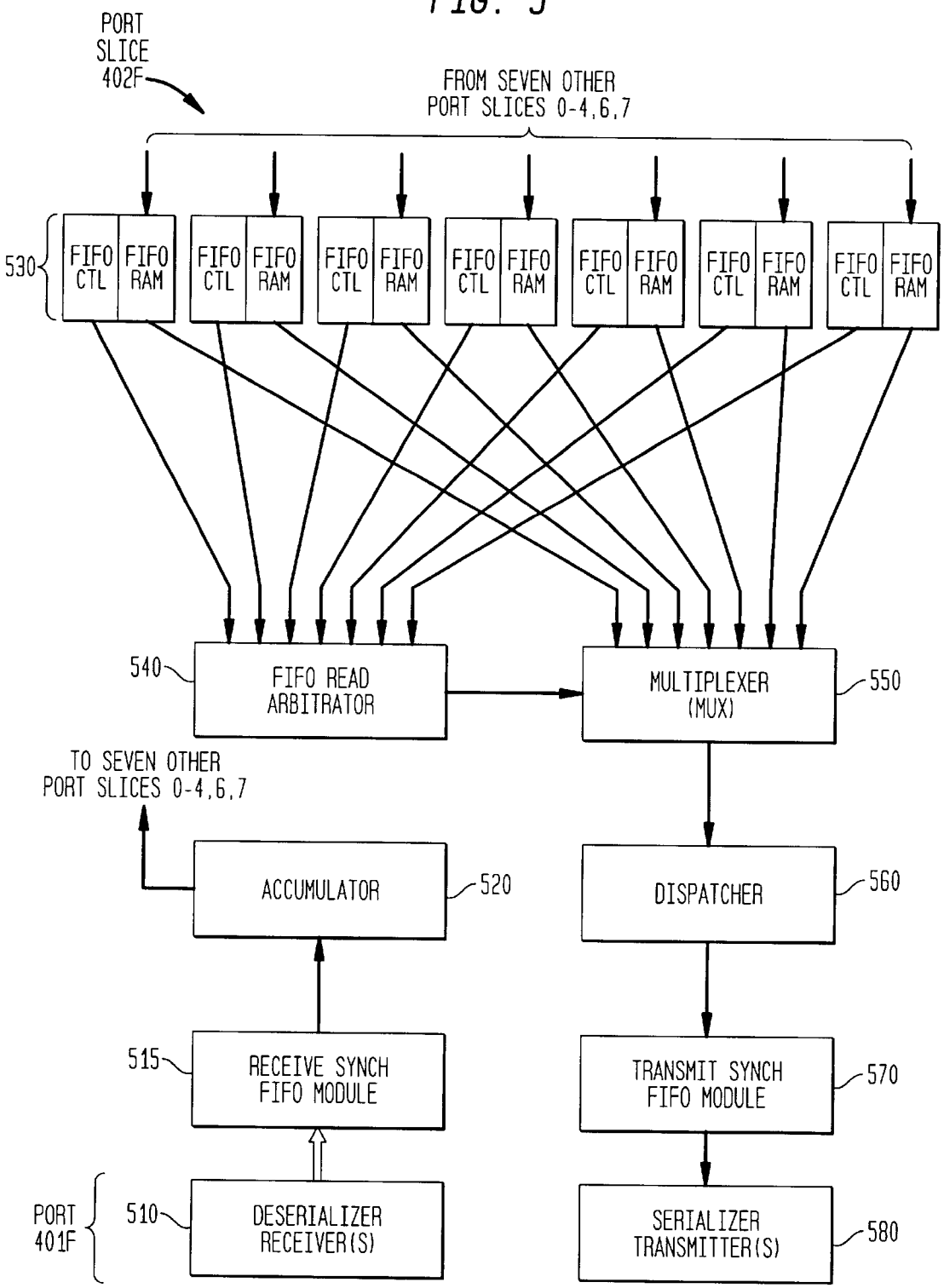
FIG. 5 is a diagram of the architecture of a port slice according to an embodiment of the present invention.

FIG. 5 illustrates the architecture of port 401F and port slice 402F in further detail. The architecture of the other ports 401A–401E, 401G, and 401H and port slices 402A–402E, 402G and 402H is similar to port 401F and port slice 402F. Accordingly, only port 401F and port slice 402F need be described in detail. Port 401F includes one or more deserializer receiver(s) 510 and serializer transmitter(s) 580. In one embodiment, deserializer receiver(s) 510 and serializer transmitter(s) 580 are implemented as serializer/deserializer circuits (SERDES) that convert data between serial and parallel data streams. In embodiments of the invention, port 401F can be part of port slice 402F on a common chip, or on separate chips, or in separate units.

Port slice 402F includes a receive synch FIFO module 515 coupled between deserializer receiver(s) 510 and accumulator 520. Receive synch FIFO module 515 stores data output from deserializer receivers 510 corresponding to port slice 402F. Accumulator 520 writes data to an appropriate data FIFO (not shown) in the other port slices 402A–402E, 402G, and 402H based on a destination slot or port number in a header of the received data.

Port slice 402F also receives data from other port slices 402A–402E, 402G, and 402H. This data corresponds to the data received at the other seven ports of port slices 402A–402E, 402G, and 402H which has a destination slot number corresponding to port slice 402F. Port slice 402F includes seven data FIFOs 530 to store data from corresponding port slices 402A–402E, 402G, and 402H. Accumulators (not shown) in the seven port slices 402A–402E, 402G, and 402H extract the destination slot number associated with port slice 402F and write corresponding data to respective ones of seven data FIFOs 530 for port slice 402F. As shown in FIG. 5, each data FIFO 530 includes a FIFO controller and FIFO random access memory (RAM). The FIFO controllers are coupled to a FIFO read arbitrator 540. FIFO RAMs are coupled to a multiplexer 550. FIFO read arbitrator 540 is further coupled to multiplexer 550. Multiplexer 550 has an output coupled to dispatcher 560. Dispatch 560 has an output coupled to transmit synch FIFO module 570. Transmit synch FIFO module 570 has an output coupled to serializer transmitter(s) 580.

During operation, the FIFO RAMs accumulate data. After a data FIFO RAM has accumulated one cell of data, its corresponding FIFO controller generates a read request to FIFO read arbitrator 540. FIFO read arbitrator 540 processes read requests from the different FIFO controllers in a desired order, such as a round-robin order. After one cell of data is read from one FIFO RAM, FIFO read arbitrator 540 will move on to process the next requesting FIFO controller. In this way, arbitration proceeds to serve different requesting FIFO controllers and distribute the forwarding of data received at different source ports. This helps maintain a relatively even but loosely coupled flow of data through cross points 202.

To process a read request, FIFO read arbitrator 540 switches multiplexer 550 to forward a cell of data from the data FIFO RAM associated with the read request to dispatcher 560. Dispatcher 560 outputs the data to transmit synch FIFO 570. Transmit synch FIFO 570 stores the data until sent in a serial data stream by serializer transmitter(s) 590 to blade 104F.

B. Port Slice Operation with Wide Cell Encoding and Flow Control

According to a further embodiment, a port slice operates with respect to wide cell encoding and a flow control condition. FIGS. 27A–27E show a routine 2700 for processing data in port slice based on wide cell encoding and a flow control condition (steps 2710–2790). In the interest of brevity, routine 2700 is described with respect to an example implementation of cross point 202 and an example port slice 402F. The operation of the other port slices 402A–402E, 402G and 402H is similar.

In step 2710, entries in receive synch FIFO 515 are managed. In one example, receive synch FIFO module 515 is an 8-entry FIFO with write pointer and read pointer initialized to be 3 entries apart. Receive synch FIFO module 515 writes 64-bit data from a SERDES deserialize receiver 510, reads 64-bit data from a FIFO with a clock signal and delivers data to accumulator 520, and maintains a three entry separation between read/write pointers by adjusting the read pointer when the separation becomes less than or equal to 1.

In step 2720, accumulator 520 receives two chunks of 32-bit data are receive from receive synch FIFO 515. Accumulator 520 detects a special character K0 in the first bytes of first chunk and second chunk (step 2722). Accumulator 520 then extracts a destination slot number from the state field in the header if K0 is detected (step 2724).

Figure 27A:
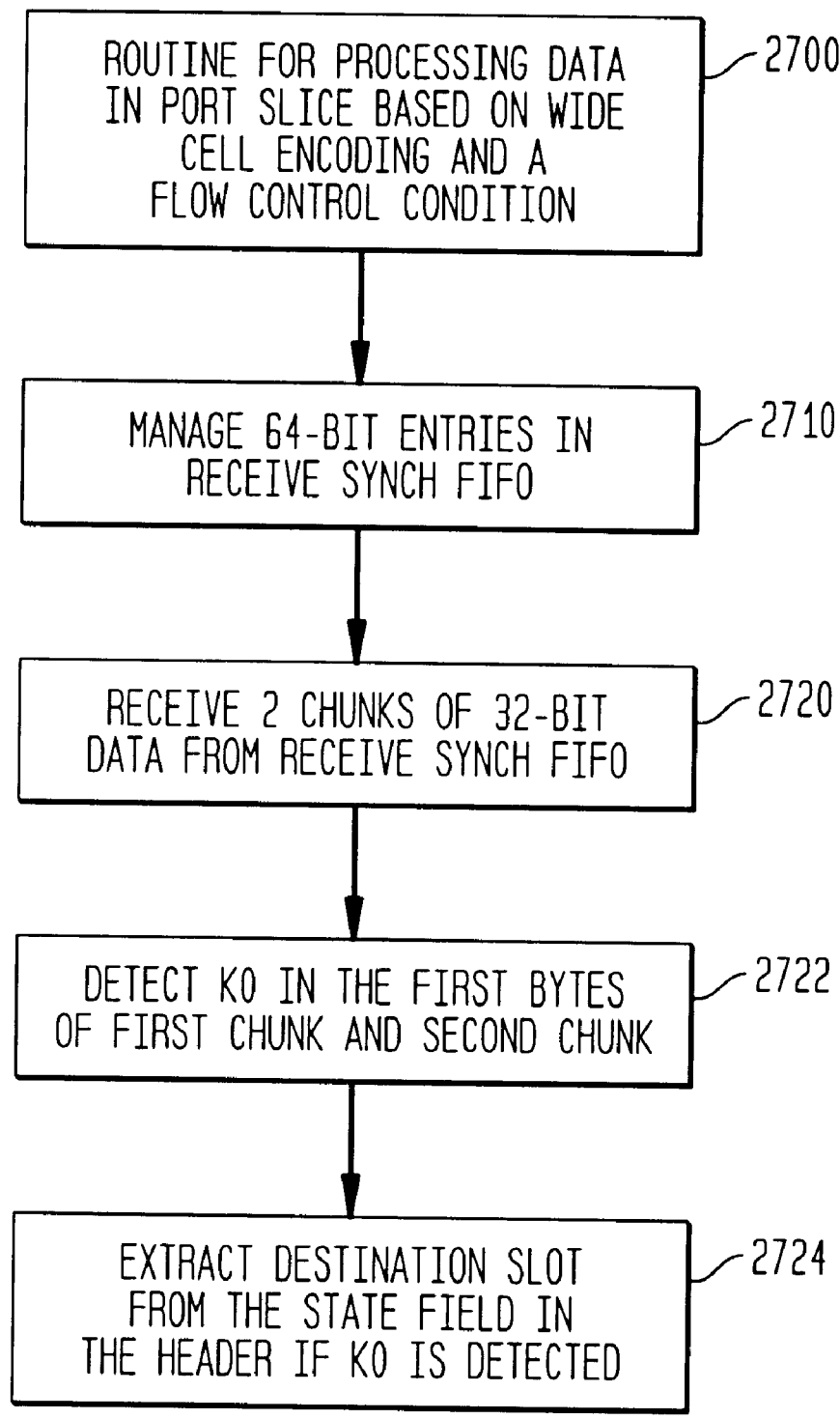
Figure 27B:
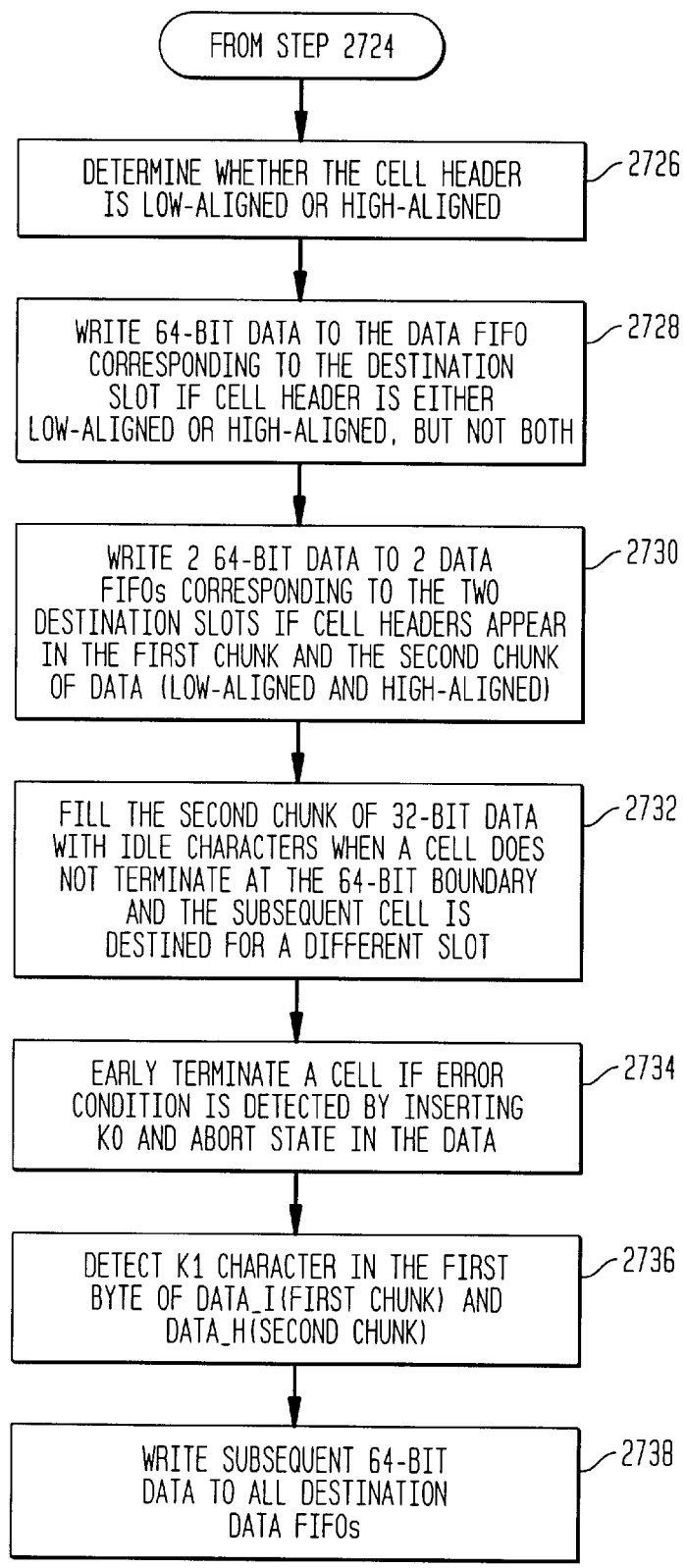

As shown in FIG. 27B, accumulator 520 further determines whether the cell header is low-aligned or high-aligned (step 2726). Accumulator 520 writes 64-bit data to the data FIFO corresponding to the destination slot if cell header is either low-aligned or high-aligned, but not both (step 2728). In step 2730, accumulator 520 writes 2 64-bit data to 2 data FIFOs corresponding to the two destination slots (or ports) if cell headers appear in the first chunk and the second chunk of data (low-aligned and high-aligned). Accumulator 520 then fill the second chunk of 32-bit data with idle characters when a cell does not terminate at the 64-bit boundary and the subsequent cell is destined for a different slot (step 2732). Accumulator 520 performs an early termination of a cell if an error condition is detected by inserting K0 and ABORT state information in the data (step 2734). When accumulator 520 detects a K1 character in the first byte of data_l (first chunk) and data_h (second chunk) (step 2736), and accumulator 520 writes subsequent 64-bit data to all destination data FIFOs (step 2738).

Figure 27C:
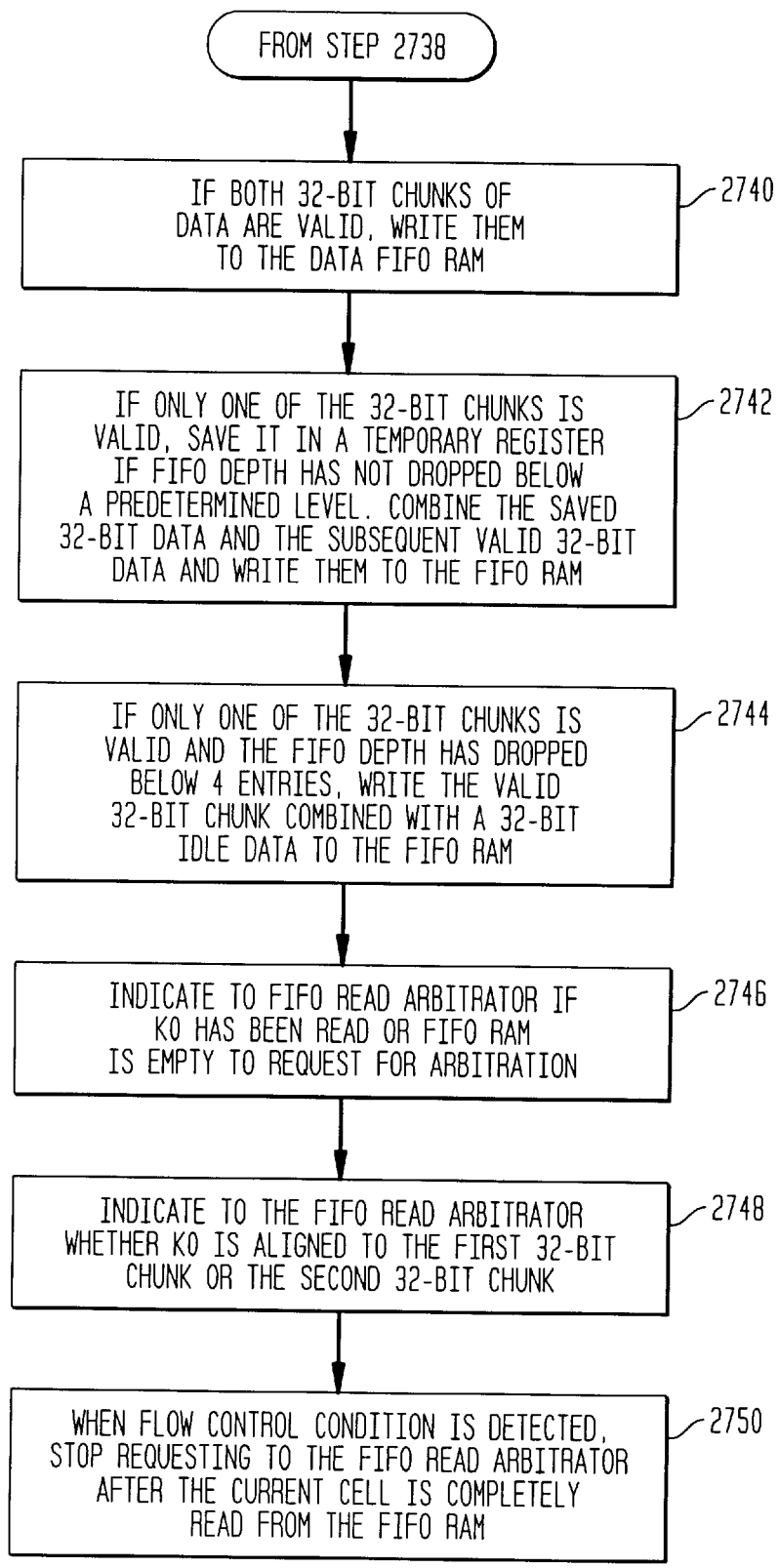

As shown in FIG. 27C, in step 2740, if two 32-bit chunks of data are valid, then they are written to data FIFO RAM in one of data FIFOs 530. In step 2742, if only one of the 32-bit chunks is valid, it is saved in a temporary register if FIFO depth has not dropped below a predetermined level. The saved 32-bit data and the subsequent valid 32-bit data are combined and written to the FIFO RAM. If only one of the 32-bit chunks is valid and the FIFO depth has dropped below 4 entries, the valid 32-bit chunk is combined with 32-bit idle data and written to the PIPO PAM (step 2744).

In step 2746, a respective FIFO controller indicates to FIFO read arbitrator 540 if K0 has been read or FIFO RAM is empty. This indication is a read request for arbitration. In step 2748, a respective FIFO controller indicates to FIFO read arbitrator 540 whether K0 is aligned to the first 32-bit chunk or the second 32-bit chunk. When flow control from an output port is detected (such as when a predetermined flow control sequence of one or more characters is detected), FIFO controller stops requesting the FIFO read arbitrator 540 after the current cell is completely read from the FIFO PAM (step 2750).

Figure 27D:
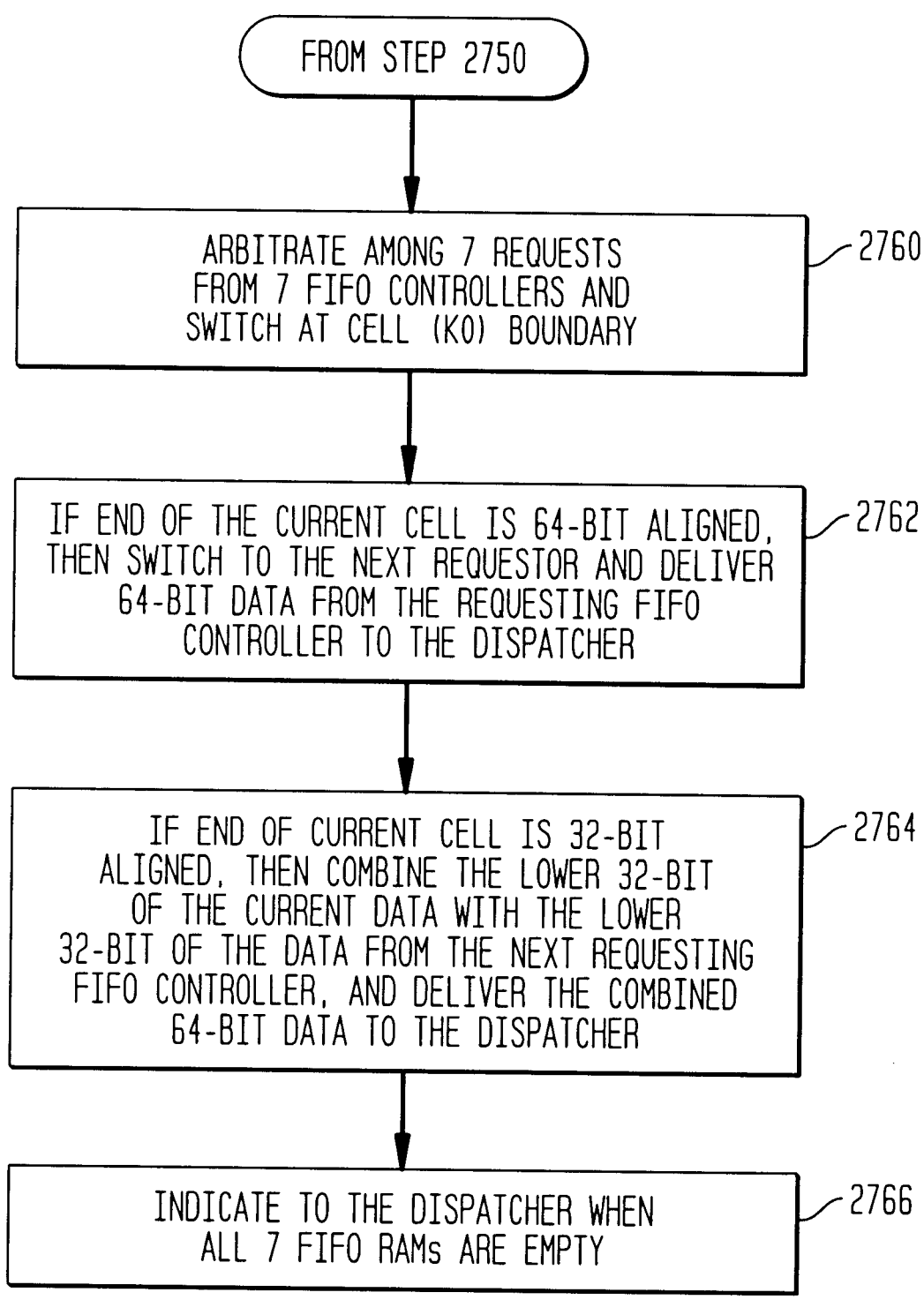

As shown in FIG. 27D, in step 2760, FIFO read arbitrator 540 arbitrates among 7 requests from 7 FIFO controllers and switches at a cell (K0) boundary. If end of the current cell is 64-bit aligned, then FIFO read arbitrator 540 switches to the next requestor and delivers 64-bit data from FIFO RAM of the requesting FIFO controller to the dispatcher 560 (step 2762). If end of current cell is 32-bit aligned, then FIFO read arbitrator 540 combines the lower 32-bit of the current data with the lower 32-bit of the data from the next requesting FIFO controller, and delivers the combined 64-bit data to the dispatcher 560 (step 2764). Further, in step 2766, FIFO read arbitrator 540 indicates to the dispatcher 560 when all 7 FIFO RAMs are empty.

Figure 27E:
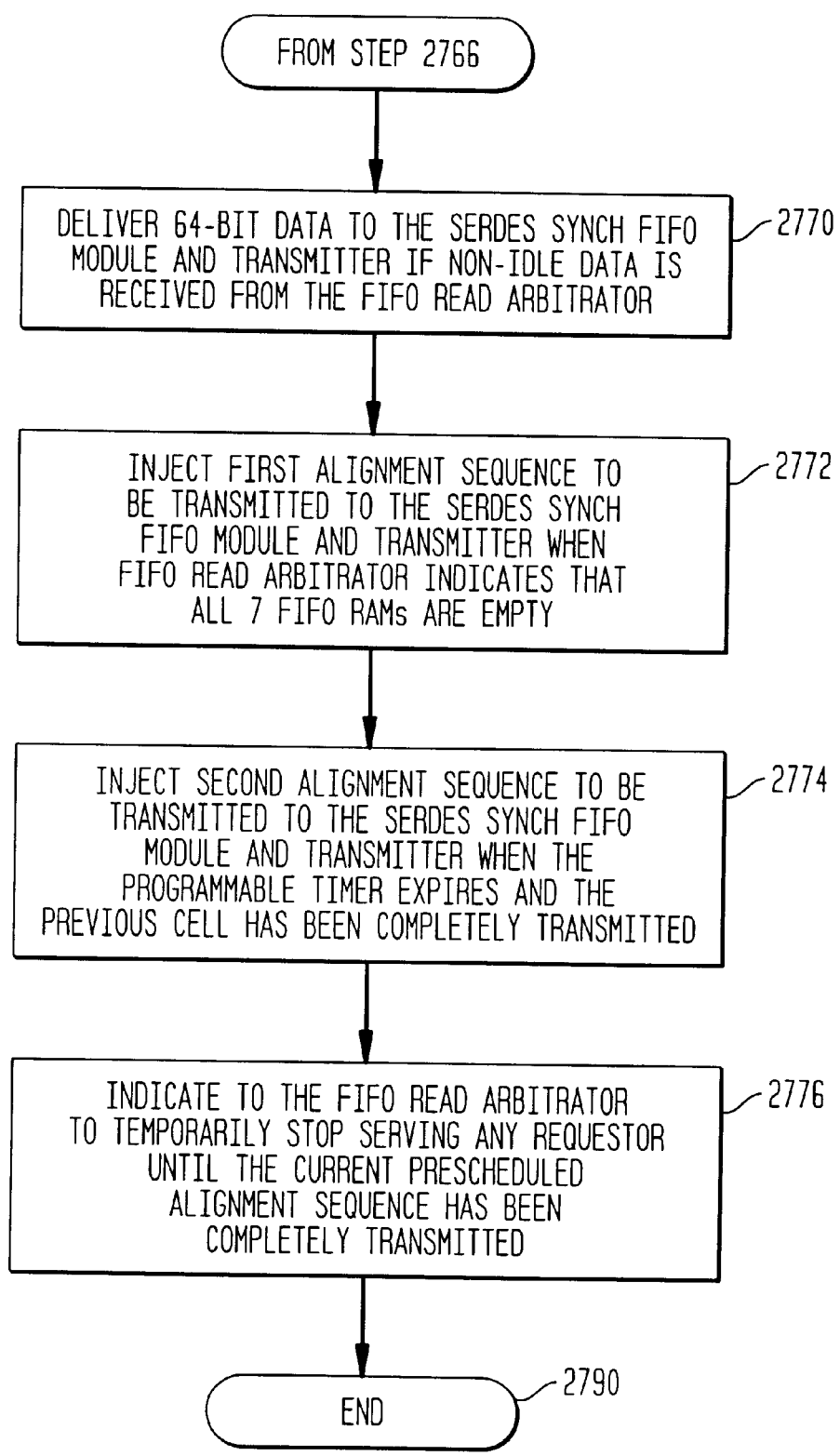

As shown in FIG. 27E, in step 2770, dispatcher 560 delivers 64-bit data to the SERDES synch FIFO module 570 and in turn to serializer transmitter(s) 580, if non-idle data is received from the FIFO read arbitrator 540. Dispatcher 560 injects a first alignment sequence to be transmitted to the SERDES synch FIFO module 570 and in turn to transmitter 580 when FIFO read arbitrator indicates that all 7 FIFO RAMs are empty (step 2772). Dispatcher 560 injects a second alignment sequence to be transmitted to the SERDES synch FIFO module 570 and in turn to transmitter 580 when the programmable timer expires and the previous cell has been completely transmitted (step 2774). Dispatcher 560 indicates to the FIFO read arbitrator 540 to temporarily stop serving any requestor until the current pre-scheduled alignment sequence has been completely transmitted (step 2776). Control ends (step 2790).

C. Backplane Interface Adapter

Figure 6:
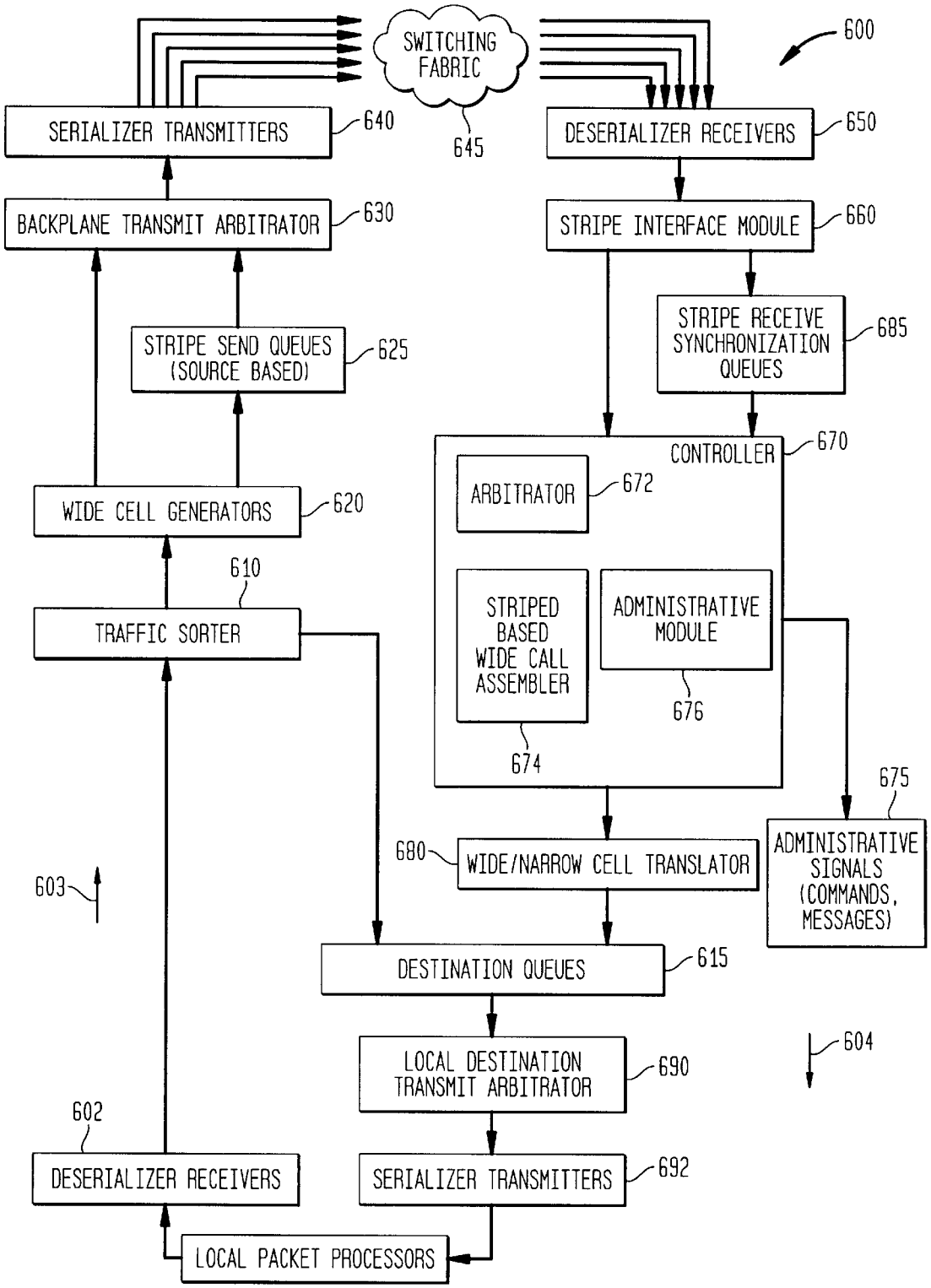
FIG. 6 is a diagram of a backplane interface adapter according to an embodiment of the present invention.
Figure 7:
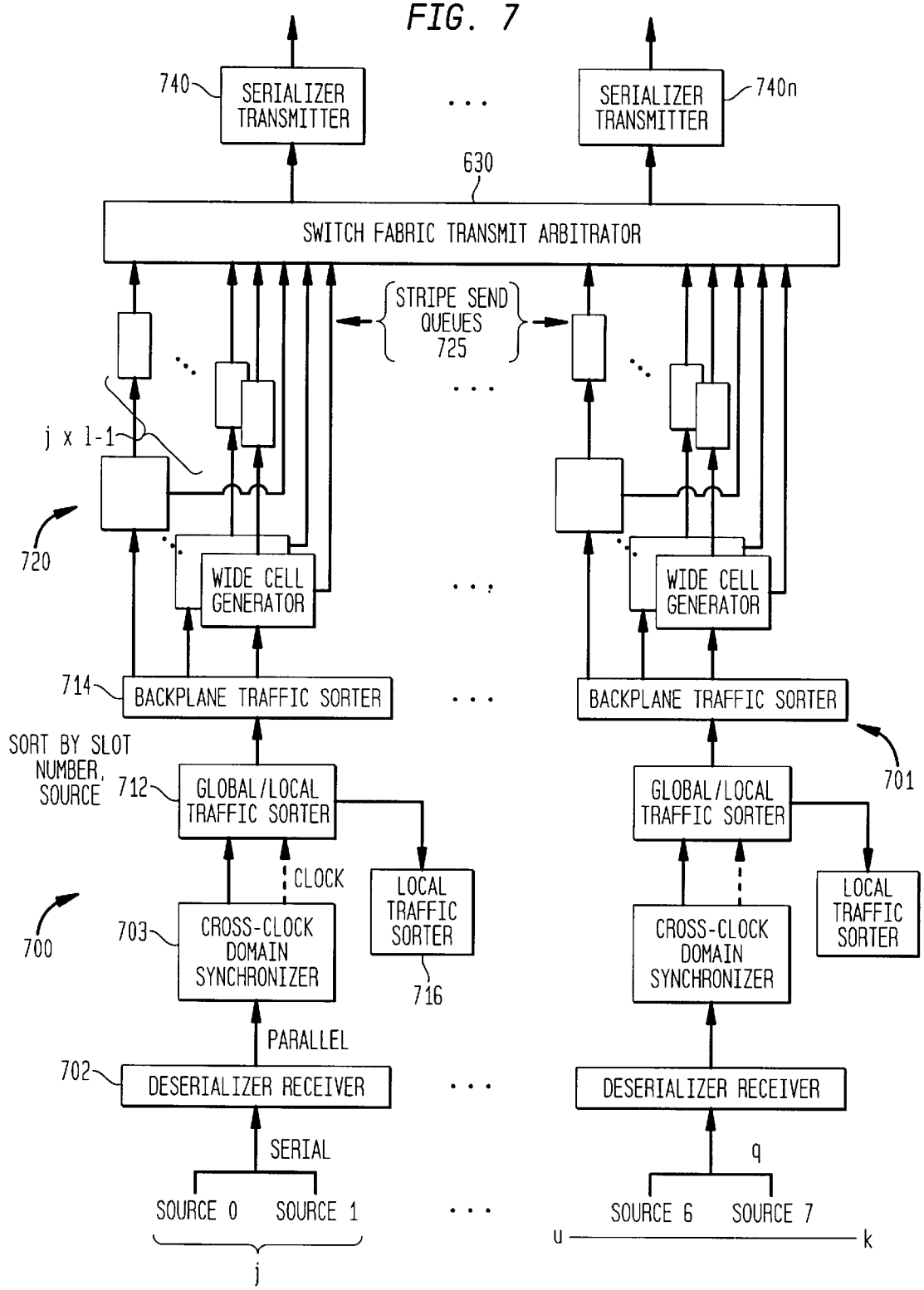
FIG. 7 is a diagram showing a traffic processing path for local serial traffic received at a backplane interface adapter according to an embodiment of the present invention.
Figure 8:
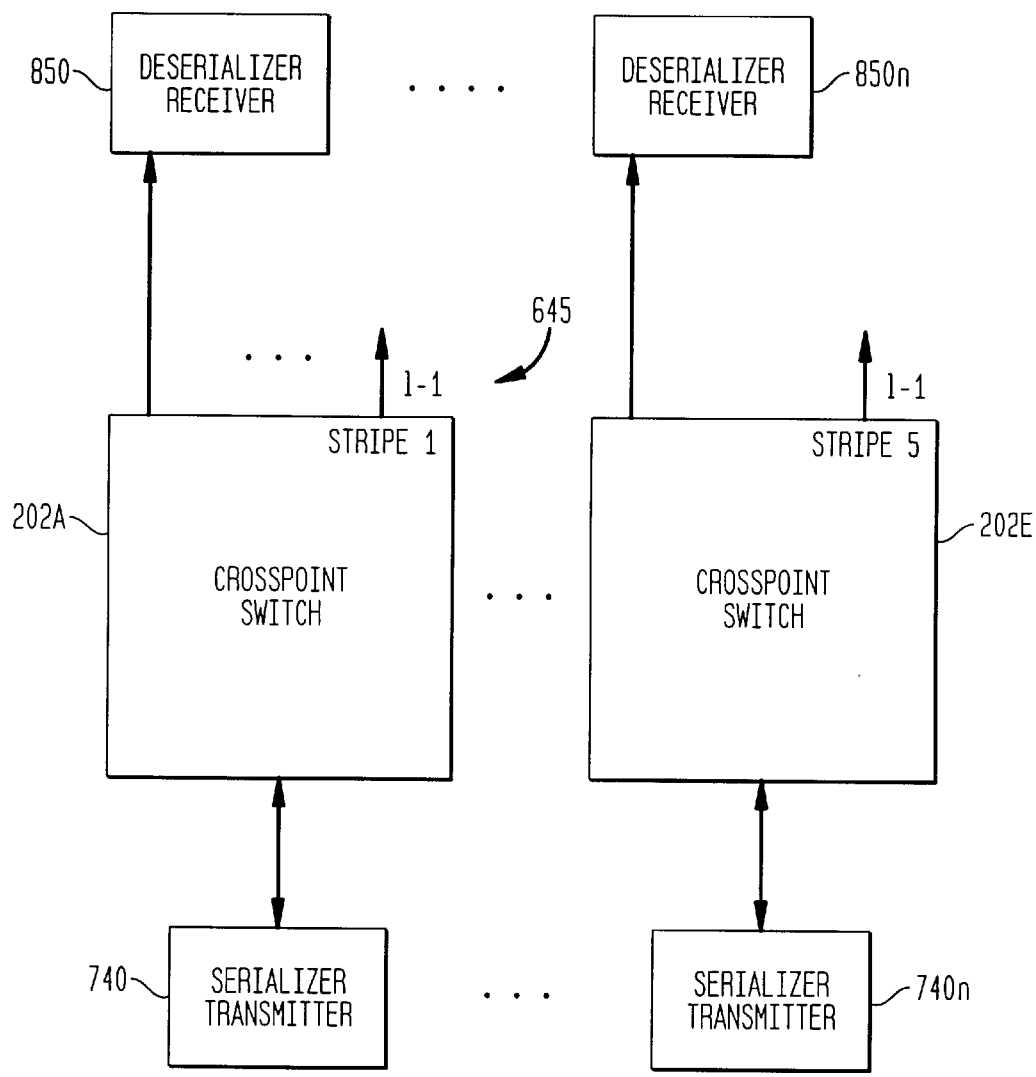
FIG. 8 is a diagram of an example switching fabric coupled to a backplane interface adapter according to an embodiment of the present invention.
Figure 9:
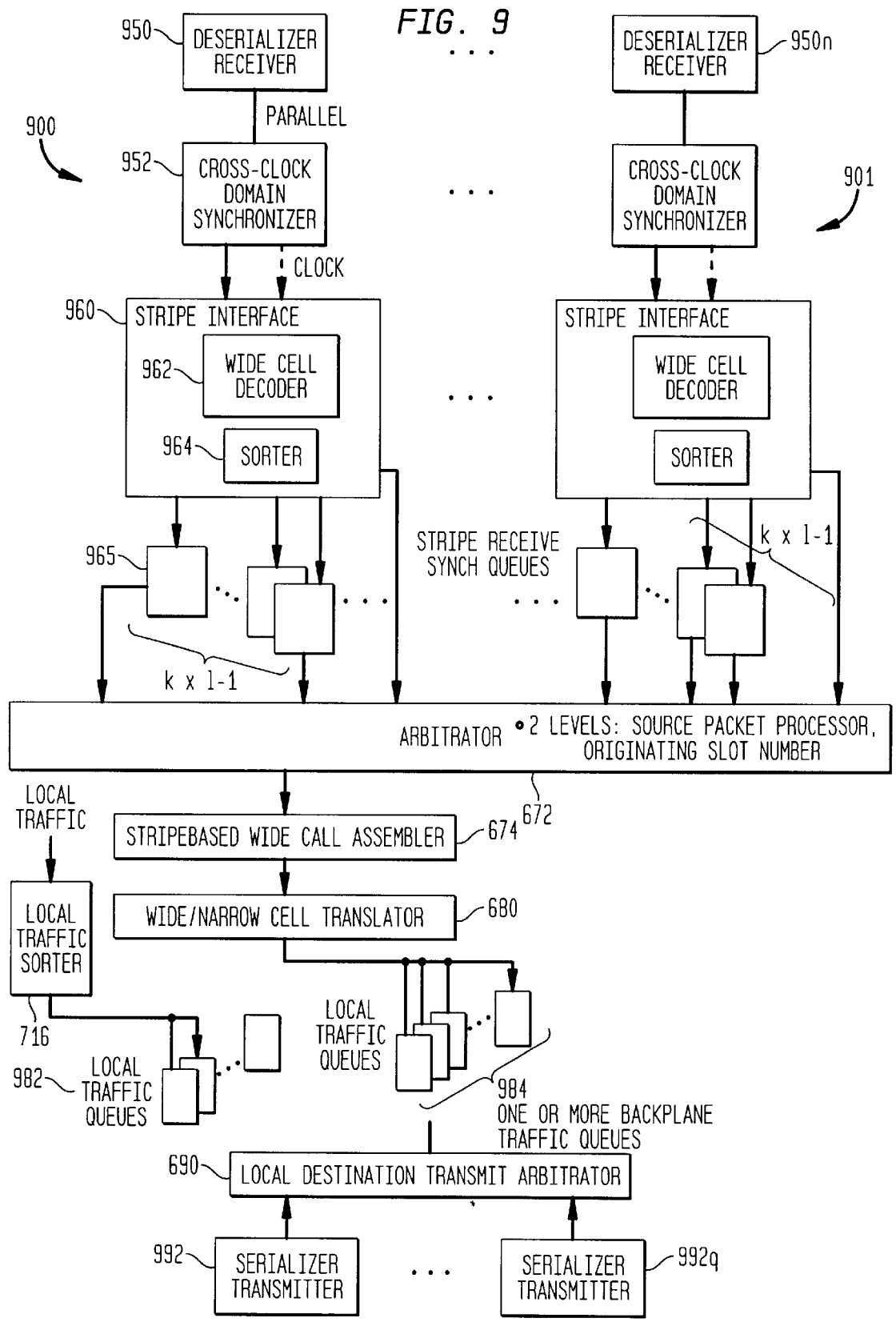
FIG. 9 is a diagram showing a traffic processing path for backplane serial traffic received at the backplane interface adapter according to an embodiment of the present invention.

To describe the structure and operation of the backplane interface adapter reference is made to components shown in FIGS. 6–9. FIG. 6 is a diagram of a backplane interface adapter (BIA) 600 according to an embodiment of the present invention. BIA 600 includes two traffic processing paths 603, 604. FIG. 7 is a diagram showing a first traffic processing path 603 for local serial traffic received at BIA 600 according to an embodiment of the present invention. FIG. 8 is a diagram showing in more detail an example switching fabric 645 according to an embodiment of the present invention. FIG. 9 is a diagram showing a second traffic processing path 604 for backplane serial traffic received at BIA 600 according to an embodiment of the resent invention. For convenience, BIA 600 of FIG. 6 will also be described with reference to a more detailed embodiment of elements along paths 603, 604 as shown in FIGS. 7 and 9, and the example switching fabric 645 shown in FIG. 8. The operation of a backplane interface adapter will be further described with respect to routines and example diagrams related to a wide striped cell encoding scheme as shown in FIGS. 11–16.

D. Overall Operation of Backplane Interface Adapter

Figure 10:
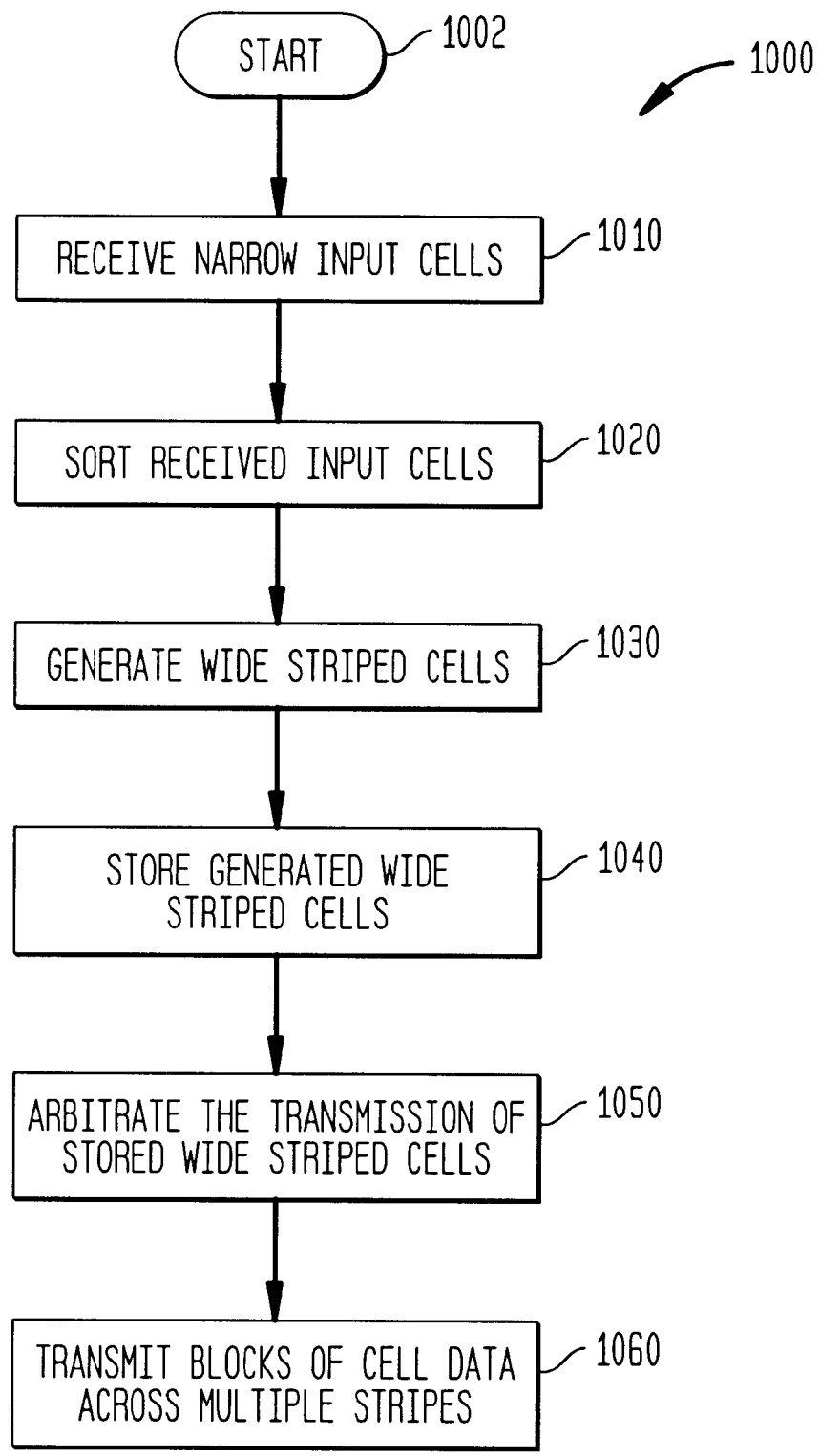
FIG. 10 is a flowchart of operational steps carried out along a traffic processing path for local serial traffic received at a backplane interface adapter according to an embodiment of the present invention.

FIG. 10 is a flowchart of a routine 1000 interfacing serial pipes carrying packets of data in narrow input cells and a serial pipe carrying packets of data in wide striped cells (steps 1010–1060). Routine 1000 includes receiving narrow input cells (step 1010), sorting the received input cells based on a destination slot identifier (1020), generating wide striped cells (step 1030), storing the generated wide striped cells in corresponding stripe send queues based on a destination slot identifier and an originating source packet processor (step 1040), arbitrating the order in which the stored wide striped cells are selected for transmission (step 1050) and transmitting data slices representing blocks of wide cells across multiple stripes (step 1060). For brevity, each of these steps is described further with respect to the operation of the first traffic processing path in BIA 600 in embodiments of FIGS. 6 and 7 below.

Figure 11:
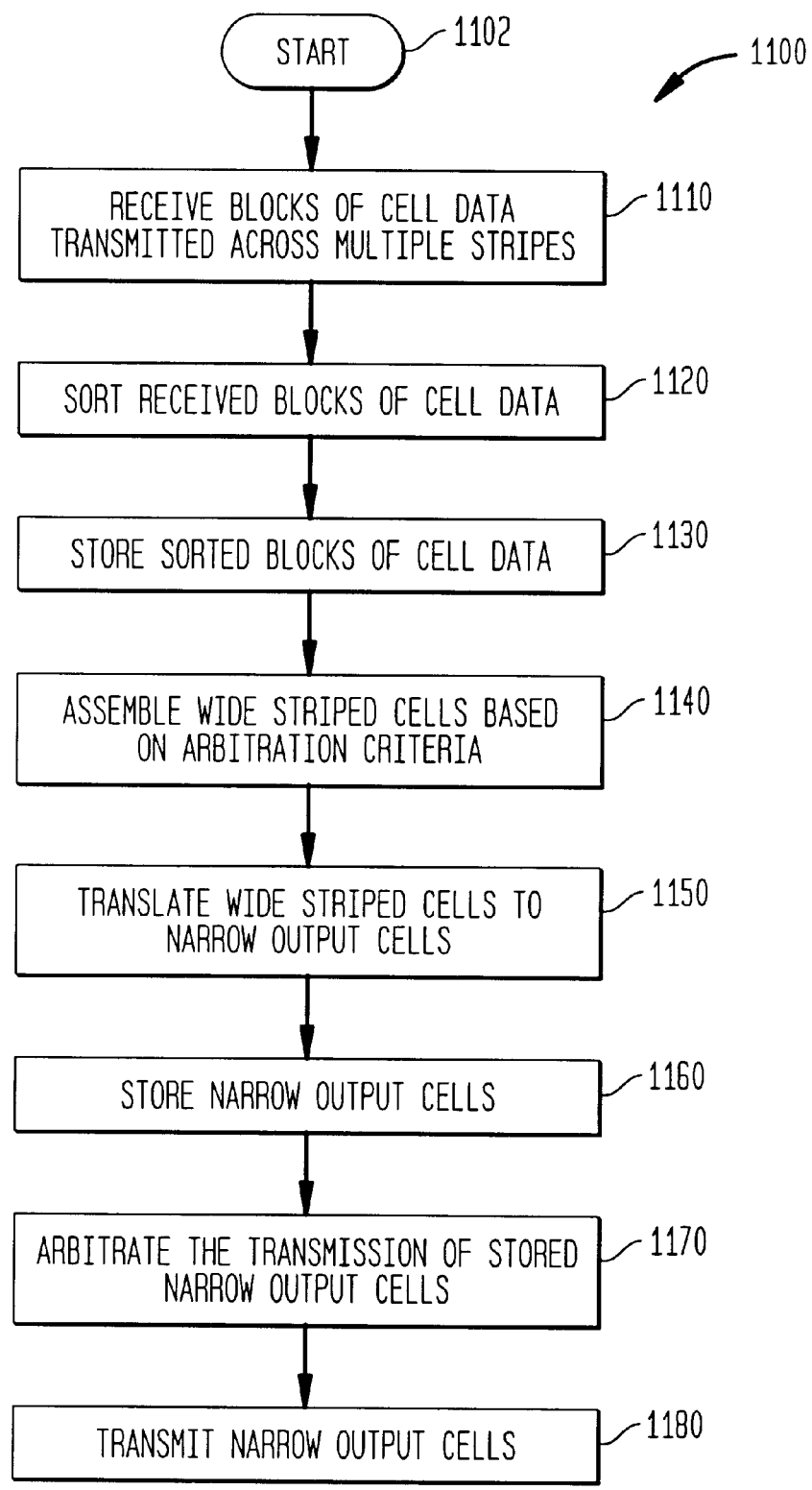
FIG. 11 is a flowchart of operational steps carried out along a traffic processing path for backplane serial traffic received at the backplane interface adapter according to an embodiment of the present invention.

FIG. 11 is a flowchart of a routine 1100 interfacing serial pipes carrying packets of data in wide striped cells to serial pipes carrying packets of data in narrow input sells (steps 1110–1180). Routine 1100 includes receiving wide striped cells carrying packets of data in multiple stripes from a switching fabric (step 1110), sorting the received subblocks in each stripe based on source packet processor identifier and originating slot identifier information (step 1120), storing the sorted received subblocks in stripe receive synchronization queues (step 1130), assembling wide striped cells in the order of the arbitrating step based on the received subblocks of data (step 1140), translating the received wide striped cells to narrow input cells carrying the packets of data (step 1150), storing narrow cells in a plurality of destination queues (step 1160), arbitrating an order in which data stored in the stripe receive synchronization queues is assembled (1170), and transmitting the narrow output cells to corresponding source packet processors (step 1180). In one additional embodiment, further arbitration is performed including arbitrating an order in which data stored in the destination queues is to be transmitted and transmitting the narrow input cells in the order of the further arbitrating step to corresponding source packet processors and/or IBTs. For brevity, each of these steps is described further with respect to the operation of the second traffic processing path in BIA 600 in embodiments of FIGS. 6 and 7 below.

As shown in FIG. 6, traffic processing flow path 603 extends in traffic flow direction from local packet processors toward a switching fabric 645. Traffic processing flow path 604 extends in traffic flow direction from the switching fabric 645 toward local packet processors. BIA 600 includes deserializer receiver(s) 602, traffic sorter 610, wide cell generator(s) 620, stripe send queues 625, switching fabric transmit arbitrator 630 and sterilizer transmitter(s) 640 coupled along path 603. BIA 600 includes deserializer receiver(s) 650, stripe interface module(s) 660, stripe receive synchronization queues 685 controller 670 (including arbitrator 672, striped-based wide cell assemblers 674, and administrative module 676), wide/cell translator 680, destination queues 615, local destination transmit arbitrator 690, and sterilizer transmitter(s) 692 coupled along path 604.

E. First Traffic Processing Path

Deserializer receiver(s) 602 receive narrow input cells carrying packets of data. These narrow input cells are output to deserializer receiver(s) 602 from packet processors and/or from integrated bus translators (IBTs) coupled to packet processors. In one example, four deserializer receivers 602 are coupled to four serial links (such as, links 308A–D, 318A–C described above in FIGS. 3A–3B). As shown in the example of FIG. 7, each deserialize receiver 602 includes a deserializer receiver 702 coupled to a cross-clock domain synchronizer 703. For example, each deserializer receiver 702 coupled to a cross-clock domain synchronizer 703 can be in turn a set of four SERDES deserializer receivers and domain synchronizers carrying the bytes of data in the four lanes of the narrow input cells. In one embodiment, each deserializer receiver 702 can receive interleaved streams of data from two serial links coupled to two sources. FIG. 7 shows one example where four deserializer receivers 702 (q=4) are coupled to two sources (j)=2) of a total of eight serial links (k=8). In one example, each deserializer receiver 702 receives a capacity of 10 Gb/s of serial data.

F. Narrow Cell Format

FIG. 13 shows the format of an example narrow cell 1300 used to carry packets of data in the narrow input tells. Such a format can include, but is not limited to, a data cell format received from a XAUI interface. Narrow cell 1300 includes four lanes (lanes 0–3). Each lane 0–3 carries a byte of data on a serial link. The beginning of a cell includes a header followed by payload data. The header includes one byte in lane 0 of control information, and one byte in lane 1 of state information. One byte is reserved in each of lanes 2 and 3. Table 1310 shows example state information which can be used. This state information can include any combination of state information including one or more of the following: a slot number, a payload state, and a source or destination packet processor identifier. The slot number is an encoded number, such as, 00, 01, etc. or other identifier (e.g., alphanumeric or ASCII values) that identifies the blade (also called a slot) towards which the narrow cell is being sent. The payload state can be any encoded number or other identifier that Indicates a particular state of data in the cell being sent, such as, reserved (meaning a reserved cell with no data), SOP (meaning a start of packet cell), data (meaning a cell carrying payload data of a packet), and abort (meaning a packet transfer is being aborted).

G. Traffic Sorting

Traffic sorter 610 sorts received narrow input cells based on a destination slot identifier. Traffic sorter 610 routes narrow cells destined for the same blade as BIA 600 (also called local traffic) to destination queues 615. Narrow cells destined for other blades in a switch across the switching fabric (also called global traffic) are routed to wide cell generators 620.

FIG. 7 shows a further embodiment where traffic sorter 610 includes a global/traffic sorter 712 coupled to a backplane sorter 714. Global/traffic sorter 712 sorts received narrow input cells based on the destination slot identifier. Traffic sorter 712 routes narrow cells destined for the same blade as BIA 600 to destination queues 615. Narrow cells destined for other blades in a switch across the switching fabric (also called global traffic or backplane traffic) are routed to backplane traffic sorter 714. Backplane traffic sorter 714 further sorts received narrow input cells having destination slot identifiers that identify global destination slots into groups based on the destination slot identifier. In this way, narrow cells are grouped by the blade towards which they are traveling. Backplane traffic sorter 714 then routes the sorted groups of narrow input cells of the backplane traffic to corresponding wide cell generators 720. Each wide cell generator 720 then processes a corresponding group of narrow input cells. Each group of narrow input cells represents portions of packets sent from two corresponding interleaved sources 0–2) and destined for a respective blade. In one example, 56 wide cell generators 720 are coupled to the output of four backplane traffic sorters 714. The total of 56 wide cell generators 720 is given by 56=q*j*l−1, where j=2 sources, l=8 blades, and q=four serial input pipes and four deserializer receivers 702.

H. Wide Striped Cell Generation

Wide cell generators 620 generate wide striped cells. The wide striped cells carry the packets of data received by BIA 600 in the narrow input cells. The wide cells extend across multiple stripes and include in-band control information in each stripe. In the interest of brevity, the operation of wide cell generators 620, 720 is further described with respect to a routine 1200 in FIG. 12. Routine 1200 however is not intended to be limited to use in wide cell generator 620, 720 and may be used in other structure and applications.

Figure 12:
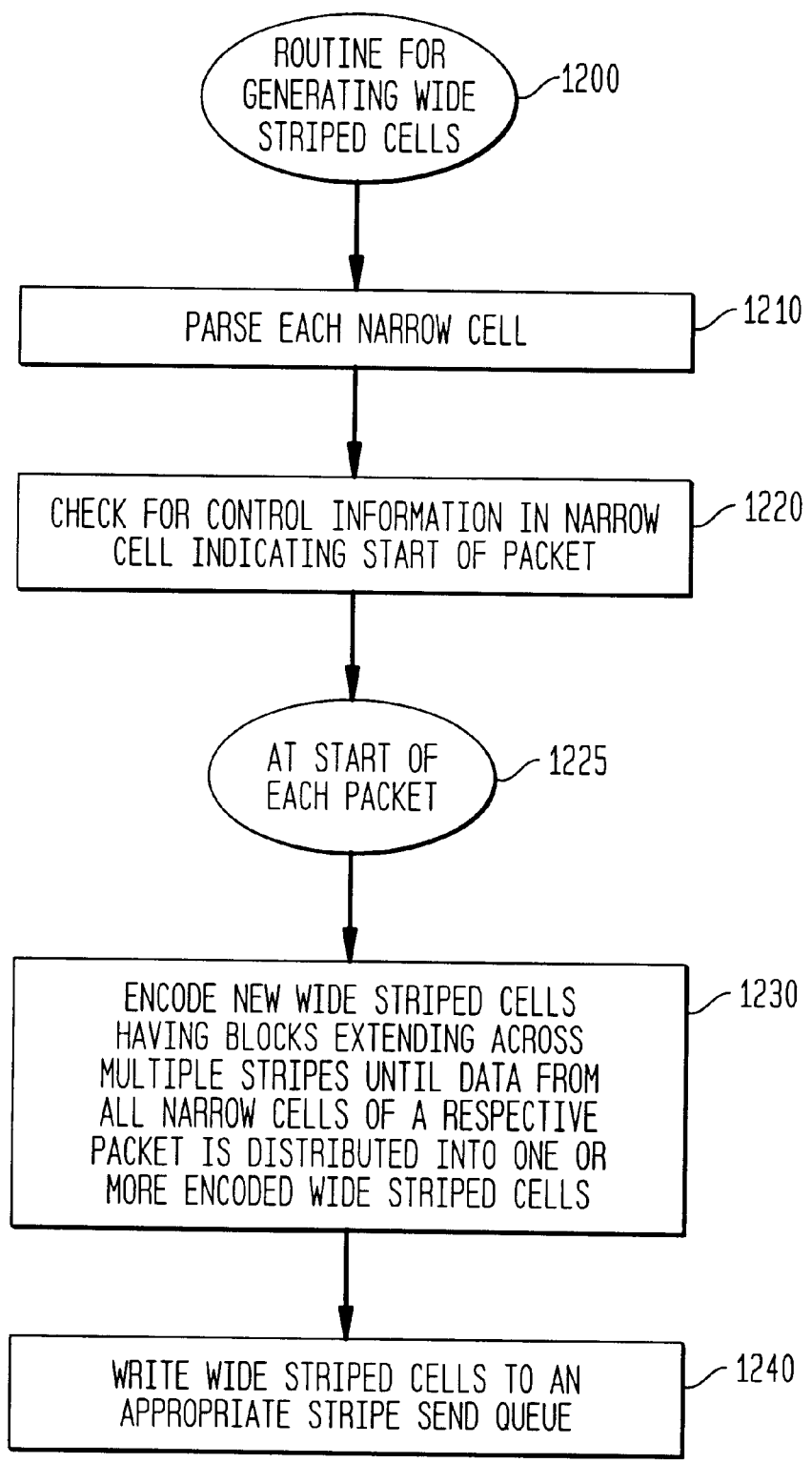
FIG. 12 is a flowchart of a routine for generating wide striped cells according to an embodiment of the present invention.

FIG. 12 shows a routine 1200 for generating wide striped cell generation according to the present invention (steps 1210–1240). In one embodiment, each wide cell generator (s) 620, 720 perform steps 1210–1240. In step 1210, wide cell generator 620, 720 parse each narrow input cell to identify a header. When control information is found in a header, a check is made to determine whether the control information indicates a start of packet (step 1220). For example, to carry out steps 1210 and 1220, wide cell generator 620, 720 can read lane 0 of narrow cell 1300 to determine control information indicating a start of packet is present. In one example, this start of packet control information is a special control character K0.

For each detected packet (step 1225), steps 1230–1240 are performed. In step 1230, wide cell generator 620, 720 encodes one or more new wide striped cells until data from all narrow input cells of the packet is distributed into the one or more new wide striped cells. This encoding is further described below with respect to routine 1400 and FIGS. 15A–D, and 16.

In step 1230, wide cell generator 620 then writes the one or more new wide striped cells into a plurality of send queues 625. In the example of FIG. 7, a total of 56 wide cell generators 720 are coupled to 56 stripes send queues 725. In this example, the 56 wide cell generators 720 each write newly generated wide striped cells into respective ones of the 56 stripe send queues 725.

I. Encoding Wide Striped Cells

Figure 14:
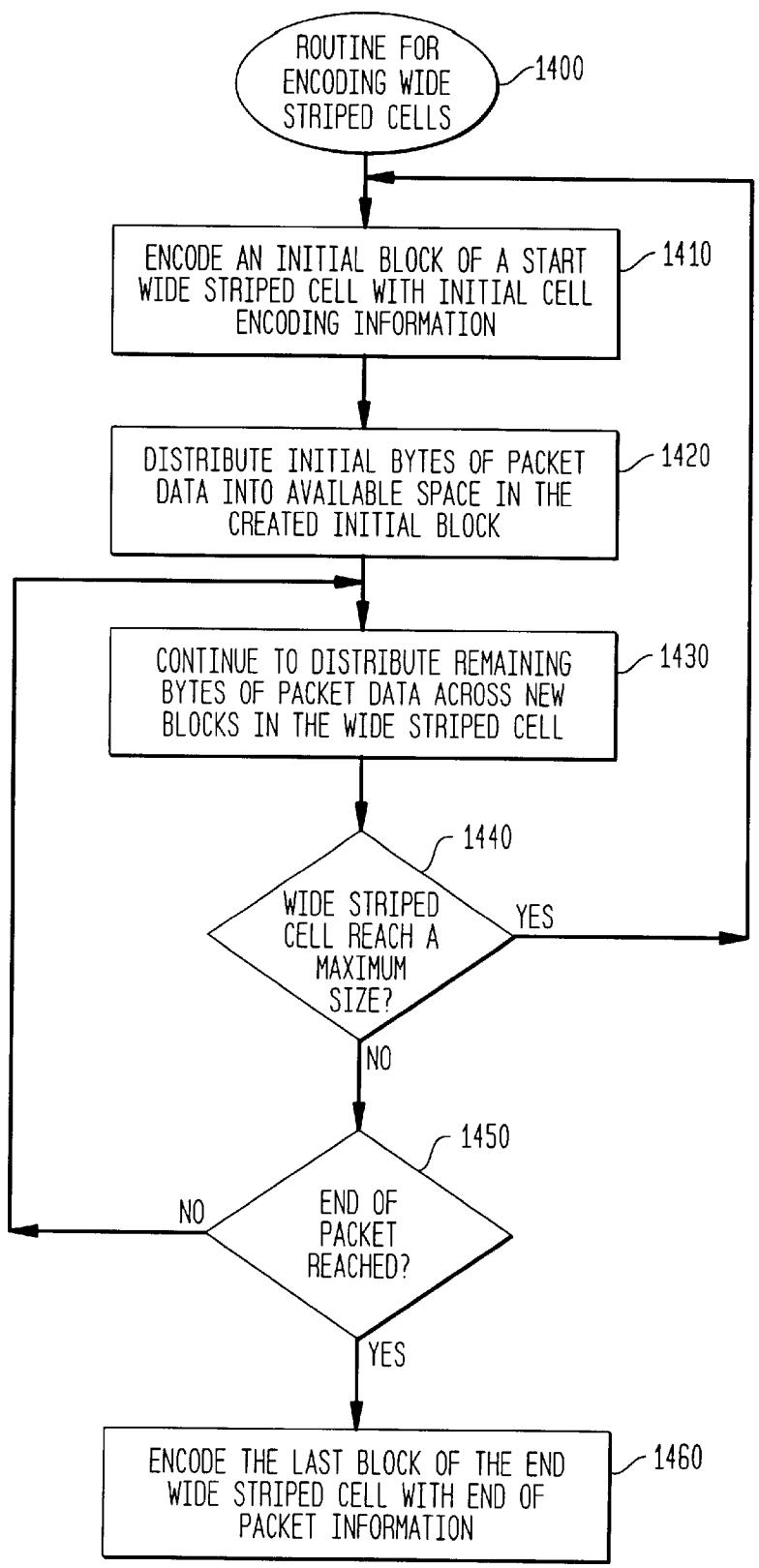
FIG. 14 is a flowchart of a routine for encoding wide striped cells according to an embodiment of the present invention.

According to a further feature of the present invention, system and method for encoding wide striped cells is provided. In one embodiment, wide cell generators 620, 720 each generate wide striped cells which are encoded (step 1230). FIG. 14 is a flowchart of a routine 1400 for encoding wide striped cells according to an embodiment of the present invention (steps 1410–1460).

J. Initial Block Encoding

In step 1410, wide cell generator 620, 720 encodes an initial block of a start wide striped cell with initial cell encoding information. The initial cell encoding information includes control information (such as, a special K0 character) and state information provided in each subblock of an initial block of a wide striped cell. FIG. 15A shows the encoding of an initial block in a wide striped cell 1500 according to an embodiment of the present invention. The initial block is labeled a; cycle 1. The initial block has twenty bytes that extend across five stripes 1–5. Each stripe has a subblock of four bytes. The four bytes of a subblock correspond to four one byte lanes. In this way, a stripe is a data slice of a subblock of a wide cell. A lane is a data slice of one byte of the subblock. In step 1410, then control information (K0) is provided all each lane 0 of the stripes 1–5. State information is provided in each in each lane 1 of the stripes 1–5. Also, two bytes are reserved in lanes 2 and 3 of stripe 5.

FIG. 15B is a diagram illustrating state information used in a wide striped cell according to an embodiment of the present invention. As shown in FIG. 15B, state information for a wide striped cell can include any combination of state information including one or more of the following: a slot number, a payload state, and reserved bits. The slot number is an encoded number, such as, 00, 01, etc. or other identifier (e.g., alphanumeric or ASCII values) that identifies the blade (also called a slot) towards which the wide striped cell is being sent. The payload state can be any encoded number or other identifier that indicates a particular state of data in the cell being sent, such as, reserved (meaning a reserved cell with no data), SOP (meaning a start of packet cell), data (meaning a cell carrying payload data of a packet), and abort (meaning a packet transfer is being aborted). Reserved bits are also provided.

In step 1420, wide cell generator(s) 620, 720 distribute initial bytes of packet data into available space in the initial block. In the example wide striped cell 1500 shown in FIG. 15A, two bytes of data D0, D1 are provided in lanes 2 and 3 of stripe 1, two bytes of data D2, D3 are provided in lanes 2 and 3 of stripe 2, two bytes of data D4, D5 are provided in lanes 2 and 3 of stripe 3, and two bytes of data D6, D7 are provided in lanes 2 and 3 of stripe 4.

In step 1430, wide cell generator(s) 620, 720 distribute remaining bytes of packet data across one or more blocks in of the first wide striped cell (and subsequent wide cells). In the example wide striped cell 1500, maximum size of a wide striped cell is 160 bytes (8 blocks) which corresponds to a maximum of 148 bytes of data. In addition to the data bytes D0–D7 in the initial block, wide striped cell 1500 further has data bytes D8–D147 distributed in seven blocks (labeled in FIG. 15A as blocks 2–8).

In general, packet data continues to be distributed until an end of packet condition is reached or a maximum cell size is reached. Accordingly, checks are made of whether a maximum cell size is reached (step 1440) and whether the end of packet is reached (step 1450). If the maximum cell size is reached in step 1440 and more packet data needs to be distributed then control returns to step 1410 to create additional wide striped cells to carry the rest of the packet data. If the maximum cell size is not reached in step 1440, then an end of packet check is made (step 1450). If an end of packet is reached then the current wide striped cell being filled with packet data is the end wide striped cell. Note for small packets less than 148 bytes, than only one wide striped cell is needed. Otherwise, more than one wide striped cells are uses to carry a packet of data across multiple stripes. When an end of packet is reached in step 1450, then control proceeds to step 1460.

K. End of Packet Encoding

In step 1460, wide cell generator(s) 620, 720 further encode an end wide striped cell with end of packet information that varies depending upon the degree to which data has filled a wide striped cell. In one encoding scheme, the end of packet information varies depending upon a set of end of packet conditions including whether the end of packet occurs in an initial cycle or subsequent cycles, at a block boundary, or at a cell boundary.

FIG. 15C is a diagram illustrating end of packet encoding information used in an end wide striped cell according to an embodiment of the present invention. A special character byte K1 is used to indicate end of packet. A set of four end of packet conditions are shown (items 1–4). The four end of packet conditions are whether the end of packet occurs during the initial block (item 1) or during any subsequent block (items 2–4). The end of packet conditions for subsequent blocks further include whether the end of packet occurs within a block (item 2), at a block boundary (item 3), or at a cell boundary (item 4). As shown in item 1 of FIG. 11C, when the end of packet occurs during the initial block, control and state information (K0, state) and reserved information are preserved as in any other initial block transmission. K1 byte; are added as data in remaining data bytes.

As shown in item 2 of FIG. 15C, when the end of packet occurs during a subsequent block (and not at a block or cell boundary), K1 bytes are added as data in remaining data bytes until an end of a block is reached. In FIG. 15C, item 2, an end of packet is reached at data byte D33 (stripe 2, lane 1 in block of cycle 3). K1 bytes are added for each lane for remainder of block. When the end of packet occurs at a block boundary of a subsequent block (item 3), K1 bytes are added as data in an entire subsequent block. In FIG. 15C, item 3, an end of packet is reached at data byte D27 (end of block of block 2). K1 bytes are added for each lane for entire block (block 3). When the end of packet occurs during a subsequent block but at a cell boundary (item 4), one wide striped cell having an initial block with K1 bytes added as data is generated. In FIG. 15D, item 4, an end of packet is reached at data byte D147 (end of cell and end of block for block 8). One wide striped cell consisting of only an initial block with normal control, state and reserved information and with K1 bytes added as data is generated. As shown in FIG. 15D, such an initial block with K1 bytes consists of stripes 1–5 with bytes as follows: stripe 1 (K0, state, K1, K1), stripe 2 (K0, state, K1, K1), stripe3 (K0, state, K1, K1), stripe 4 (K0, state, K1, K1), stripe 5 (K0, state, reserved, reserved).

L. Switching Fabric Transmit Arbitration

In one embodiment, BIA 600 also includes switching fabric transmit arbitrator 630. Switching fabric transmit arbitrator 630 arbitrates the order in which data stored in the stripe send queues 625, 725 is sent by transmitters 640, 740 to the switching fabric. Each stripe send queue 625, 725 stores a respective group of wide striped cells corresponding to a respective originating source packet processor and a destination slot identifier. Each wide striped cell has one or more blocks across multiple stripes. During operation the switching fabric transmit arbitrator 630 selects a stripe send queue 625, 725 and pushes the next available cell to the transmitters 640, 740. In this way one full cell is sent at a time. (Alternatively, a portion of a cell can be sent.) Each stripe of a wide cell is pushed to the respective transmitter 640, 740 for that stripe. In one example, during normal operation, a complete packet is sent to any particular slot or blade from a particular packet processor before a new packet is sent to that slot from different packet processors. However, the packets for the different slots are sent during an arbitration cycle. In an alternative embodiment, other blades or slots are then selected in a round-robin fashion.

M. Cross Point Processing of Stripes including Wide Cell Encoding

In on embodiment, switching fabric 645 includes a number n of cross point switches 202 corresponding to each of the stripes. Each cross point switch 161 (also referred to herein as a cross point or cross point chip) handles one data slice of wide cells corresponding to one respective stripe. In one example, five cross point switches 202A–202E are provided corresponding to five stripes. For clarity, FIG. 8 shows only two of five cross point switches corresponding to stripes 1 and 5. The five cross point switches 202 are coupled between transmitters and receivers of all of the blades of a switch as described above with respect to FIG. 2. For example, FIG. 8 shows cross point switches 202 coupled between one set of transmitters 740 for stripes of one blade and another set of receivers 850 on a different blade.

The operation of a cross point 202 and in particular a port slice 402F is now described with respect to an embodiment where stripes further include wide cell encoding and a flow control indication.

Port slice 402F also receives data from other port slices 402A–402E, 402G, and 402H. This data corresponds to the data received at the other seven ports of port slices 402A–402E, 402G, and 402H which has a destination slot number corresponding to port slice 402F. Port slice 402F includes seven data FIFOs 530 to store data from corresponding port slices 402A–402E, 402G, and 402H. Accumulators (not shown) in the seven port slices 402A–402E, 402G, and 402H extract the destination slot number associated with port slice 402F and write corresponding data to respective ones of seven data FIFOs 530 for port slice 402F. As shown in FIG. 5, each data FIFO 530 includes a FIFO controller and FIFO random access memory (RAM). The FIFO controllers are coupled to a FIFO read arbitrator 540. FIFO RAMs are coupled to a multiplexer 550. FIFO read arbitrator 540 is further coupled to multiplexer 550. Multiplexer 550 has an output coupled to dispatcher 560. Dispatch 560 has an output coupled to transmit synch FIFO module 570. Transmit synch FIFO module 570 has an output coupled to serializer transmitter(s) 580.

During operation, the FIFO RAMs accumulate data. After a data FIFO RAM has accumulated one cell of data, its corresponding FIFO controller generates a read request to FIFO read arbitrator 540. FIFO read arbitrator 540 processes read requests from the different FIFO controllers in a desired order, such as a round-robin order. After one cell of data is read from one FIFO RAM, FIFO read arbitrator 540 will move on to process the next requesting FIFO controller. In this way, arbitration proceeds to serve different requesting FIFO controllers and distribute the forwarding of data received at different source ports. This helps maintain a relatively even but loosely coupled flow of data through cross points 202.

To process a read request, FIFO read arbitrator 540 switches multiplexer 550 to forward a cell of data from the data FIFO RAM associated with the read request to dispatcher 560. Dispatcher 560 outputs the data to transmit synch FIFO 570. Transmit synch FIFO 570 stores the data until sent in a serial data stream by serializer transmitter(s) 580 to blade 104F.

Cross point operation according to the present invention is described further below with respect to a further embodiment involving wide cell encoding and flow control.

N. Second Traffic Processing Path

FIG. 6 also shows a traffic processing path for backplane serial traffic received at backplane interface adapter 600 according to an embodiment of the present invention. FIG. 9 further shows the second traffic processing path in even more detail.

As shown in FIG. 6, BIA 600 includes one or more deserialize receivers 650, wide/narrow cell translators 680, and serializer transmitters 692 along the second path. Receivers 650 receive wide striped cells in multiple stripes from the switching fabric 645. The wide striped cells carry packets of data, In one example, five deserializer receivers 650 receive five subblocks of wide striped cells in multiple stripes. The wide striped cells carrying packets of data across the multiple stripes and including originating slot identifier information. In one digital switch embodiment, originating slot identifier information is written in the wide striped cells as they pass through cross points in the switching fabric as described above with respect to FIG. 8.

Translators 680 translate the received wide striped cells to narrow input cells carrying the packets of data. Serializer transmitters 692 transmit the narrow input cells to corresponding source packet processors or IBTs.

BIA 600 further includes stripe interfaces 660 (also called stripe interface modules), stripe receive synchronization queues (685), and controller 670 coupled between deserializer receivers 650 and a controller 670. Each stripe interface 660 sorts received subblocks in each stripe based on source packet processor identifier and originating slot identifier information and stores the sorted received subblocks in the stripe receive synchronization queues 685.

Controller 670 includes an arbitrator 672, a striped-based wide cell assembler 674, and an administrative module 676. Arbitrator 672 arbitrates an order in which data stored in stripe receive synchronization queues 685 is sent to striped-based wide cell assembler 674. Striped-based wide cell assembler 674 assembles wide striped cells based on the received subblocks of data. A narrow/wide cell translator 680 then translates the arbitrated received wide striped cells to narrow input cells carrying the packets of data. Administrative module 676 is provided to carry out flow control, queue threshold level detection, and error detection (such as, stripe synchronization error detection), or other desired management or administrative functionality.

A second level of arbitration is also provided according to an embodiment of the present invention. BIA 600 further includes destination queues 615 and a local destination transmit arbitrator 690 in the second path. Destination queues 615 store narrow cells sent by traffic sorter 610 (from the first path) and the narrow cells translated by the translator 680 (from the second path). Local destination transmit arbitrator 690 arbitrates an order in which narrow input cells stored in destination queues 690 is sent to serializer transmitters 692. Finally, serializer transmitters 692 then transmit the narrow input cells to corresponding IBTs and/or source packet processors (and ultimately out of a blade through physical ports).

FIG. 9 further shows the second traffic processing path in even more detail. BIA 600 includes five groups of components for processing data slices from five slices. In FIG. 9 only two groups 900 and 901 are shown for clarity, and only group 900 need be described in detail with respect to one stripe since the operations of the other groups is similar for the other four stripes.

In the second traffic path, deserializer receiver 950 is coupled to cross clock domain synchronizer 952. Deserializer receiver 950 converts serial data slices of a stripe (e.g., subblocks) to parallel data. Cross clock domain synchronizer 952 synchronizes the parallel data.

Stripe interface 960 has a decoder 962 and sorter 964 to decode and sort received subblocks in each stripe based on source packet processor identifier and originating slot identifier information. Sorter 964 then stores the sorted received subblocks in stripe receive synchronization queues 965. Five groups of 56 stripe receive synchronization queues 965 are provided in total. This allows one queue to be dedicated for each group of subblocks received from a particular source per global blade (up to 8 source packet processors per blade for seven blades not including the current blade).

Arbitrator 672 arbitrates an order in which data stored in stripe receive synchronization queues 685 sent to striped-based wide cell assembler 674. Striped-based wide cell assembler 674 assembles wide striped cells based on the received subblocks of data. A narrow/wide cell translator 680 then translates the arbitrated received wide striped cells to narrow input cells carrying the packets of data as described above in FIG. 6.

Destination queues include local destination queues 982 and backplane traffic queues 984. Local destination queues 982 store narrow cells sent by local traffic sorter 716. Backplane traffic queues 984 store narrow cells translated by the translator 680. Local destination transmit arbitrator 690 arbitrates an order in which narrow input cells stored in destination queues 982, 984 is sent to serializer transmitters 992. Finally, serializer transmitters 992 then transmit the narrow input cells to corresponding IBTs and/or source packet processors (and ultimately out of a blade through physical ports).

O. Cell Boundary Alignment

FIG. 15D is a diagram illustrating an example of a cell boundary alignment condition during the transmission of wide striped cells in multiple stripes according to an embodiment of the present invention. A K0 character is guaranteed by the encoding and wide striped cell generation to be present every 8 blocks for any given stripe. Cell boundaries among the stripes themselves can be out of alignment. This out of alignment however is compensated for and handled by the second traffic processing flow path in BIA 600.

P. Packet Alignment

FIG. 16 is a diagram illustrating an example of a packet alignment condition during the transmission of wide striped cells in multiple stripes according to an embodiment of the present invention. Cell can vary between stripes but all stripes are essentially transmitting the same packet or nearby packets. Since each cross point arbitrates among its sources independently, not only can there be a skew in a cell boundary, but there can be as many as seven cell time units (time to transmit cells) of skew between a transmission of a packet on one serial link verus its transmission on any other link. This also means that packets may be interlaced with other packets in the transmission in multiple stripes over the switching fabric.

Q. Wide Striped Cell Size at Line Rate

In one example, a wide cell has a maximum size of eight blocks (160 bytes) which can carry a 148 bytes of payload data and 12 bytes of in-band control information. Packets of data for full-duplex traffic can be carried in the wide cells at a 50 Gb/sec rate through the digital switch.

R. IBT and Packet Processing

The integrated packet controller (IPC) and integrated giga controller (IGC) functions are provided with a bus translator, described above as the IPC/IGC Bus Translator (IBT) 304. In one embodiment, the IBT is an ASIC that bridges one or more IPC/IC ASIC. In such an embodiment, the IBT translates two 4/5 gig parallel stream into one 10 Gbps serial stream. The parallel interface can be the backplane interface of the IPC/IGC ASICs. The one 10 Gbps serial stream can be further processed, for example, as described herein with regard to interface adapters and striping.

Additionally, IBT 304 can be configured to operate with other architectures as would be apparent to one skilled in the relevant art(s) based at least on the teachings herein. For example, the IBT 304 can be implemented in packet processors using 10 GE and OC-192 configurations. The functionality of the IBT 304 can be incorporated within existing packet processors or attached as an add-on component to a system.

Figure 17:
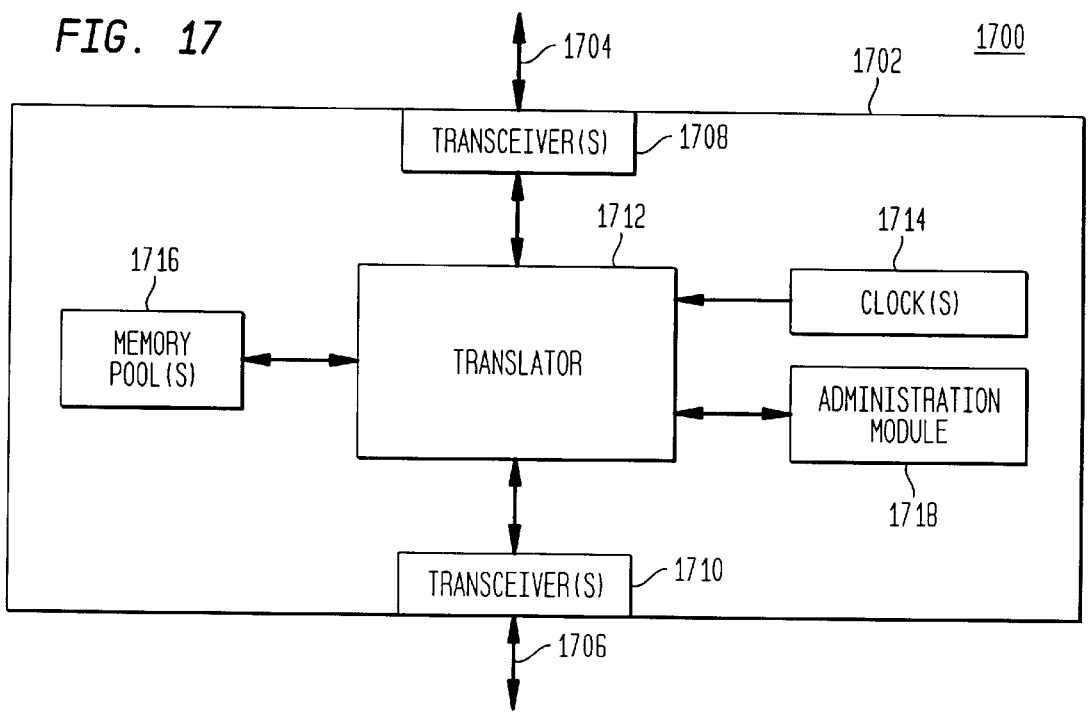
FIG. 17 illustrates a block diagram of a bus translator according to one embodiment of the present invention.

In FIG. 17, a block diagram 1700 illustrates the components of a bus translator 1702 according to one embodiment of the present invention. The previously described IBT 304 can be configured as the bus translator 1702 of FIG. 17. For example, IBT 304 can be implemented to include the functionality of the bus translator 1702.

More specifically, the bus translator 1702 translates data 1704 into data 1706 and data 1706 into data 104. The data 1706 is received by transceiver(s) 1710 is forwarded to a translator 1712. The translator 1712 parses and encodes the data 1706 into a desired format.

Here, the translator 1712 translates the data 1706 into the format of the data 1704. The translator 1712 is managed by an administration module 1718. One or more memory pools 1716 store the information of the data 1706 and the data 1704. One or more clocks 1714 provide the timing information to the translation operations of the translator 1712. Once the translator 1712 finishes translating the data 1706, it forwards the newly formatted information as the data 1704 to the transceiver(s) 1708. The transceiver(s) 1708 forward the data 1704.

As one skilled in the relevant art would recognize based on the teachings described herein, the operational direction of bus translator 1702 can be reversed and the data 1704 received by the bus translator 1702 and the data 1706 forwarded after translation.

For ease of illustration, but without limitation, the process of translating the data 1706 into the data 1704 is herein described as receiving, reception, and the like. Additionally, for ease of illustration, but without limitation, the process of translating the data 1704 into the data 1706 is herein described as transmitting, transmission, and the like.

Figure 18:
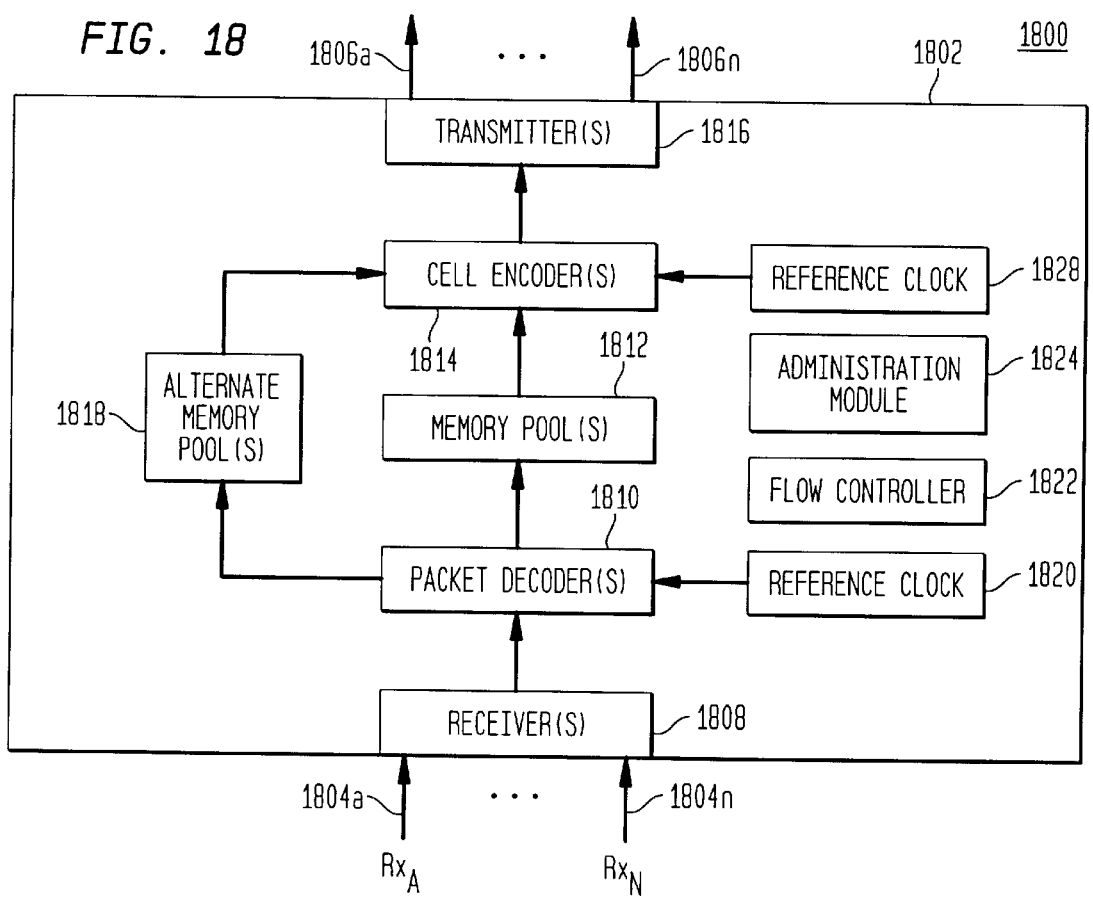
FIG. 18 illustrates a block diagram of the reception components according to one embodiment of the present invention.

In FIG. 18, a block diagram of the reception components according to one embodiment of the present invention. In one embodiment, bus translator 1802 receives data in the form of packets from interface connections 1804a–n. The interface connections 1804a–n couple to one or more receivers 1808 of bus translator 1802. Receivers 1808 forward the received packets to one or more packet decoders 1810. In one embodiment, the receiver(s) 1808 includes one or more physical ports. In an additional embodiment, each of receivers 1808 includes one or more logical ports. In one specific embodiment, the receiver(s) 1808 consists of four logical ports.

The packet decoders 1810 receive the packets from the receivers 1808. The packet decoders 1810 parse the information from the packets. In one embodiment, as is described below in additional detail, the packet decoders 1810 copy the payload information from each packet as well as the additional information about the packet, such as time and place of origin, from the start of packet (SOP) and the end of packet (EOP) sections of the packet. The packet decoders 1810 forward the parsed information to memory pool(s) 1812. In one embodiment, the bus translator 1802 includes more than one memory pool 1812. In an alternative embodiment, alternate memory pool(s) 1818 can be sent the information. In an additional embodiment, the packet decoder(s) 1810 can forward different types of information, such as payload, time of delivery, origin, and the like, to different memory pools of the pools 1812 and 1818.

Reference clock 1820 provides timing information to the packet decoder(s) 1810. In one embodiment, reference clock 1820 is coupled to the IPC/IGC components sending the packets through the connections 1804a–n. In another embodiment, the reference clock 1820 provides reference and timing information to all the parallel components of the bus translator 1802.

Cell encoder(s) 1814 receives the information from the memory pool(s) 1812. In an alternative embodiment, the cell encoder(s) 1814 receives the information from the alternative memory pool(s) 1818. The cell encoder(s) 1814 formats the information into cells.

In the description that follows, these cells are also referred to as narrow cells. Furthermore, the cell encoder(s) 1814 can be configured to format the information into one or more cell types. In one embodiment, the cell format is a fixed size. In another embodiment, the cell format is a variable size.

The cell format is described in detail below with regard to cell encoding and decoding processes of FIGS. 22, 23A–B, 24, and 25A–B.

The cell encoder(s) 1814 forwards the cells to transmitter(s) 1816. The transmitter(s) 1816 receive the cells and transmit the cells through interface connections 1806a–n.

Reference clock 1828 provides timing information to the cell encoder(s) 1814. In one embodiment, reference clock 1828 is coupled to the interface adapter components receiving the cells through the connections 1806a–n. In another embodiment, the reference clock 1828 provides reference and timing information to all the serial components of the bus translator 1802.

Flow controller 1822 measures and controls the incoming packets and outgoing cells by determining the status of the components of the bus translator 1802 and the status of the components connected to the bus translator 1802. Such components are previously described herein and additional detail is provided with regard to the interface adapters of the present invention.

In one embodiment, the flow controller 1822 controls the traffic through the connection 1806 by asserting a ready signal and de-asserting the ready signal in the event of an overflow in the bus translator 1802 or the IPC/IGC components further connected.

Administration module 1824 provides control features for the bus translator 1802. In one embodiment, the administration module 1824 provides error control and power-on and reset functionality for the bus translator 1802.

Figure 19:
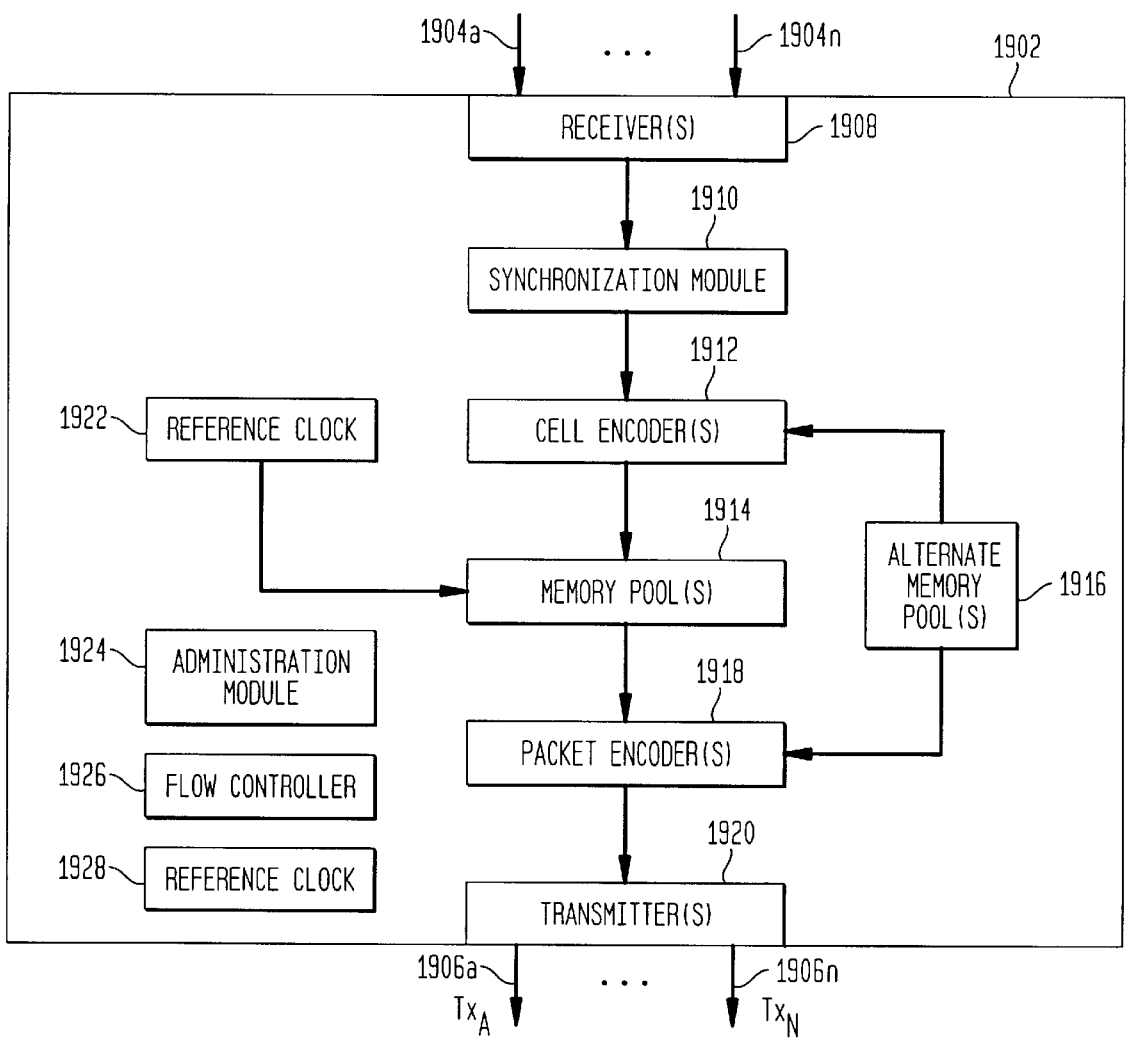
FIG. 19 illustrates a block diagram of the transmission components according to one embodiment of the present invention.

FIG. 19 illustrates a block diagram of the transmission components according to one embodiment of the present invention. In one embodiment, bus translator 1902 receives data in the form of cells from interface connections 1904a–n. The interface connections 1904a–n couple to one or more receivers 1908 of bus translator 1902. In one embodiment, the receiver(s) 1908 include one or more physical ports. In an additional embodiment, each of receivers 1908 includes one or more logical ports. In one specific embodiment, the receiver(s) 1908 consists of four logical ports. Receivers 1908 forward the received cells to a synchronization module 1910. In one embodiment, the synchronization module 1910 is a FIFO used to synchronize incoming cells to the reference clock 1922. It is noted that although there is no direct arrow shown in FIG. 19 from reference clock 1922 to synchronization module 1910, the two module can communicate such that the synchronization module is capable of synchronizing the incoming cells. The synchronization module 1910 forwards the one or more cell decoders 1912, The cell decoders 1912 receive the cells from the synchronization module 1910. The cell decoders 1912 parse the information from the sells. In one embodiment, as is described below in additional detail, the cell decoders 1912 copy the payload information Prom each cell as well as the additional information about the cell, such as place of origin, from the slot and state information section of the cell.

In one embodiment, the cell format can be fixed. In another embodiment, the cell format can be variable. In yet another embodiment, the cells received by the bus translator 1902 can be of more than one cell format. The bus translator 1902 can be configured to decode these cell format as one skilled in the relevant art would recognize based on the teachings herein. Further details regarding the cell formats is described below with regard to the cell encoding processes of the present invention.

The cell decoders 1912 forward the parsed information to memory pool(s) 1914. In one embodiment, the bus translator 1902 includes more than one memory pool 1914. In an alternative embodiment, alternate memory pool(s) 1916 can be sent the information. In an additional embodiment, the cell decoder(s) 1912 can forward different types of information, such as payload, time of delivery, origin, and the like, to different memory pools of the pools 1914 and 1916.

Reference clock 1922 provides timing information to the cell decoder(s) 1912. In one embodiment, reference clock 1922 is coupled to the interface adapter components sending the cells through the connections 1904a–n. In another embodiment, the reference clock 1922 provides reference and timing information to all the serial components of the bus translator 1902.

Packet encoder(s) 1918 receive the information from the memory pool(s) 1914. In an alternative embodiment, the packet encoder(s) 1918 receive the information from the alternative memory pool(s) 1916. The packet encoder(s) 1918 format the information into packets.

The packet format is determined by the configuration of the IPC/IGC components and the requirements for the system.

The packet encoder(s) 1918 forwards the packets to transmitter(s) 1920. The transmitter(s) 1920 receive the packets and transmit the packets through interface connections 1906a–n.

Reference clock 1928 provides timing information to the packet encoder(s) 1918. In one embodiment, reference clock 1928 is coupled to the IPC/IGC components receiving the packets through the connections 1906a–n. In another embodiment, the reference clock 1928 provides reference and timing information to all the parallel components of the bus translator 1902.

Flow controller 1926 measures and controls the incoming cells and outgoing packets by determining the status of the components of the bus translator 1902 and the status of the components connected to the bus translator 1902. Such components are previously described herein and additional detail is provided with regard to the interface adapters of the present invention.

In one embodiment, the flow controller 1926 controls the traffic through the connection 1906 by asserting a ready signal and de-asserting the ready signal in the event of an overflow in the bus translator 1902 or the IPC/IGC components further connected.

Administration module 1924 provides control features for the bus translator 1902. In one embodiment, the administration module 1924 provides error control and power-on and reset functionality for the bus translator 1902.

Figure 20:
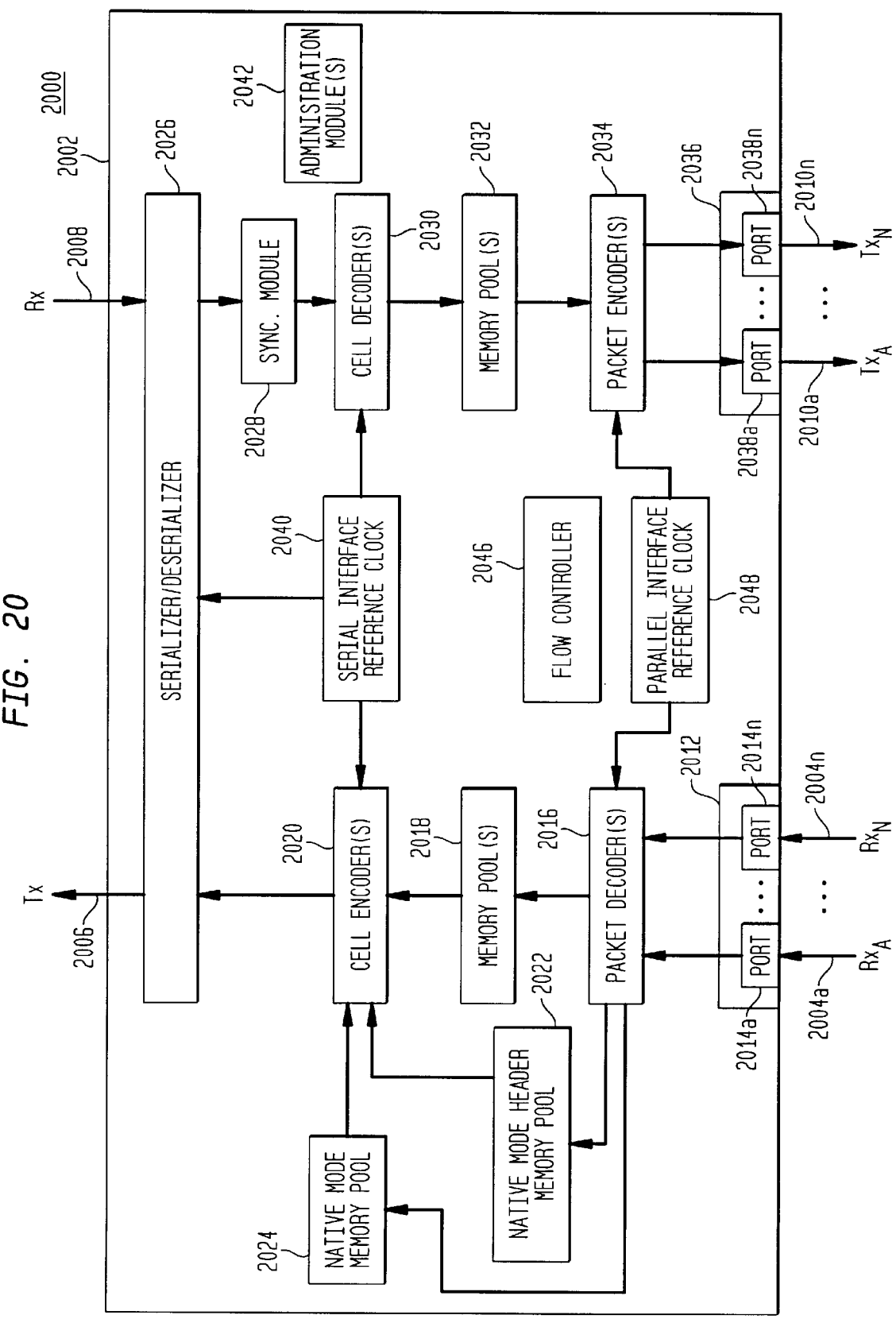
FIG. 20 illustrates a detailed block diagram of the bus translator according to one embodiment of the present invention.

In FIG. 20, a detailed block diagram of the bug translator according to one embodiment, is shown. Bus translator 2002 incorporates the functionality of bus translators 1802 and 1902.

In terms of packet processing, packets are received by the bus translator 2002 by receivers 2012. The packets are processed into cells and forwarded to a serializer/deserializer (SERDES) 2026. SERDES 2026 acts as a transceiver for the tells being processed by the bus translator 2002. The SERDES 2026 transmits the cells via interface connection 2006.

In terms of cell processing, cells are received by the bus translator 2002 through the interface connection 2008 to the SERDES 2026. The cells are processed into packets and forwarded to transmitters 2036. The transmitters 2036 forward the packets to the IPC/IGC components through interface connections 2010a–n.

The reference clocks 2040 and 2048 are similar to those previously described in FIGS. 18 and 19. The reference clock 2040 provides timing information to the serial components of the bus translator 2002. As shown, the reference clock 2040 provides timing information to the cell encoder(s) 2020, cell decoder(s) 2030, and the SERDES 2026. The reference clock 2048 provides timing information to the parallel components of bus translator 2002. As shown, the reference clock 2048 provides timing information to the packet decoder(s) 2016 and packet encoder(s) 2034.

The above-described separation of serial and parallel operations is a feature of embodiments of the present invention. In such embodiments, the parallel format of incoming and leaving packets at ports 2014a–n and 2038a–b, respectively, is remapped into a serial cell format at the SERDES 2026.

Furthermore, according to embodiments of the present inventions the line rates of the ports 2014a–n have a shared utilization limited only by the line rate of output 2006. Similarly for port; 2039a–n and input 2008.

Figure 21A:
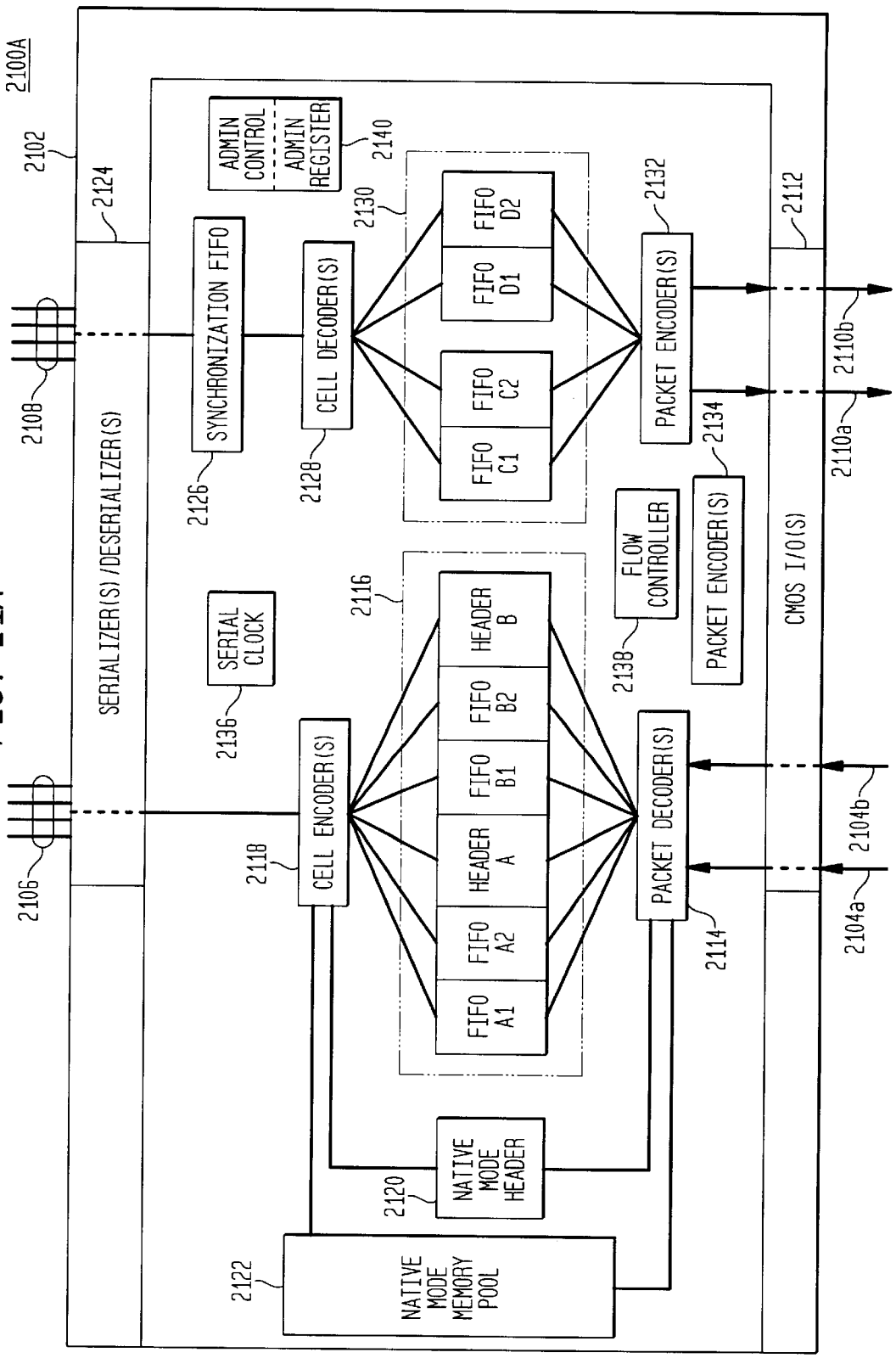
FIG. 21A illustrates a detailed block diagram of the bus translator according to another embodiment of the present invention.
Figure 21B:
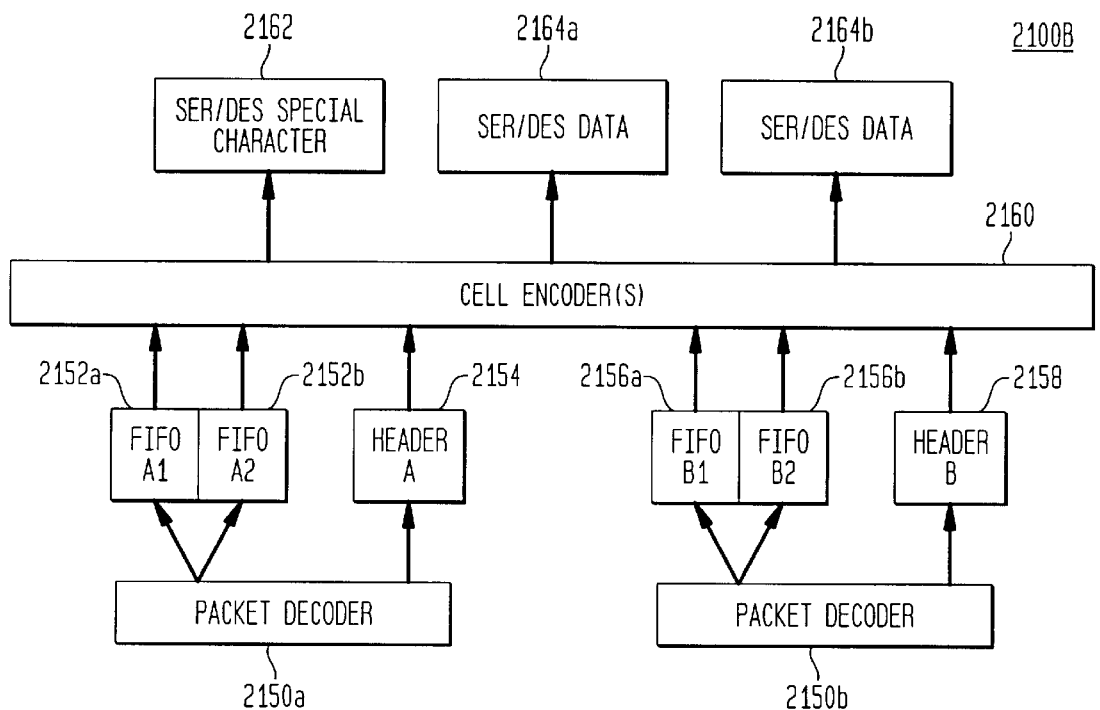
FIG. 21B shows a functional block diagram of the data paths with reception components of the bus translator according to one embodiment of the present invention.
Figure 21C:
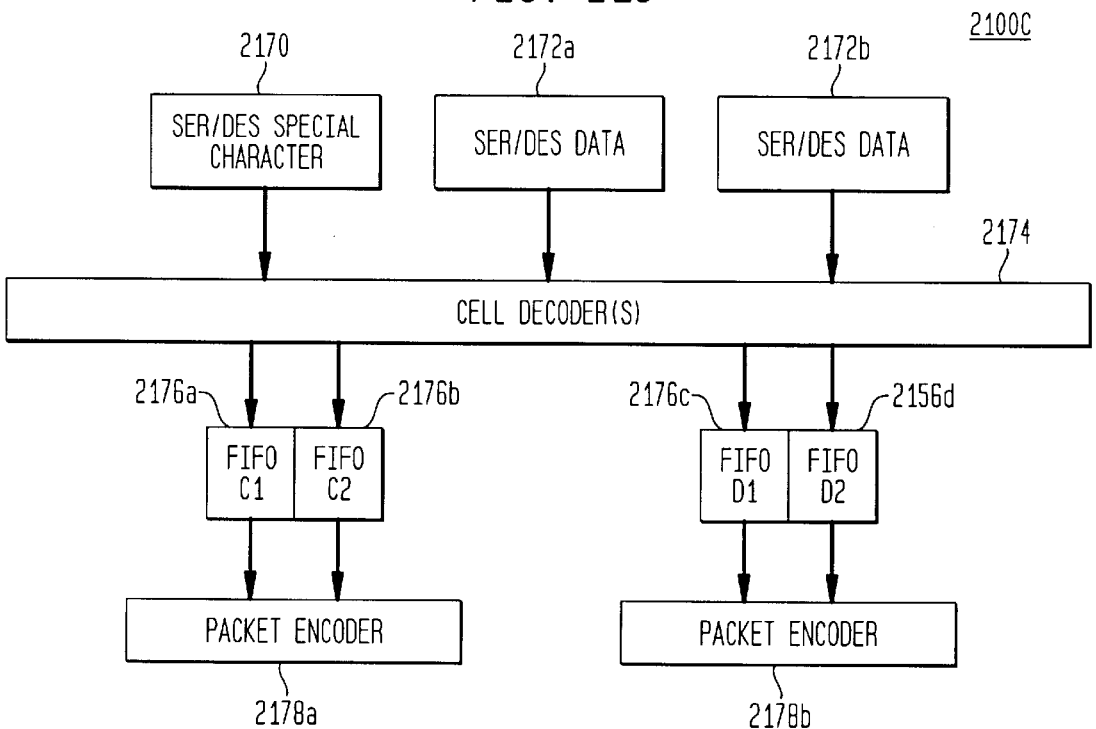
FIG. 21C shows a functional block diagram of the data paths with transmission components of the bus translator according to one embodiment of the present invention.
Figure 21D:
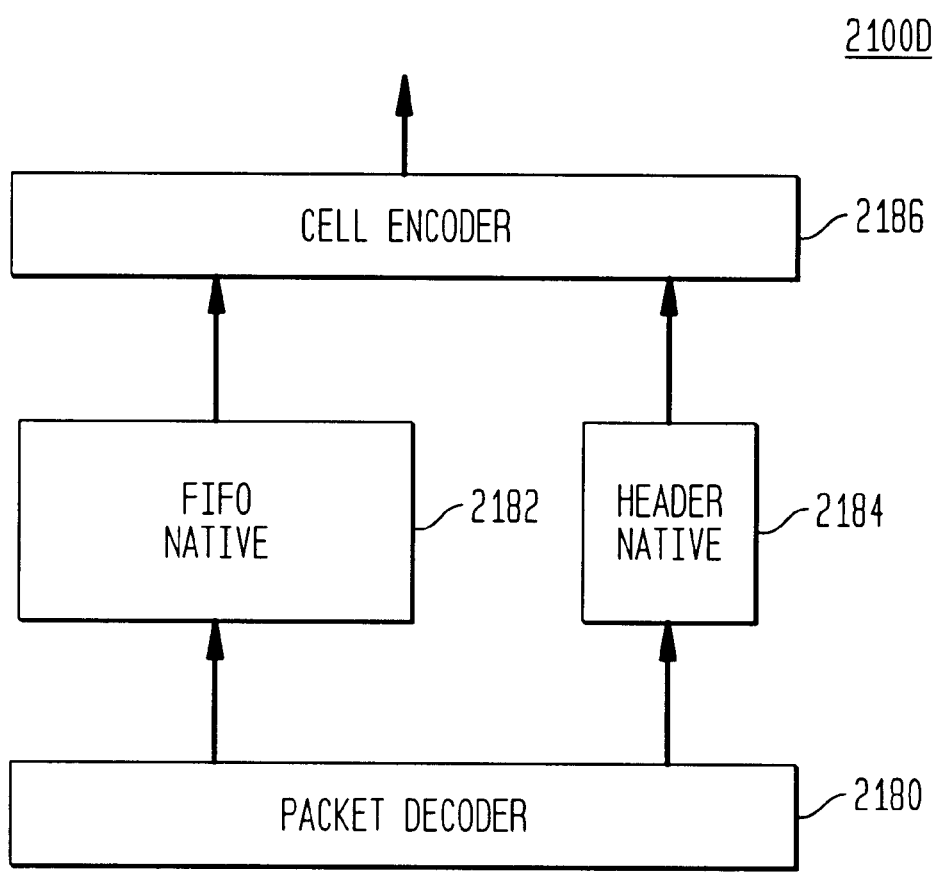
FIG. 21D shows a functional block diagram of the data paths with native mode reception components of the bus translator according to one embodiment of the present invention.
Figure 21E:
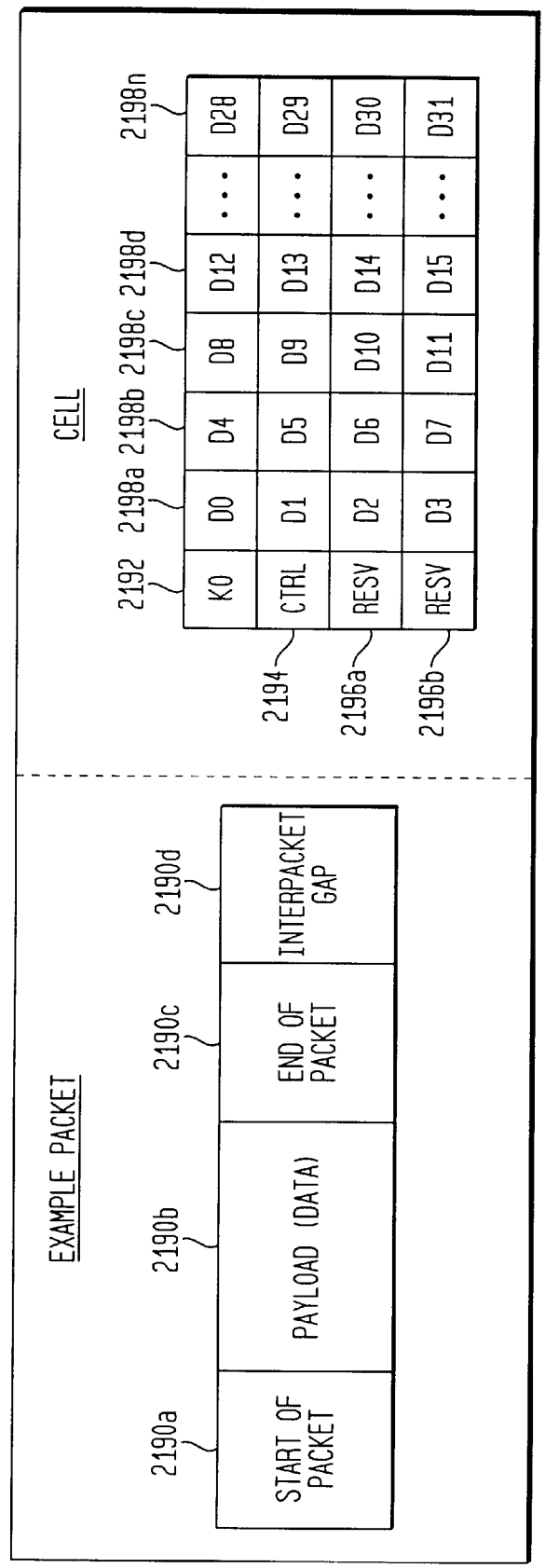
FIG. 21E shows a block diagram of a cell format according to one embodiment of the present invention.

The remapping of parallel packets into serial cells is described in further detail herein, more specifically with regard to FIG. 21E.

In FIG. 21A, a detailed block diagram of the bus translator, according to another embodiment of the present invention, is shown. The receivers and transmitters of FIGS. 18, 19, and 20 are replaced with CMOS I/Os 2112 capable of providing the same functionality as previously described. The CMOS I/Os 2112 can be configured to accommodate various numbers of physical and logical ports for the reception and transmission of data.

Administration module 2140 operates as previously described. As shown, the administration module 2140 includes an administration control element and an administration register. The administration control element monitors the operation of the bus translator 2102 and provides the reset and power-on functionality as previously described with regard to FIGS. 18, 19, and 20. The administration register caches operating parameters such that the state of the bus translator 2102 can be determined based on a comparison or look-up against the cached parameters.

The reference clocks 2134 and 2136 are similar to those previously described in FIGS. 18, 19, and 20. The reference clock 2136 provides timing information to the serial components of the bus translator 2102. As shown, the reference clock 2136 provide; timing information to the cell encoder(s) 2118, cell decoder(s) 2128, and the SERDES 2124. The reference clock 2134 provides timing information to the parallel components of bus translator 2102. As shown, the reference clock 2134 provides timing information to the packet decoder(s) 2114 and packet encoder(s) 2132.

As shown in FIG. 21A, memory pool 2116 includes two pairs of FIFOs. Each FIFO pair with a header queue. The memory pool 2116 performs as previously described memory pools in FIGS. 18 and 20. In one embodiment, payload or information portions of decoded packets is stored in one or more FIFOs and the timing, place of origin, destination, and similar information is stored in the corresponding header queue.

Additionally, memory pool 2130 includes two pairs of FIFOs. The memory pool 2130 performs as previously described memory pools in FIGS. 19 and 20. In one embodiment, decoded cell information is stored in one or more FIFOs along with corresponding timing, place of origin, destination, and similar information.

Interface connections 2106 and 2108 connect previously described interface adapters to the bus translator 2102 through the SERDES 2124. In one embodiment, the connections 2106 and 2108 are serial links. In another embodiment, the serial links are divided four lanes.

In one embodiment, the bug translator 2102 is an IBT 304 that translates one or more 4 Gbps parallel IPC/IGC components into four 3.125 Gbps serial MAUI interface links or lanes. In one embodiment, the back planes are the IPC/IGC interface connections. The bus translator 2102 formats incoming data into one or more cell formats.

In one embodiment, the cell format can be a four byte header and a 32 byte data payload. In a further embodiment, each cell is separated by a special K character into the header. In another embodiment, the last cell of a packet is indicated by one or more special K1 characters.

The cell formats can include both fixed length cells and variable length cells. The 36 bytes (4 byte header plus 32 byte payload) encoding is an example of a fixed length cell format. In an alternative embodiment, cell formats can be implemented where the cell length exceeds the 36 bytes (4 bytes+32 bytes) previously described.

In FIG. 21B, a functional block diagram shows the data paths with reception components of the bus translator. Packet decoders 2150a–b forward packet data to the FIFOs and headers in pairs. For example, packet decoder 2150a forwards packet data to FIFO 2152a–b and side-band information to header 2154, A similar process is followed for packet decoder 2150b. Packet decoder 2150b forwards packet data to FIFO 2156a–b and side-band information to header 2158. Cell encoder(s) 2160 receive the data and control information and produce cells to serializer/deserializer (SERDES) circuits, shown as their functional components SERDES special character 2162, and SERDES data 2164a–b. The SERDES special character 2162 contains the special characters used to indicate the start and end of a cell's data payload. The SERDES data 2164a–b contains the data payload for each cell, as well as the control information for the cell. Cell structure is described in additional detail below, with respect to FIG. 21E.

The bus translator 2102 has memory pools 2116 to act as internal data buffers to handle pipeline latency. For each IPC/IGC component, the bus translator 2102 has two data FIFOs and one header FIFO, as shown in FIG. 21A as the FIFOs of memory pool 2116 and in FIG. 21B as elements 2152a–b, 2154, 2156a–b, and 2158. In one embodiment, side band information is stored in each of the headers A or B. 32 bytes of data is stored in one or more of the two data FIFOs A1, A2, or B1, B2 in aping-pong fashion. The ping-pong fashion is well-known in the relevant art and involves alternating fashion.

In one embodiment, the cell encoder 2160 merges the data from each of the packet decoders 2150a–b into one 10 Gbps data stream to the interface adapter. The cell encoder 2160 merges the data by interleaving the data at each cell boundary. Each cell boundary is determined by the special K characters.

According to one embodiment, the received packets are 32 bit aligned, while the parallel interface of the SERDES elements is 64 bit wide.

In practice it can be difficult to achieve line rate for any packet length. Line rate means maintaining the same rate of output in cells as the rate at which packets are being received. Packets can have a four byte header overhead (SOP) and, in one embodiment, a four byte tail overhead (EOP). Therefore, the bus translators 2102 must parse the packets without the delays of typical parsing and routing components. More specifically, the bus translators 2102 formats parallel data inot cell format using special K characters, as described in more detail below, to merge state information and slot information (together, control information) in band with the data streams. Thus, in one embodiment, each 32 bytes of cell data is accompanied by a four byte header.

FIG. 21C shows a functional block diagram of the data paths with transmission components of the bus translator according to one embodiment of the present invention. Cell decoder(s) 2174 receive cells from the SERDES circuit. The functional components of the SERDES circuit include elements 2170, and 2172a–b. The control information and data are parsed from the cell and forward to the memory pool(s). In one embodiment, FIFOs are maintained in pairs, shown as elements 2176a–b and 2176c–d. Each pair forwards control information and data to packet encoders 2178a–b.

FIG. 21D shows a functional block diagram of the data paths with native mode reception components of the bus translator according to one embodiment of the present invention. In one embodiment, the bus translator 2102 can be configured into native mode. Native mode can include when a total of 10 Gbps connections are maintained at the parallel end (as shown by CMOS I/Os 2112) of the bus translator 2102. In one embodiment, due to the increased bandwidth requirement (from 8 Gbps to 10 Gbps), the cell format length is no longer fixed at 32 bytes. In embodiments where a 10 Gbps traffic is channeled through the bus translator 2102, control information is attached when the bus translator 2102 receives a SOP from the device(s) on the 10 Gbps link. In an additional embodiment, when the bus translator 2102 first detects a data transfer and is, therefore, coming to an operational state from idle, it attaches control information.

In an additional embodiment, as shown in FIG. 21D, two separate data FIFOs are used to temporarily buffer the uplinking data; thus avoiding existing timing paths.

Although a separate native mode data path is not shown for cell to packet translation, one skilled in the relevant art would recognize how to accomplish it based at least on the teachings described herein. For example, by configuring two FIFOs for dedicated storage of 10 Gbps link information. In one embodiment, however, the bus translator 2102 processes native mode and non-native mode data paths in a shared operation as shown in FIGS. 19, 20, and 21. Headers and idle bytes are stripped from the data stream by the cell decoder(s), such as decoder(s) 2103 and 2174. Valid data is parsed and stored, and forwarded, as previously described, to the parallel interface.

In an additional embodiment, where there is a zero body cell format being received by the interface adapter or BIA, the IBT 304 holds one last data transfer for each source slot. When it receives the EOP with the zero body cell format, the last one or two transfers are released to be transmitted from the parallel interface.

S. Narrow Cell and Packet Encoding Processes

FIG. 21E shows a block diagram of a cell format according to one embodiment of the present invention. FIG. 21E shows both an example packet and a cell according to the embodiments described herein. The example packet shows a start of packet 2190a, payload containing data 2190b, end of packet 2190c, and inter-packet gap 2190c.

According to one embodiment of the present invention, the cell includes a special character K0 2190; a control information 2194; optionally, one or more reserved 2196a–b; and data 2198a–n. In an alternate embodiment, data 2198a–n can contain more than D0–D31.

In one embodiment, the four rows or slots indicated in FIG. 21E illustrate the four lanes of the serial link through which the cells are transmitted and/or received.

As previously described herein, the IBT 304 transmits and receives cells to and from the BIA 302 trough the XAUI interface. The IBT 304 transmits and receives packets to and from the IPC/IGC components, as well as other controller components (i.e., 10 GE packet processor) through a parallel interface. The packets are segmented into cells which consist of a four byte header followed by 32 bytes of data. The end of packet is signaled by K1 special character on any invalid data bytes within four byte of transfer or four K1 on all XAUI lanes. In one embodiment, each byte is serialized onto one XAUI lane. The following table illustrates in a right to left formation a byte by byte representation of a cell according to one embodiment of the present invention;

| Lane0 | Lane1 | Lane2 | Lane3 |
|---|---|---|---|
| K0 | State | Reserved | Reserved |
| D0 | D1 | D2 | D3 |
| D4 | D5 | D6 | D7 |
| D8 | D9 | D10 | D11 |
| D12 | D13 | D14 | D15 |
| . | . | . | . |
| . | . | . | . |
| . | . | . | . |
| D28 | D29 | D30 | D31 |

The packets are formatted into cells that consist of a header plug a data payload. The 4 bytes of header takes one cycle or row on four XAUI lanes. It has K0 special character on Lane0 to indicate that current transfer is a header. The control information starts on Lane1 of a header.

In one embodiment, the IBT 304 accepts two IPC/IGC back plane buses and translates them into one 10 Gbps serial stream.

Figure 22:
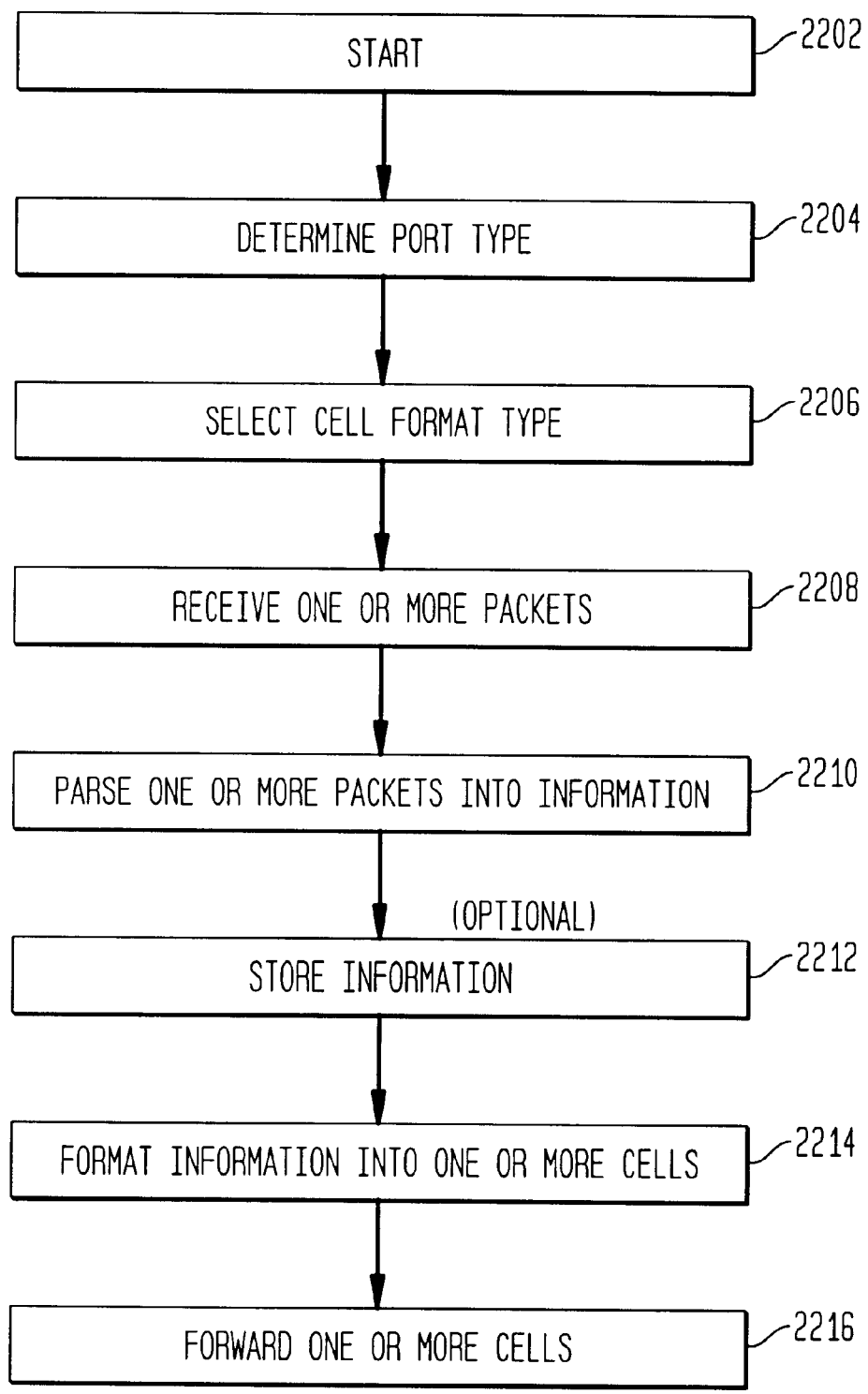
FIG. 22 illustrates a flow diagram of the encoding process of the bus translator according to one embodiment of the present invention.

In FIG. 22, a flow diagram of the encoding process of the bus translator according to one embodiment of the present invention is shown. The process starts at step 2202 and immediately proceeds to step 2204.

In step 2204, the IBT 304 determines the port types through which it will be receiving packets. In one embodiment, the ports are configured for 4 Gbps traffic from IPC/IGC components. The process immediately proceeds to step 2206.

In step 2206, the IBT 304 selects a cell format type based on the type of traffic it will be processing. In one embodiment, the IBT 304 selects the cell format type based in part on the port type determination of step 2204. The process immediately proceeds to step 2208.

In step 2208, the IBT 304 receives one or more packets from through its ports from the interface connections, as previously described. The rate at which packets are delivered depends on the components sending the packets. The process immediately proceeds to step 2210.

In step 2210, the IBT 304 parses the one or more packets received in step 2208 for the information contained therein.

In one embodiment, the packet decoder(s) of the IBT 304 parse the packets for the information contained within the payload section of the packet, as well as the control or routing information included with the header for that each given packet. The process immediately proceeds to step 2212.

In step 2212, the IBT 304 optionally stores the information parsed in step 2210. In one embodiment, the memory pool(s) of the IBT 304 are utilized to store the information. The process immediately proceeds to step 2214.

In step 2214, the IBT 304 formats the information into one or more cells, In one embodiment, the cell encoder(s) of the IBT 304 access the information parsed from the one or more packets. The information includes the data being trafficked as well as slot and state information (i.e., control information) about where the data is being sent. As previously described, the cell format includes special characters which are added to the information. The process immediately proceeds to step 2216.

In step 2216, the IBT 304 forwards the formatted cells. In one embodiment, the SERDES of the IBT 304 receives the formatted cells and serializes them for transport to the BIA 302 of the present invention. The process continues until instructed otherwise.

In FIGS. 23A–B, a detailed flow diagram shows the encoding process of the bus translator according to one embodiment of the present invention. The process of FIGS. 23A–B begins at step 2302 and immediately flows to step 2304.

In step 2304, the IBT 304 determines the port types through which it will be receiving packets. The process immediately proceeds to step 2306.

In step 2306, the IBT 304 determines if the port type will, either individually or in combination, exceed the threshold that can be maintained. In other words, the IBT 304 checks to see if it can match the line rate of incoming packets without reaching the internal rate maximum. If it can, then the process proceeds to step 2310. In not, then the process proceeds to step 2308.

In step 2308, given that the IBT 304 has determined that it will be operating at its highest level, the IBT 304 selects a variable cell size that will allow it to reduce the number of cells being formatted and forwarded in the later steps of the process. In one embodiment, the cell format provides for cells of whole integer multiples of each of the one or more packets received. In another embodiment, the IBT 304 selects a cell format that provides for a variable cell size that allows for maximum length cells to be delivered until the packet is completed. For example, if a given packet is 2.3 cell lengths, then three cells will be formatted, however, the third cell will be a third that is the size of the preceding two cells. The process immediately proceeds to step 2312.

In step 2310, given that the IBT 304 has determined that it will not be operating at its highest level, the IBT 304 selects a fixed cell size that will allow the IBT 304 to process information with lower processing overhead. The process immediately proceeds to step 2312.

In step 2312, the IBT 304 receives one or more packets. The process immediately proceeds to step 2314.

In step 2314, the IBT 304 parses the control information from each of the one or more packets. The process immediately proceeds to step 2316.

In step 2316, the IBT 304 determines the slot and state information for each of the one or more packets. In one embodiment, the slot and state information is determined in part from the control information parsed from each of the one or more packets. The process immediately proceeds to step 2318.

In step 2318, the IBT 304 stores the slot and state information. The process immediately proceeds to step 2320.

In step 2320, the IBT 304 parses the payload of each of the one or more packets for the data contained therein. The process immediately proceeds to step 2322.

In step 2322, the IBT 304 stores the data parsed from each of the one or more packets. The process immediately proceeds to step 2324.

In step 2324, the IBT 304 accesses the control information. In one embodiment, the cell encoder(s) of the IBT 304 access the memory pool(s) of the IBT 304 to obtain the control information. The process immediately proceeds to step 2326.

In step 2326, the IBT 304 accesses the data parsed from each of the one or more packets. In one embodiment, the cell encoder(s) of the IBT 304 access the memory pool(s) of the IBT 304 to obtain the data. The process immediately proceeds to step 129.

In step 2328, the IBT 304 constructs each cell by inserting a special character at the beginning of the cell currently being constructed. In one embodiment, the special character is K0. The process immediately proceeds to step 2330.

In step 2330, the IBT 304 inserts the slot information. In one embodiment, the IBT 304 inserts the slot information into the next lane, such as space 2194. The process immediately proceeds to step 2332.

In step 2332, the IBT 304 inserts the state information. In one embodiment, the IBT 304 inserts the state information into the next lane after the one used for the slot information, such as reserved 2196a. The process immediately proceeds to step 2334.

In step 2334, the IBT 304 inserts the data. The process immediately proceeds to step 2336.

In step 2336, the IBT 304 determines if there is additional data to be formatted. For example, if there is remaining data from a given packet. If so, then the process loops back to step 2328. If not, then the process immediately proceeds to step 2338.

In step 2338, the IBT 304 inserts the special character that indicated the end of the cell transmission (of one or more cells). In one embodiment, when the last of a cells is transmitted, the special character is K1. The process proceeds to step 2340.

In step 2340, the IBT 304 forwards the cells. The process continues until instructed otherwise.

In FIG. 24, a flow diagram illustrates the decoding process of the bus translator according to one embodiment of the present invention. The process of FIG. 24 begins at step 2402 and immediately proceeds to step 2404.

In step 2404, the IBT 304 receives one or more calls. In one embodiment, the cells are received by the SERDES of the IBT 304 and forwarded to the cell decoder(s) of the IBT 304. In another embodiment, the SERDES of the IBT 304 forwards the cells to a synchronization buffer or queue that temporarily holds the cells so that their proper order can be maintained. These steps are described below with regard to steps 2406 and 2408. The process immediately proceeds to step 2406.

In step 2406, the IBT 304 synchronizes the one or more cells into the proper order. The process immediately proceeds to step 2408.

In step 2408, the IBT 304 optionally checks the one or more cells to determine if they are in their proper order.

In one embodiment, steps 2506, 2508, and 2510 are performed by a synchronization FIFO. The process immediately proceeds to step 2410.

In step 2410, the IBT 304 parses the one or more cells into control information and payload data. The process immediately proceeds to step 2412.

In step 2412, the IBT 304 stores the control information payload data. The process immediately proceeds to step 2414.

In step 2414, the IBT 304 formats the information into one or more packets. The process immediately proceeds to step 2416.

In step 2416, the IBT 304 forwards the one or more packets. The process continues until instructed otherwise.

In FIGS. 25A–B, a detailed flow diagram of the decoding process of the bus translator according to one embodiment of the present invention is shown. The process of FIGS. 25A–B begins at step 2502 and immediately proceeds to step 2504.

In step 2504, the IBT 304 receives one or more cells. The process immediately proceeds to step 2506.

In step 2506, the IBT 304 optionally queues the one or more cells. The process immediately proceeds to step 2508.

In step 2508, the IBT 304 optionally determines if the cells are arriving in the proper order. If so, then the process immediately proceeds to step 2512. If not, then the process immediately proceeds to step 2510.

In step 2510, The IBT 304 holds one or more of the one or more cells until the proper order is regained. In one embodiment, in the event that cells are lost, the IBT 304 provide error control functionality, as described herein, to abort the transfer and/or have the transfer re-initiated. The process immediately proceeds to step 2514.

In step 2512, the IBT 304 parses the cell for control information. The proceed immediately proceeds to step 2514.

In step 2514, the IBT 304 determines the slot and state information. The process immediately proceeds to step 2516.

In step 2516, the IBT 304 stores the slot and state information. The process immediately proceeds to step 2518.

In one embodiment, the state and slot information includes configuration information as shown in the table below:

| Field | Name | Description |
| --- | --- | --- |
| State [3:0] | Slot Number | Destination slot number from IBT to SBIA. IPC can address 10 slots(7 remote, 3 local) and IGC can address 14 slots (7 remote and 7 local) |
| State [5:4] | Payload State | Encode payload state:<br>00 - RESERVED<br>01 - SOP<br>10 - DATA<br>11 - ABORT |
| State [6] | Source/Destination IPC | Encode source/destination IPC id number:<br>0 - to/from IPC0<br>1 - to/from IPC1 |
| State [7] | Reserved | Reserved |

In one embodiment, the IBT 304 has configuration registers. They are used to enable Backplane and IPC/IGC destination slots.

In step 2518, the IBT 304 parses the cell for data. The process immediately proceeds to step 2520.

In step 2520, the IBT 304 stores the data parsed from each of the one or more cells. The process immediately proceed; to step 2522.

In step 2522, the IBT 304 accesses the control information. The process immediately proceeds to step 2524.

In step 2524, the IBT 304 access the data. The process immediately proceeds to step 2526.

In step 2526, the IBT 304 forms one or more packets. The process immediately proceeds to step 2528.

In step 2528, the IBT 304 forwards the one or more packets. The process continues until instructed otherwise.

T. Administrative Process and Error Control

In FIG. 26, a flow diagram shows the administrating process of the bus translator according to one embodiment of the present invention. The process of FIG. 26 begins at step 2602 and immediately proceeds to step 2604.

In step 2604, the IBT 304 determines the status of its internal components. The process immediately proceeds to step 2606.

In step 2606, the IBT 304 determines the status of its links to external components. The process immediately proceeds to step 2608.

In step 2608, the IBT 304 monitors the operations of both the internal and external components, The process immediately proceeds to step 2610.

In step 2610, the IBT 304 monitors the registers for administrative commands. The process immediately proceeds to step 2612.

In step 2612, the IBT 304 performs resets of given components as instructed. The process immediately proceeds to step 2614.

In step 2614, the IBT 304 configures the operations of given components. The process continues until instructed otherwise.

In one embodiment, any errors are detected on the receiving side of the BIA 302 are treated in a fashion identical to the error control methods described herein for errors received on the Xpnt 202 from the BIA 302. In operational embodiments where the destination slot cannot be know under certain conditions by the BIA 302, the following process is followed.

a. Send an abort of packet (AOP) to all slots.
b. Wait for error to go away.
c. Sync to K0 token after error goes away to begin accepting data.

In the event that an error is detected on the receiving side of the IBT 304, it is treated as if the error was seen by the BIA 302 from IBT 304. The following process will be used:

a. Send an AOP to all slots of down stream IPC/IGC to terminate any packet in progress.
b. Wait for error to go away.
c. Sync to K0 token after error goes away to begin accepting data.

U. Reset and Recovery Procedures

The following reset procedure will be followed to get the SERDES in sync. An external reset will be asserted to the SERDES core when a reset is applied to the core. The duration of the reset pulse for the SERDES need not be longer than 10 cycles. After reset pulse, the transmitter and the receiver of the SERDES will sync up to each other through defined procedure. It is assumed that the SERDES will be in sync once the core comes out of reset. For this reason, the reset pulse for the core must be considerably greater than the reset pulse for the SERDES core.

The core will rely on software interaction to get the core in sync. Once the BIA 302, 600, IBT 304, and Xpnt 202 come out of reset, they will continuously send lane synchronization sequence. The receiver will set a software visible bit stating that its lane is in sync. Once software determines that the lanes are in sync, it will try to get the stripes in sync. This is done through software which will enable continuously sending of stripe synchronization sequence. Once again, the receiving side of the BIA 302 will set a bit stating that it is in sync with a particular source slot. Once software determines this, it will enable transmit for the BIA 302, XPNT 202 and IBT 304.

IV. Control Logic

Functionality described above with respect to the operation of switch 100 can be implemented in control logic. Such control logic can be implemented in software, firmware, hardware or any combination thereof.

V. Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A digital switch comprising:
 a switching fabric; and
 a plurality of blades coupled to said switching fabric via serial pipes;
 wherein each blade outputs serial data streams with in-band control information in multiple stripes to said switching fabric,
 wherein said switching fabric includes a plurality of cross points corresponding to the multiple stripes,
 wherein said multiple stripes comprise five stripes, and said serial data streams with in-band control information comprises five serial data streams of wide striped cells carrying packets of data, the wide striped cells including the in-band control information,
 wherein said plurality of cross points comprises five cross points, and each blade has five serial links coupled to respective ones of said five cross points.

2. The digital switch of claim 1, wherein the switching fabric determines a destination blade for data in the data streams using the in-band control information.

3. The digital switch of claim 1, wherein the wide striped cells include start-of-cell in-band control information in each of the five stripes.

4. The digital switch of claim 1, wherein the serial data streams output by each blade represent an aggregation of input serial data streams provided through physical ports to a respective blade.

5. The digital switch of claim 1, wherein each wide striped cell is encoded to provide in-band control information for each stripe.

6. A digital switch comprising:
 a switching fabric that switches data flow across multiple stripes;
 sets of serial links, each set having serial links corresponding to respective stripes of the multiple stripes; and
 a plurality of blades coupled to said switching fabric through said sets of serial links;
 wherein each blade generates wide striped cells having blocks that extend across the multiple stripes, each block having subblocks associated with respective stripes of the multiple stripes, wherein each blade outputs the subblocks across a respective set of serial links to said switching fabric such that subblocks are sent on serial links associated with corresponding stripes, wherein each wide striped cell is encoded to provide in-band control information for each stripe, wherein the subblocks include control and state information relating to traffic flow conditions in the stripes.

7. The digital switch of claim 6, wherein the multiple stripes comprise five stripes, and said switching fabric includes five cross points corresponding to the five stripes.

8. The digital switch of claim 6, wherein each set of serial links comprises five serial links coupling a respective blade with a corresponding cross point.

9. The digital switch of claim 6, wherein each serial link carries duplex traffic and has a capacity of at least approximately 10 gigabits per second.

10. The digital switch of claim 6, wherein said plurality of blades comprises eight blades, and said switching fabric has a switching capacity of at least approximately 800 gigabits per second.

11. The digital switch of claim 6, wherein the switching fabric determines a destination blade for data using the in-band control information.

12. The digital switch of claim 6, wherein the wide striped cells include start-of-cell in-band control information in each stripe.

13. A digital switch comprising:

a switching fabric that switches data flow across multiple stripes;

sets of serial links, each set having serial links corresponding to respective stripes of the multiple stripes; and a plurality of blades coupled to said switching fabric through said sets of serial links;

wherein each blade generates wide striped cells having blocks that extend across the multiple stripes, each block having subblocks associated with respective stripes of the multiple stripes, and wherein each blade outputs the subblocks across a respective set of serial links to said switching fabric such that subblocks are sent on serial links associated with corresponding stripes, wherein the multiple stripes comprise five stripes, and said switching fabric includes five cross points corresponding to the five stripes.

14. The digital switch of claim 13, wherein each set of serial links comprises five serial links coupling a respective blade with each of said five cross points.

15. The digital switch of claim 14, wherein each serial link carries duplex traffic and has a capacity of at least approximately 10 gigabits per second.

16. The digital switch of claim 15, said plurality of blades comprises eight blades, and said switching fabric has a switching capacity of at least approximately 800 gigabits per second.

17. The digital switch of claim 13, wherein each wide striped cell is encoded to provide in-band control information for each stripe.

18. The digital switch of claim 13, wherein the subblocks include control and state information relating to traffic flow conditions in the multiple stripes.

19. A digital switch comprising:

a switching fabric; and a plurality of blades coupled to said switching fabric via serial pipes;

wherein each blade outputs serial data streams with in-band control information in multiple stripes to said switching fabric, wherein said switching fabric includes a plurality of cross points corresponding to the multiple stripes, wherein said serial data streams with in-band control information comprise serial data streams of wide striped cells carrying packets of data, the wide striped cells including the in-band control information, and wherein said plurality of cross points comprises at least one cross point for each stripe, and each blade has at least one serial link for each stripe coupled to a respective cross point.

20. The digital claim 19, wherein the switching fabric determines a destination blade for data in the data streams using the in-band control information.

21. The digital switch of claim 19, wherein the wide striped cells include start-of-cell in-band control information in each of the stripes.

22. The digital switch of claim 19, wherein the switching fabric determines a destination blade for data in the serial data streams using the in-band control information.

23. The digital switch of claim 19, wherein the serial data streams output by each blade represent an aggregation of input serial data streams provided through physical ports to a respective blade.

24. The digital switch of claim 19, wherein each wide striped cell is encoded to provide in-band control information for each stripe.

25. The digital switch of claim 19, wherein the multiple stripes comprise five stripes.

26. The digital switch of claim 19, wherein each set of serial links comprises five serial links coupling a respective blade with each cross point.

27. The digital switch of claim 19, wherein each serial link carries duplex traffic and has a capacity of at least approximately 10 gigabits per second.

28. The digital switch of claim 19, wherein said plurality of blades comprises eight blades, and said switching fabric has a switching capacity of at least approximately 800 gigabits per second.

* * * * *

UNITED STATES PATENT AND TRADEMARK OFFICE
CERTIFICATE OF CORRECTION

PATENT NO. : 6,697,368 B2
DATED : February 24, 2004
INVENTOR(S) : Andrew Chang, Ronak Patel and Ming G. Wong It is certified that error appears in the above-identified patent and that said Letters Patent is hereby corrected as shown below:

Column 17,
Line 9, replace "0-2)" with -- (j-2) --.
Line 13, replace "56=q*j*l-1" with -- 56=q*j*$\ell$-1 --.
Line 13, replace "1=8" with -- $\ell$ = 8 --.

Column 18,
Line 2, replace "aj" with -- as --.
Line 59, replace "uses" with -- used --.

Column 19,
Line 14, replace "11C" with -- 15C --.
Line 17, replace "byte;" with -- bytes --.
Line 32, after "item4," delete "an".

Column 20,
Line 1, replace "161" with -- 202 --.

Column 23,
Line 3, replace "10 GE" with -- 10GE --.

Column 24,
Line 64, replace "," with -- . --.

Column 26,
Line 5, replace "tells" with -- cells --.
Line 33, replace "port;" with -- ports --.
Line 59, replace "provide;" with -- provides --.

Column 27,
Line 17, replace "bug" with -- bus --.
Line 19, replace "MAUI" with-- XAUI --.
Line 38, after "2154" replace "," with --. --.
Line 59, replace "aping-pong" with -- a ping-pong --.

Column 29,
Line 14, replace "trough" with -- through --.
Line 40, replace "plug" with -- plus --.

UNITED STATES PATENT AND TRADEMARK OFFICE
CERTIFICATE OF CORRECTION

PATENT NO.    : 6,697,368 B2
DATED         : February 24, 2004
INVENTOR(S)   : Andrew Chang, Ronak Patel and Ming G. Wong It is certified that error appears in the above-identified patent and that said Letters Patent is hereby corrected as shown below:

Column 31,
Line 19, replace "129" with -- 2328 --.
Line 51, replace "calls" with -- cells --.

Column 32,
Line 32, replace "proceed" with -- process --.
Line 64, replace "proceed;" with -- proceeds --.

Column 35,
Line 53, after "claim 15," insert -- wherein --.

Column 36,
Line 24, after "digital" insert -- switch of --.

Signed and Sealed this

Twelfth Day of October, 2004

JON W. DUDAS
*Director of the United States Patent and Trademark Office*